(12) United States Patent
Kimura

(10) Patent No.: US 11,837,180 B2
(45) Date of Patent: *Dec. 5, 2023

(54) METHOD FOR DRIVING DISPLAY DEVICE

(71) Applicant: SEMICONDUCTOR ENERGY LABORATORY CO., LTD., Atsugi (JP)

(72) Inventor: Hajime Kimura, Kanagawa (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/192,926

(22) Filed: Mar. 5, 2021

(65) Prior Publication Data

US 2021/0193059 A1    Jun. 24, 2021

Related U.S. Application Data

(63) Continuation of application No. 15/440,840, filed on Feb. 23, 2017, now Pat. No. 10,943,549, which is a
(Continued)

(30) Foreign Application Priority Data

Feb. 6, 2009    (JP) ................... 2009-025966

(51) Int. Cl.
*G09G 3/34*    (2006.01)
*G06T 1/00*    (2006.01)
(Continued)

(52) U.S. Cl.
CPC ............ *G09G 3/3426* (2013.01); *G06T 1/00* (2013.01); *G06T 3/4053* (2013.01);
(Continued)

(58) Field of Classification Search
CPC .. G09G 3/3426; G09G 3/3611; G09G 3/3648; G09G 5/005; G09G 3/3614;
(Continued)

(56) References Cited

U.S. PATENT DOCUMENTS 4,956,719 A    9/1990    Yamashita
5,031,047 A    7/1991    Takanashi et al.
(Continued)

FOREIGN PATENT DOCUMENTS

CN    001863272 A    11/2006
EP    0763937 A    3/1997
(Continued)

OTHER PUBLICATIONS

International Search Report (Application No. PCT/JP2010/051182) dated Mar. 23, 2010.
(Continued)

*Primary Examiner* — Sahlu Okebato
(74) *Attorney, Agent, or Firm* — NIXON PEABODY LLP; Jeffrey L. Costellia

(57) ABSTRACT

A low-resolution image is displayed at higher resolution and afterimages are reduced. Resolution is nude higher by super-resolution processing. In this case, the super-resolution processing is performed after frame interpolation processing is performed. Further, in that case, the super-resolution processing is performed using a plurality of processing systems. Therefore, even when frame frequency is made higher, the super-resolution processing can be performed at high speed. Further, since frame rate doubling is performed by the frame interpolation processing, afterimages can be reduced.

2 Claims, 23 Drawing Sheets

Related U.S. Application Data continuation of application No. 14/608,966, filed on Jan. 29, 2015, now Pat. No. 9,583,060, which is a continuation of application No. 12/699,920, filed on Feb. 4, 2010, now Pat. No. 8,970,638.

(51) Int. Cl.
  *G06T 3/40* (2006.01)
  *G09G 5/00* (2006.01)
  *G09G 3/36* (2006.01)

(52) U.S. Cl.
  CPC .......... *G06T 3/4069* (2013.01); *G09G 3/3611* (2013.01); *G09G 3/3648* (2013.01); *G09G 5/005* (2013.01); *G06T 2200/16* (2013.01); *G06T 2200/28* (2013.01); *G06T 2210/36* (2013.01); *G09G 3/3614* (2013.01); *G09G 2300/0426* (2013.01); *G09G 2300/0434* (2013.01); *G09G 2300/0814* (2013.01); *G09G 2300/0876* (2013.01); *G09G 2310/0224* (2013.01); *G09G 2310/0229* (2013.01); *G09G 2320/0252* (2013.01); *G09G 2320/0257* (2013.01); *G09G 2320/0261* (2013.01); *G09G 2320/0276* (2013.01); *G09G 2320/0646* (2013.01); *G09G 2320/106* (2013.01); *G09G 2340/0407* (2013.01); *G09G 2340/16* (2013.01); *G09G 2360/00* (2013.01)

(58) Field of Classification Search
  CPC ... G09G 2300/0426; G09G 2300/0434; G09G 2300/0814; G09G 2300/0876; G09G 2310/0224; G09G 2310/0229; G09G 2320/0252; G09G 2320/0257; G09G 2320/0261; G09G 2320/0276; G09G 2320/0646; G09G 2320/106; G09G 2340/0407; G09G 2340/16; G09G 2360/00; G06T 1/00; G06T 3/4053; G06T 3/4069; G06T 2200/16; G06T 2200/28; G06T 2210/36
  See application file for complete search history.

(56) References Cited

U.S. PATENT DOCUMENTS

| | | |
|---|---|---|
| 5,249,037 A | 9/1993 | Sugiyama et al. |
| 5,583,561 A | 12/1996 | Baker et al. |
| 5,805,231 A | 9/1998 | Mogi et al. |
| 6,023,535 A | 2/2000 | Aoki |
| 7,053,881 B2 | 5/2006 | Itoh |
| 7,142,221 B2 | 11/2006 | Sakamaki et al. |
| 7,432,979 B2 | 10/2008 | Tanaka |
| 7,505,018 B2 | 3/2009 | Feng et al. |
| 7,532,192 B2 | 5/2009 | Feng et al. |
| 7,570,878 B2 | 8/2009 | Kodaira et al. |
| 7,581,837 B2 | 9/2009 | Whitehead et al. |
| 7,586,492 B2 | 9/2009 | Riach et al. |
| 7,602,369 B2 | 10/2009 | Feng et al. |
| 7,612,757 B2 | 11/2009 | Feng et al. |
| 7,737,930 B2 | 6/2010 | Inuzuka et al. |
| 7,787,047 B2 | 8/2010 | Wada |
| 7,965,311 B2 | 6/2011 | Oura |
| 8,014,632 B2 | 9/2011 | Matsumoto et al. |
| 8,170,376 B2 | 5/2012 | Matsumoto et al. |
| 8,212,830 B2 | 7/2012 | Ogiso |
| 8,319,898 B2 | 11/2012 | Ueno et al. |
| 8,446,356 B2 | 5/2013 | Ooishi et al. |
| 8,462,266 B2 | 6/2013 | Ueno et al. |
| 8,970,638 B2 | 3/2015 | Kimura |
| 9,583,060 B2 | 2/2017 | Kimura |
| 9,881,535 B2 | 1/2018 | Hanaoka et al. |
| 2002/0175626 A1 | 11/2002 | Saito |
| 2005/0019000 A1 | 1/2005 | Lim et al. |
| 2005/0093895 A1 | 5/2005 | Damera-Venkata |
| 2005/0100239 A1 | 5/2005 | Boon et al. |
| 2005/0128307 A1 | 6/2005 | Kobayashi et al. |
| 2005/0195325 A1 | 9/2005 | Tanaka |
| 2005/0248520 A1 | 11/2005 | Feng et al. |
| 2005/0248553 A1 | 11/2005 | Feng et al. |
| 2005/0248555 A1 | 11/2005 | Feng et al. |
| 2005/0248591 A1 | 11/2005 | Feng et al. |
| 2006/0045381 A1 | 3/2006 | Matsuo et al. |
| 2006/0125775 A1 | 6/2006 | Itoh |
| 2006/0181503 A1 | 8/2006 | Feng |
| 2006/0202945 A1 | 9/2006 | Feng |
| 2006/0262066 A1 | 11/2006 | Yamazaki et al. |
| 2006/0262133 A1 | 11/2006 | Sakamaki et al. |
| 2006/0290950 A1 | 12/2006 | Platt et al. |
| 2007/0070221 A1* | 3/2007 | Nishi .................. H04N 7/0132 348/241 |
| 2007/0071362 A1* | 3/2007 | Milanfar ............... G06T 3/4076 382/299 |
| 2007/0091111 A1 | 4/2007 | Gutta |
| 2007/0091120 A1 | 4/2007 | Oura |
| 2007/0103418 A1 | 5/2007 | Ogino et al. |
| 2007/0223909 A1 | 9/2007 | Tanaka |
| 2007/0242031 A1 | 10/2007 | Kimura et al. |
| 2007/0273750 A1 | 11/2007 | Tanaka |
| 2007/0279359 A1 | 12/2007 | Yoshida et al. |
| 2007/0285382 A1 | 12/2007 | Feng |
| 2007/0296689 A1 | 12/2007 | Kimura et al. |
| 2008/0068359 A1 | 3/2008 | Yoshida et al. |
| 2008/0074350 A1 | 3/2008 | Beon et al. |
| 2008/0074537 A1 | 3/2008 | Kageyama et al. |
| 2008/0129760 A1 | 6/2008 | Phan |
| 2008/0151102 A1 | 6/2008 | Namioka |
| 2008/0174607 A1 | 7/2008 | Iranli |
| 2008/0180385 A1 | 7/2008 | Yoshida et al. |
| 2008/0204592 A1 | 8/2008 | Jia et al. |
| 2008/0239151 A1 | 10/2008 | Tomonaga et al. |
| 2008/0252666 A1 | 10/2008 | Chen et al. |
| 2008/0259099 A1 | 10/2008 | Arai et al. |
| 2008/0284719 A1 | 11/2008 | Yoshida |
| 2008/0284768 A1 | 11/2008 | Yoshida et al. |
| 2008/0291326 A1 | 11/2008 | Shishido et al. |
| 2009/0010568 A1* | 1/2009 | Nakagami ............ H04N 9/8042 382/299 |
| 2009/0059068 A1 | 3/2009 | Hanaoka et al. |
| 2009/0129703 A1* | 5/2009 | Takeshima ............ H04N 19/59 382/299 |
| 2009/0184918 A1 | 7/2009 | Feng et al. |
| 2009/0225869 A1 | 9/2009 | Cho et al. |
| 2009/0262067 A1 | 10/2009 | Feng et al. |
| 2010/0002949 A1 | 1/2010 | Tanaka et al. |
| 2010/0026737 A1 | 2/2010 | Ida et al. |
| 2010/0086048 A1* | 4/2010 | Ishtiaq ................ H04N 19/105 375/E7.076 |
| 2010/0098352 A1 | 4/2010 | Kobayashi et al. |
| 2010/0156955 A1 | 6/2010 | Kimura |
| 2013/0088534 A1 | 4/2013 | Arai et al. |
| 2018/0082624 A1 | 3/2018 | Hanaoka et al. |

FOREIGN PATENT DOCUMENTS

| | | |
|---|---|---|
| EP | 0779713 A | 6/1997 |
| EP | 1067774 A | 1/2001 |
| EP | 1701332 A | 9/2006 |
| EP | 1931141 A | 6/2008 |
| EP | 1940153 A | 7/2008 |
| EP | 1959425 A | 8/2008 |
| EP | 1976289 A | 10/2008 |
| EP | 2017816 A | 1/2009 |
| EP | 2141910 A | 1/2010 |
| EP | 2144434 A | 1/2010 |
| JP | 06-054172 A | 2/1994 |
| JP | 08-336046 A | 12/1996 |
| JP | 09139869 A * | 5/1997 |
| JP | 2000-137469 A | 5/2000 |
| JP | 2000-333135 A | 11/2000 |
| JP | 2004-294408 A | 10/2004 |

(56) References Cited

FOREIGN PATENT DOCUMENTS

| | | |
|---|---|---|
| JP | 2005-091454 A | 4/2005 |
| JP | 2005-102191 A | 4/2005 |
| JP | 2005-253000 A | 9/2005 |
| JP | 2006-005524 A | 1/2006 |
| JP | 2006-099404 A | 4/2006 |
| JP | 2006-245677 A | 9/2006 |
| JP | 2006-251796 A | 9/2006 |
| JP | 2006-337771 A | 12/2006 |
| JP | 2007-047476 A | 2/2007 |
| JP | 2007-108447 A | 4/2007 |
| JP | 2007-293039 A | 11/2007 |
| JP | 2007-316161 A | 12/2007 |
| JP | 2007-324655 A | 12/2007 |
| JP | 2008-040384 A | 2/2008 |
| JP | 2008-052131 A | 3/2008 |
| JP | 2008-067110 A | 3/2008 |
| JP | 2008-085411 A | 4/2008 |
| JP | 2008-131244 A | 6/2008 |
| JP | 2008-147904 A | 6/2008 |
| JP | 2008-160565 A | 7/2008 |
| JP | 2008-524720 | 7/2008 |
| JP | 2008-182347 A | 8/2008 |
| JP | 2008-197394 A | 8/2008 |
| JP | 2008-219188 A | 9/2008 |
| JP | 2008-252701 A | 10/2008 |
| JP | 2008-268325 A | 11/2008 |
| JP | 2008-287118 A | 11/2008 |
| JP | 2008-295022 A | 12/2008 |
| JP | 2009-267466 A | 11/2009 |
| JP | 2010-517099 | 5/2010 |
| KR | 1990-0001260 A | 1/1990 |
| KR | 1997-0703675 A | 7/1997 |
| KR | 2004-0070324 A | 8/2004 |
| KR | 2008-0102960 A | 11/2008 |
| KR | 10-1715640 | 3/2017 |
| WO | WO-1995/034169 | 12/1995 |
| WO | WO-2000/010323 | 2/2000 |
| WO | WO-2006/068985 | 6/2006 |
| WO | WO-2008/092036 | 7/2008 |
| WO | WO-2010/090130 | 8/2010 |

OTHER PUBLICATIONS

Written Opinion (Application No. PCT/JP2010/051182) dated Mar. 23, 2010.
European Search Report (Application No. 10738464.6) dated Nov. 10, 2014.
Korean Office Action (Application No. 2018-7017952) dated Sep. 17, 2018.
European Office Action (Application No. 10738464.6) dated May 8, 2020.

* cited by examiner

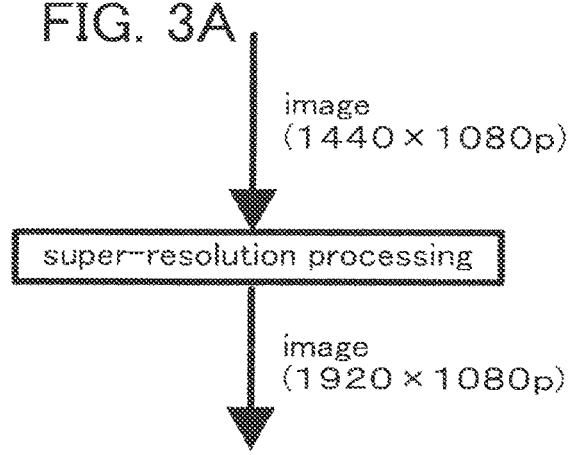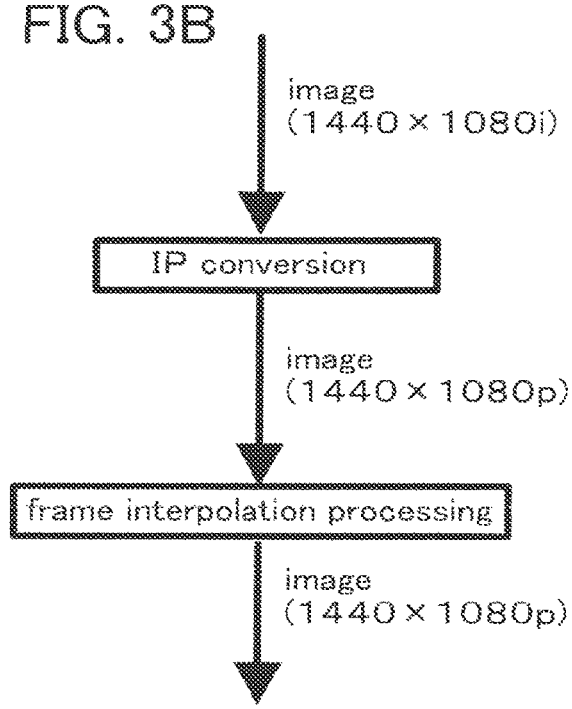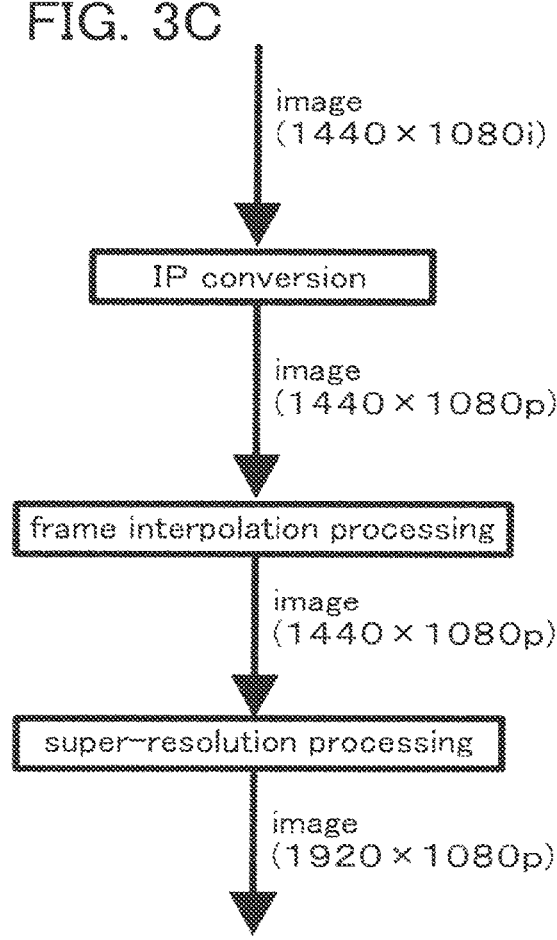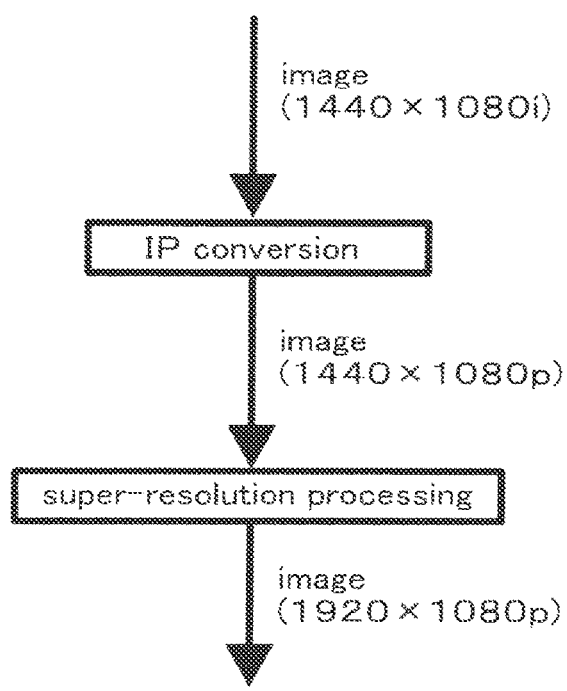

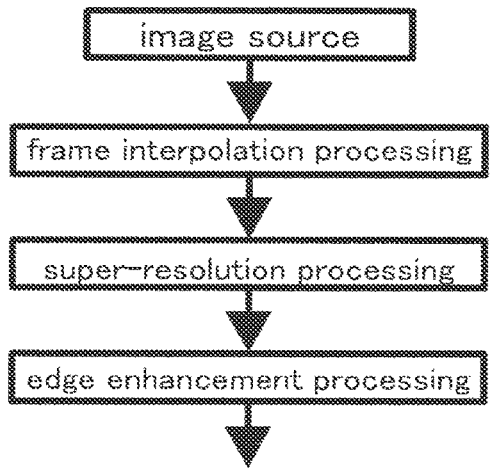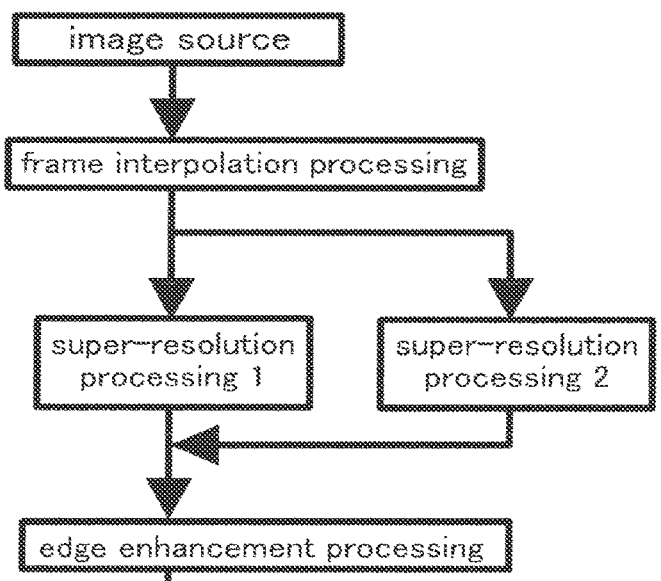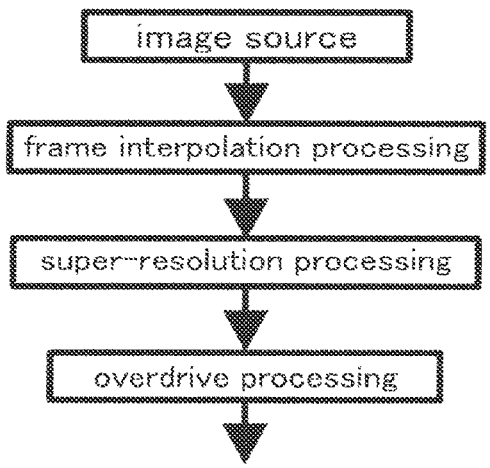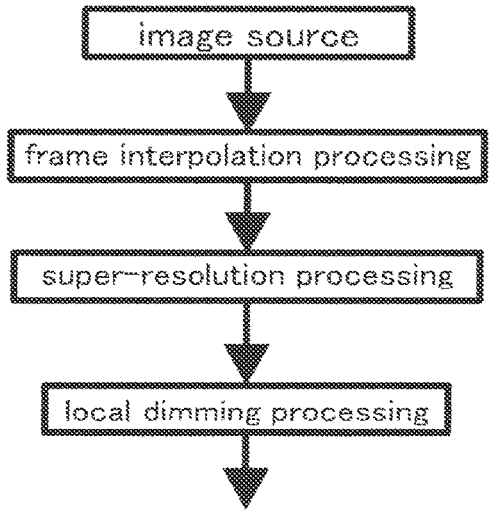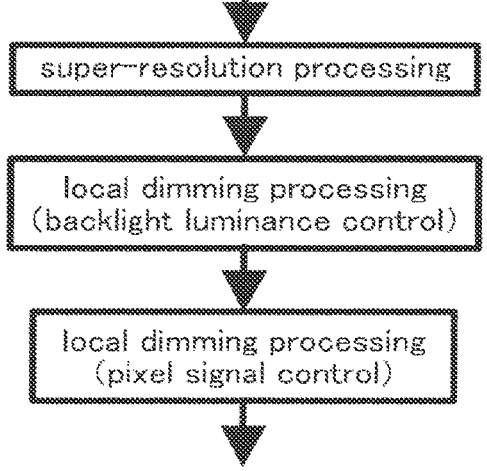

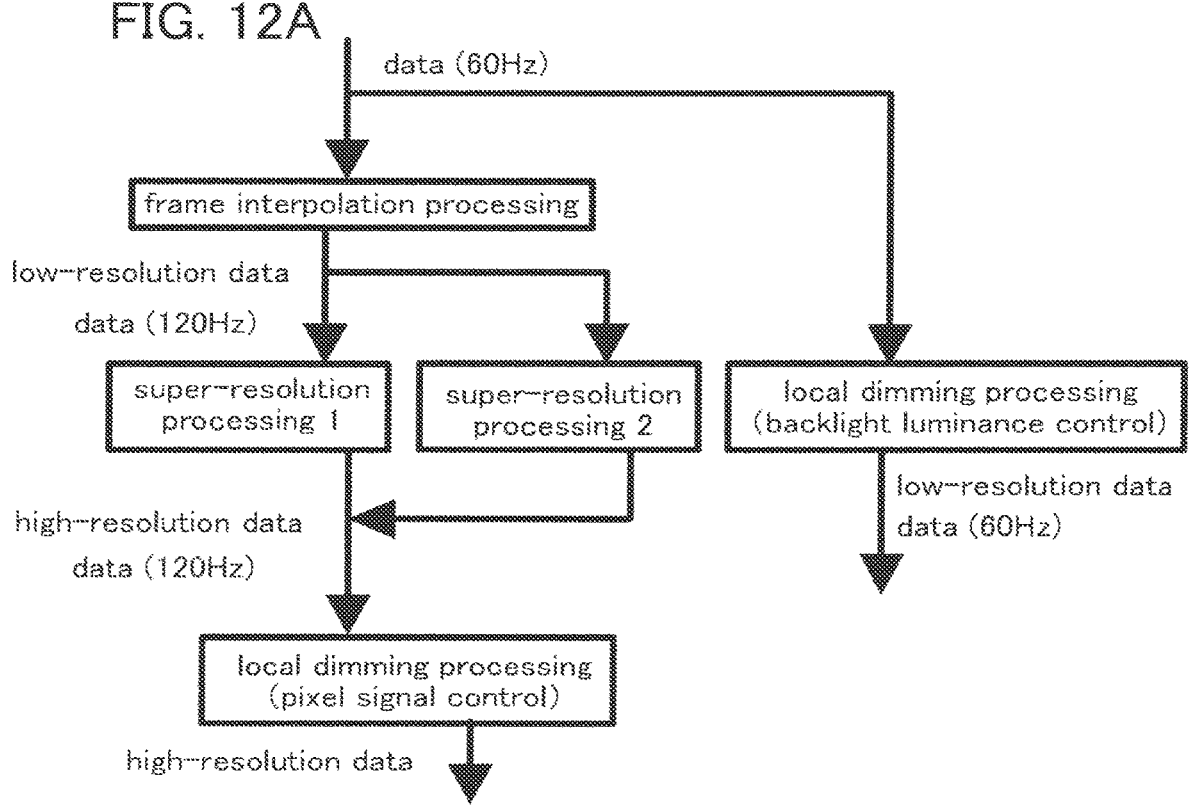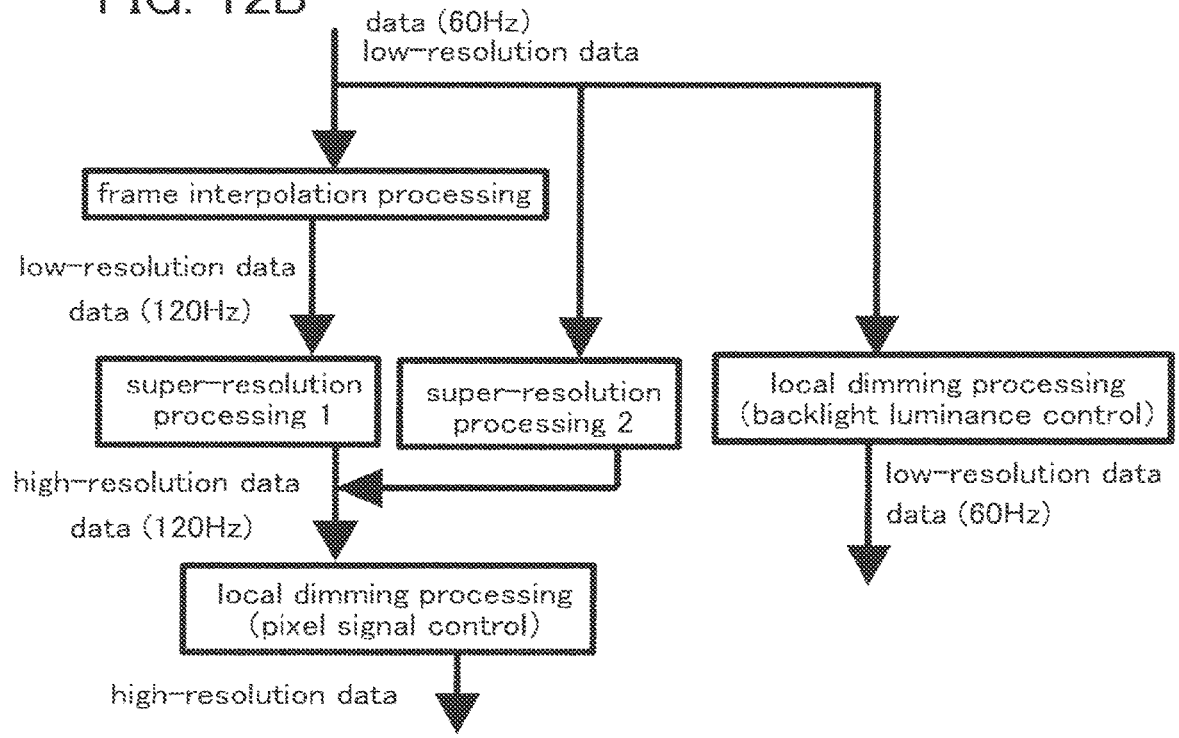

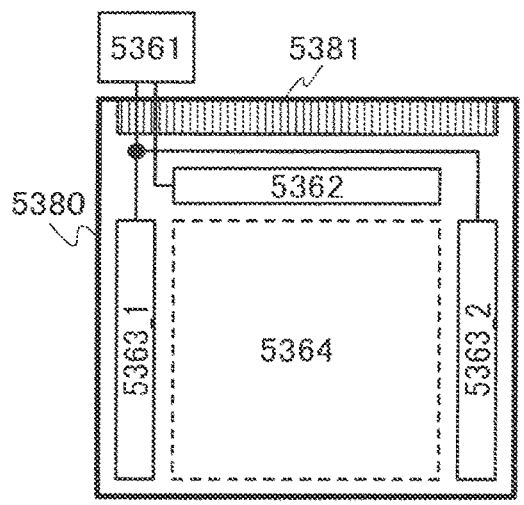
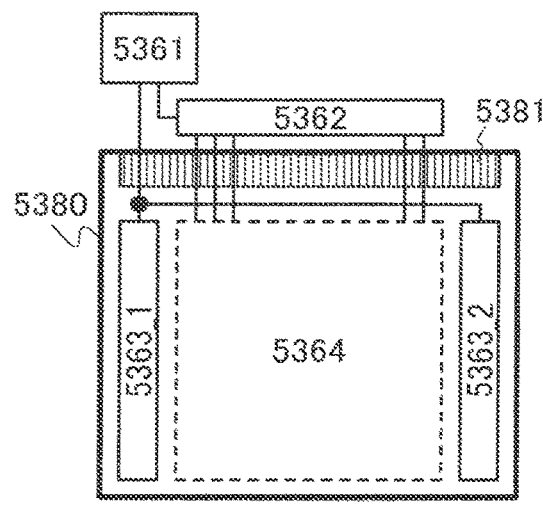
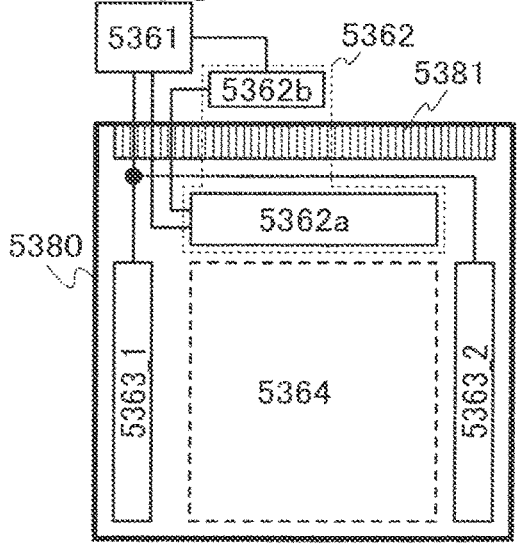
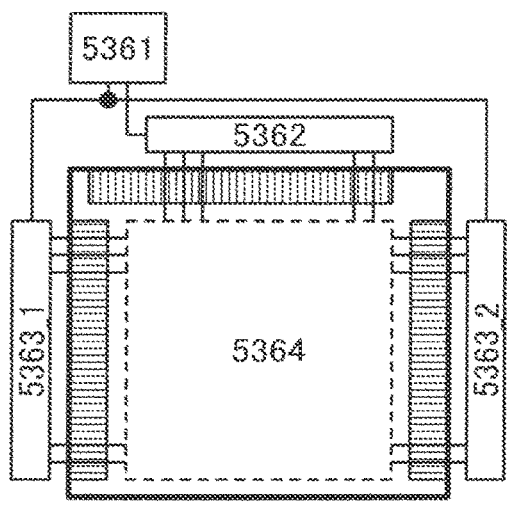
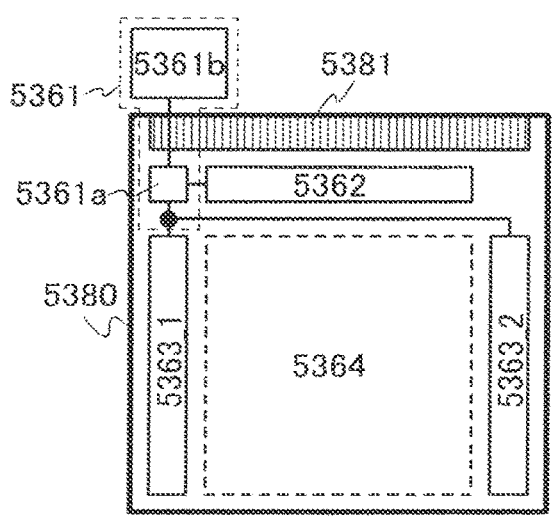

METHOD FOR DRIVING DISPLAY DEVICE

TECHNICAL FIELD

The present invention relates to display devices, liquid crystal display devices, semiconductor devices, production methods thereof, or methods for using the display devices, the liquid crystal display devices, or the semiconductor devices. In particular, the present invention relates to driving methods of display devices, liquid crystal display devices, semiconductor devices, or the like, or signal processing methods thereof.

BACKGROUND ART

In recent yeas, flat panel displays typified by liquid crystal displays have been widely used. In addition, flat panels have been further improved in many respects. One of specifications of flat panels is resolution (or the number of pixels). Resolution has also been drastically improved.

Therefore, a super-resolution processing technology, which is a technology for converting low-resolution images into high-resolution images, has been studied (see References 1 to 3).

REFERENCE

Reference 1: Japanese Published Patent Application No. 2008-160565

Reference 2: Japanese Published Patent Application No. 2008-085411

Reference 3: Japanese Published Patent Application No. 2008-252701

DISCLOSURE OF INVENTION

In liquid crystal displays, a variety of methods for improving image quality have been studied. Therefore, in flat panel displays typified by liquid crystal displays, in the case where processing for improving image quality is performed, a variety of problems may be caused. For example, any of the following problems may be caused; the decrease in image quality, impossibility of display of correct images, the increase in power consumption, the increase in noise, necessity of extra components, the increase in cost, the increase in the size of devices, the increase in the frames of display devices, the decrease in processing speed, the decrease in display speed, and the decrease in frame frequency.

From the above, it is an object of one embodiment of the present invention to provide a device having higher image quality, a driving method thereof, or a manufacturing method thereof. Alternatively, it is an object of one embodiment of the present invention to provide a device which displays a correct image, a driving method thereof, or a manufacturing method thereof. Alternatively, it is an object of one embodiment of the present invention to provide a device with low power consumption, a driving method thereof, or a manufacturing method thereof. Alternatively, it is an object of one embodiment of the present invention to provide a device with little noise, a driving method thereof, or a manufacturing method thereof. Alternatively, it is an object of one embodiment of the present invention to provide a device having fewer components, a driving method thereof, or a manufacturing method thereof. Alternatively, it is an object of one embodiment of the present invention to provide a device manufactured at low cost, a driving method thereof, or a manufacturing method thereof. Alternatively, it is an object of one embodiment of the present invention to provide a smaller device, a driving method thereof, or a manufacturing method thereof. Alternatively, it is an object of one embodiment of the present invention to provide a device with a narrow frame, a driving method thereof, or a manufacturing method thereof. Alternatively, it is an object of one embodiment of the present invention to provide a high-speed processing device, a driving method thereof, or a manufacturing method thereof. Alternatively, it is an object of one embodiment of the present invention to provide a device which performs display at high speed, a driving method thereof, or a manufacturing method thereof. Alternatively, it is an object of one embodiment of the present invention to provide a device whose frame frequency is not low, a driving method thereof, or a manufacturing method thereof. Alternatively, it is an object of one embodiment of the present invention to provide a device with fewer afterimages, a driving method thereof, or a manufacturing method thereof. Alternatively, it is an object of one embodiment of the present invention to provide a high-contrast device, a driving method thereof, or a manufacturing method thereof. Note that the description of these objects does not impede the existence of other objects. Note that in one embodiment of the present invention, there is no need to achieve all the objects.

After interpolation of frame data for displaying an image at higher frame frequency is performed, a low-resolution image is converted into a high-resolution image with a super-resolution processing technology. Then, image processing such as edge enhancement, data processing for local dimming (local luminance control) using a backlight, data processing for overdrive, or the like is performed.

Alternatively, interpolation of frame data for displaying an image at higher frame frequency is performed and a low-resolution image is converted into a high-resolution image with a super-resolution processing technology. Then, image processing such as edge enhancement, or interpolation of frame data for displaying an image at higher frame frequency are performed. After that, data processing for local dimming using a backlight, data processing for overdrive, or the like is performed.

Therefore, a method for driving a liquid crystal display device, which includes a first step of performing frame interpolation processing and a second step of performing super-resolution processing, is provided. The second step is performed after the first step.

Alternatively, a method for driving a liquid crystal display device, which includes a first step of performing frame interpolation processing and a second step of performing super-resolution processing, is provided. A period during which the first step and the second step are concurrently performed is provided.

Alternatively, a method for driving a liquid crystal display device, which includes a first step of performing frame interpolation processing, a second step of performing first super-resolution processing, and a third step of performing second super-resolution processing, is provided. The second step or the third step is performed after the first step.

Alternatively, a method for driving a liquid crystal display device, which includes a first step of performing frame interpolation processing, a second step of performing super-resolution processing, and a third step of performing local dimming processing, is provided. The second step is performed after the first step. The third step is performed after the second step.

Alternatively, a method for driving a liquid crystal display device, which includes a first step of performing frame interpolation processing, a second step of performing super-resolution processing, a third step of performing local dimming processing, and a fourth step of performing overdrive processing, is provided. The second step is performed after the first step. The third step is performed after the second step. The fourth step is performed after the third step.

Note that a variety of switches can be used as a switch. For example, an electrical switch, a mechanical switch, or the like can be used. That is, any element can be used as long as it can control a current flow, without limitation to a certain element. For example, a transistor (e.g., a bipolar transistor or a MOS transistor), a diode (e.g., a PN diode, a PIN diode, a Schottky diode, an MIM (metal insulator metal) diode, an MIS (metal insulator semiconductor) diode, or a diode-connected transistor), or the like can be used as a switch. Alternatively, a logic circuit in which such elements are combined can be used as a switch.

An example of a mechanical switch is a switch formed using a MEMS (micro electro mechanical system) technology, such as a digital micromirror device (DMD). Such a switch includes an electrode which can be moved mechanically, and operates by controlling conduction and non-conduction in accordance with movement of the electrode.

In the case of using a transistor as a switch, the polarity (conductivity type) of the transistor is not particularly limited to a certain type because it operates just as a switch. However, a transistor having polarity with smaller off-state current is preferably used when the amount of off-state current is to be suppressed. Examples of a transistor with smaller off-state current are a transistor provided with an LDD region, a transistor with a multi-gate structure, and the like. Further, an n-channel transistor is preferably used when a potential of a source terminal of the transistor which is operated as a switch is close to a potential of a low-potential-side power supply (e.g., Vss, GND, or 0 V). On the other hand, a p-channel transistor is preferably used when the potential of the source terminal is close to a potential of a high-potential-side power supply (e.g., Vdd). This is because the absolute value of gate-source voltage can be increased when the potential of the source terminal of the n-channel transistor is close to a potential of a low-potential-side power supply and when the potential of the source terminal of the p-channel transistor is close to a potential of a high-potential-side power supply, so that the transistor can be more accurately operated as a switch. This is also because the transistor does not often perform source follower operation, so that reduction in output voltage does not often occur.

Note that a CMOS switch may be used as a switch by using both an n-channel transistor and a p-channel transistor. By using a CMOS switch, the switch can be more accurately operated as a switch because current can flow when either the p-channel transistor or the n-channel transistor is turned on. For example, voltage can be appropriately output regardless of whether voltage of an input signal to the switch is high or low. In addition, since the voltage amplitude value of a signal for turning on or off the switch can be made smaller, power consumption can be reduced.

Note that when a transistor is used as a switch, the switch includes an input terminal (one of a source terminal and a drain terminal), an output terminal (the other of the source terminal and the drain terminal), and a terminal for controlling conduction (a gate terminal). On the other hand, when a diode is used as a switch, the switch does not include a terminal for controlling conduction in some cases. Therefore, when a diode is used as a switch, the number of wirings for controlling terminals can be further reduced as compared to the case of using a transistor.

Note that when it is explicitly described that "A and B are connected", the case where A and B are electrically connected, the case where A and B are functionally connected, and the case where A and B are directly connected are included therein. Here, each of A and B is an object (e.g., a device, an element, a circuit, a wiring, an electrode, a terminal, a conductive film, or a layer). Accordingly, another element may be interposed between elements having a connection relation illustrated in drawings and texts, without limitation to a predetermined connection relation, for example, the connection relation illustrated in the drawings and the texts.

For example, in the case where A and B are electrically connected, one or more elements which enable electrical connection between A and B (e.g., a switch, a transistor, a capacitor, an inductor, a resistor, and/or a diode) may be connected between A and B. Alternatively, in the case where A and B are functionally connected, one or more circuits which enable functional connection between A and B (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a dc-dc converter, a step-up dc-dc converter, or a step-down de-de converter) or a level shifter circuit for changing a potential level of a signal; a voltage source; a current source; a switching circuit; an amplifier circuit such as a circuit which can increase signal amplitude, the amount of current, or the like, an operational amplifier, a differential amplifier circuit, a source follower circuit, or a buffer circuit; a signal generation circuit; a memory circuit; and/or a control circuit) may be connected between A and B. For example, in the case where a signal output from A is transmitted to B even when another circuit is interposed between A and B, A and B are functionally connected.

Note that when it is explicitly described that "A and B are electrically connected", the case where A and B are electrically connected (i.e., the case where A and B are connected with another element or another circuit interposed therebetween), the case where A and B are functionally connected (i.e., the case where A and B are functionally connected with another circuit interposed therebetween), and the case where A and B are directly connected (i.e., the case where A and B are connected without another element or another circuit interposed therebetween) are included therein. That is, when it is explicitly described that "A and B are electrically connected", the description is the same as the case where it is explicitly only described that "A and B are connected".

Note that a display element, a display device which is a device including a display element, a light-emitting element, and a light-emitting device which is a device including a light-emitting element can employ various modes and can include various elements. For example, a display medium, whose contrast, luminance, reflectivity, transmittance, or the like changes by electromagnetic action, such as an EL (electroluminescence) element (e.g., an EL element including organic and inorganic materials, an organic EL element, or an inorganic EL element), an LED (e.g., a white LED, a red LED, a green LED, or a blue LED), a transistor (a transistor which emits light depending on the amount of current), an electron emitter, a liquid crystal element, electronic ink, an electrophoretic element, a grating light valve (GLV), a plasma display panel (PDP), a digital micromirror device (DMD), a piezoelectric ceramic display, or a carbon nanotube can be used as a display element, a display device, a light-emitting element, or a light-emitting device. Note that display devices having EL elements include an EL display; display devices having electron emitters include a field emission display (FED), an SED-type flat panel display (SED: surface-conduction electron-emitter display), and the like; display devices having liquid crystal elements include a liquid crystal display (e.g., a transmissive liquid crystal display, a transflective liquid crystal display, a reflective liquid crystal display, a direct-view liquid crystal display, or a projection liquid crystal display); display devices having electronic ink or electrophoretic elements include electronic paper.

Note that an EL element is an element including an anode, a cathode, and an EL layer interposed between the anode and the cathode. Note that as an EL layer, a layer utilizing light emission (fluorescence) from a singlet exciton, a layer utilizing light emission (phosphorescence) from a triplet exciton, a layer utilizing light emission (fluorescene) from a singlet exciton and light emission (phosphorescence) from a triplet exciton, a layer formed using an organic material, a layer formed using an inorganic material, a layer formed using an organic material and an inorganic material, a layer including a high-molecular material, a layer including a low-molecular material, a layer including a high-molecular material and a low-molecular material, or the like can be used. Note that the present invention is not limited to this, and a variety of EL elements can be used as an EL element.

Note that an electron emitter is an element in which electrons are extracted by high electric field concentration on a cathode. For example, as an electron emitter, a Spindt type, a carbon nanotube (CNT) type, a metal-insulator-metal (MIM) type in which a metal, an insulator, and a metal are stacked, a metal-insulator-semiconductor (MIS) type in which a metal, an insulator, and a semiconductor are stacked, a MOS type, a silicon type, a thin film diode type, a diamond type, a thin film type in which a metal, an insulator, a semiconductor, and a metal are stacked, a HEED type, an EL type, a porous silicon type, a surface-conduction (SCE) type, or the like can be used. Note that the present invention is not limited to this, and a variety of elements can be used as an electron emitter.

Note that a liquid crystal element is an element which controls transmission or non-transmission of light by optical modulation action of liquid crystals and includes a pair of electrodes and liquid crystals. Note that the optical modulation action of liquid crystals is controlled by an electric field applied to the liquid crystals (including a horizontal electric field, a vertical electric field, and a diagonal electric field). Note that the following can be used for a liquid crystal element: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a plasma addressed liquid crystal (PALC), a banana-shaped liquid crystal, and the like. In addition, the following can be used as a diving method of a liquid crystal: a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, a blue phase mode, and the like. Note that the present invention is not limited to this, and a variety of liquid crystal elements and driving methods thereof can be used as a liquid crystal element and a driving method thereof.

Note that electronic paper corresponds to a device for displaying images by molecules (a device which utilizes optical anisotropy, dye molecular orientation, or the like), a device for displaying images by particles (a device which utilizes electrophoresis, particle movement, particle rotation, phase change, or the like), a device for displaying images by movement of one end of a film, a device for displaying images by using coloring properties or phase change of molecules, a device for displaying images by using optical absorption by molecules, or a device for displaying images by using self-light emission by combination of electrons and holes. For example, the following can be used for a display method of electronic paper: microcapsule electrophoresis, horizontal electrophoresis, vertical electrophoresis, a spherical twisting ball, a magnetic twisting ball, a columnar twisting ball, a charged toner, an electron powder and granular material, magnetic electrophoresis, a magnetic thermosensitive type, electro wetting, light-scattering (transparent-opaque change), a cholesteric liquid crystal and a photoconductive layer, a cholesteric liquid crystal device, a bistable nematic liquid crystal, a ferroelectric liquid crystal, a liquid crystal dispersed type with a dichroic dye, a movable film, coloring and decoloring properties of a leuco dye, photochromism, electrochromism, electrodeposition, flexible organic EL, and the like. Note that the present invention is not limited to this, and a variety of electronic paper and display methods thereof can be used as electronic paper and a driving method thereof. Here, by using microcapsule electrophoresis, defects of electrophoresis, which are aggregation and precipitation of phoresis particles, can be solved. Electron powder and granular material has advantages such as high-speed response, high reflectivity, wide viewing angle, low power consumption, and memory properties.

Note that a plasma display panel has a structure where a substrate having a surface provided with an electrode faces with a substrate having a surface provided with an electrode and a minute groove in which a phosphor layer is formed at a narrow interval and a rare gas is sealed therein. Alternatively, the plasma display panel can have a structure where a plasma tube is sandwiched between film-form electrodes from the top and the bottom. The plasma tube is formed by sealing a discharge gas, RGB fluorescent materials, and the like inside a glass tube. Note that the plasma display panel can perform display by application of voltage between the electrodes to generate an ultraviolet ray so that a phosphor emits light. Note that the plasma display panel may be a DC-type PDP or an AC-type PDP. Here, as a driving method of the plasma display panel, AWS (address while sustain) driving, ADS (address display separated) driving in which a subframe is divided into a reset period, an address period, and a sustain period, CLEAR (high-contrast and low energy address and reduction of false contour sequence) driving, ALIS (alternate lighting of surfaces) method, TERES (technology of reciprocal sustainer) driving, or the like can be used. Note that the present invention is not limited to this, and a variety of driving methods can be used as a driving method of a plasma display panel.

Note that electroluminescence, a cold cathode fluorescent lamp, a hot cathode fluorescent lamp, an LED, a laser light source, a mercury lamp, or the like can be used as a light source of a display device in which a light source is needed, such as a liquid crystal display (e.g., a transmissive liquid crystal display, a transflective liquid crystal display, a reflective liquid crystal display, a diet-view liquid crystal display, or a projection liquid crystal display), a display device including a grating light valve (GLV), or a display device including a digital micromirror device (DMD). Note that the present invention is not limited to this, and a variety of light sources can be used as a light source.

Note that a variety of transistors can be used as a transistor, without limitation to a certain type. For example, a thin film transistor (TFT) including a non-single-crystal semiconductor film typified by amorphous silicon, polycrystalline silicon, microcrystalline (also referred to as microcrystal, nanocrystal, or semi-amorphous) silicon, or the like can be used. In the case of using the TFT, there are various advantages. For example, since the TFT can be formed at temperature which is lower than that of the case of using single crystal silicon, manufacturing cost can be reduced or a manufacturing apparatus can be made larger. Since the manufacturing apparatus can be made larger, the TFT can be formed using a large substrate. Therefore, many display devices can be formed at the same time at low cost. In addition, since the manufacturing temperature is low, a substrate having low heat resistance can be used. Therefore, the transistor can be formed using a light-transmitting substrate. Further, transmission of light in a display element can be controlled by using the transistor formed using the light-transmitting substrate. Alternatively, part of a film included in the transistor can transmit light because the thickness of the transistor is small. Therefore, the aperture ratio can be improved.

Note that by using a catalyst (e.g., nickel) in the case of forming polycrystalline silicon, crystallinity can be further improved and a transistor having excellent electrical characteristics can be formed. Accordingly, a gate driver circuit (e.g., a scan line driver circuit), a source driver circuit (e.g., a signal line driver circuit), and/or a signal processing circuit (e.g., a signal generation circuit, a gamma correction circuit, or a DA converter circuit) can be formed using the same substrate as a pixel portion.

Note that by using a catalyst (e.g., nickel) in the case of forming microcrystalline silicon, crystallinity can be further improved and a transistor having excellent electrical characteristics can be formed. In this case, crystallinity can be improved by just performing heat treatment without performing laser irradiation. Accordingly, a gate driver circuit (e.g., a scan line driver circuit) and part of a source driver circuit (e.g., an analog switch) can be formed using the same substrate as a pixel portion. In addition, in the case of not performing laser irradiation for crystallization, unevenness in crystallinity of silicon can be suppressed. Therefore, high-quality images can be displayed.

Note that polycrystalline silicon and microcrystalline silicon can be formed without using a catalyst (e.g., nickel).

Note that it is preferable that crystallinity of silicon be improved to polycrystal, microcrystal, or the like in the whole panel; however, the present invention is not limited to this. Crystallinity of silicon may be improved only in part of the panel. Selective improvement in crystallinity is possible by selective laser irradiation or the like. For example, only a peripheral driver circuit region excluding pixels may be irradiated with laser light. Alternatively, only a region of a gate driver circuit, a source driver circuit, or the like may be irradiated with laser light. Alternatively, only part of a source driver circuit (e.g., an analog switch) may be irradiated with laser light. Accordingly, crystallinity of silicon can be improved only in a region in which a circuit needs to be operated at high speed. Since a pixel region is not particularly needed to be operated at high speed, even if crystallinity is not improved, the pixel circuit can be operated without problems. Since a region whose crystallinity is improved is small, manufacturing steps can be decreased, throughput can be increased, and manufacturing cost can be reduced. Since the number of necessary manufacturing apparatus is small, manufacturing cost can be reduced.

A transistor can be formed using a semiconductor substrate, an SOI substrate, or the like. Thus, a transistor with fewer variations in characteristics, sizes, shapes, or the like, with high current supply capability, and with a small size can be formed. By using such a transistor, power consumption of a circuit can be reduced or a circuit can be highly integrated.

A transistor including a compound semiconductor or an oxide semiconductor, such as ZnO, a-InGaZnO, SiGe, GaAs, IZO (indium zinc oxide), ITO (indium tin oxide), SnO, TiO, or AlZnSnO (AZTO), a thin film transistor obtained by thinning such a compound semiconductor or an oxide semiconductor, or the like can be used. Thus, manufacturing temperature can be lowered and for example, such a transistor can be formed at room temperature. Accordingly, the transistor can be formed directly on a substrate having low heat resistance, such as a plastic substrate or a film substrate. Note that such a compound semiconductor or an oxide semiconductor can be used not only for a channel portion of the transistor but also for other applications. For example, such a compound semiconductor or an oxide semiconductor can be used for a resistor, a pixel electrode, or a light-transmitting electrode. Further, since such an element can be formed at the same time as the transistor, cost can be reduced.

A transistor or the like formed by an inkjet method or a printing method can be used. Thus, a transistor can be formed at room temperature, can be formed at a low vacuum, or can be formed using a large substrate. Since the transistor can be formed without using a mask (reticle), the layout of the transistor can be easily changed. Further, since it is not necessary to use a resist, material cost is reduced and the number of steps can be reduced. Furthermore, since a film is formed only in a necessary portion, a material is not wasted as compared to a manufacturing method by which etching is performed after the film is formed over the entire surface, so that cost can be reduced.

A transistor or the like including an organic semiconductor or a carbon nanotube can be used. Thus, such a transistor can be formed over a flexible substrate. A semiconductor device formed using such a substrate can resist shocks.

Further, transistors with a variety of structures can be used. For example, a MOS transistor, a junction transistor, a bipolar transistor, or the like can be used as a transistor. By using a MOS transistor, the size of the transistor can be reduced. Thus, a large number of transistors can be mounted. By using a bipolar transistor, large current can flow. Thus, a circuit can be operated at high speed.

Note that a MOS transistor, a bipolar transistor, and the like may be formed over one substrate. Thus, reduction in power consumption, reduction in size, high-speed operation, and the like can be achieved.

Furthermore, a variety of transistors can be used.

Note that a transistor can be formed using a variety of substrates, without limitation to a certain type. As the substrate, a single crystal substrate (e.g., a silicon & substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, or the like can be used, for example. As a glass substrate, a barium borosilicate glass substrate, an aluminoborosilicate glass substrate, or the like can be used, for example. For a flexible substrate, a flexible synthetic resin such as plastics typified by polyethylene terephthalate (PET), polyethylene naphthalate (PEN), and polyether sulfone (PES), or acrylic can be used, for example. Alternatively, an attachment film (formed using polypropylene, polyester, vinyl, polyvinyl fluoride, polyvinyl chloride, or the like), paper of a fibrous material, a base material film (formed using polyester, polyamide, polyimide, an inorganic vapor deposition film, paper, or the like), or the like can be used. Alternatively, the transistor may be formed using one substrate, and then, the transistor may be transferred to another substrate. A single crystal substrate, an SOI substrate, a glass substrate, a quartz substrate, a plastic substrate, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, a stainless steel substrate, a substrate including a stainless steel foil, or the like can be used as a substrate to which the transistor is transferred. Alternatively, a skin (e.g., epidermis or corium) or hypodermal tissue of an animal such as a human being can be used as a substrate to which the transistor is transferred. Alternatively, the transistor may be formed using one substrate and the substrate may be thinned by polishing. A single crystal substrate, an SOI substrate, a glass substrate, a quartz substrate, a plastic substrate, a stainless steel substrate, a substrate including a stainless steel foil, or the like can be used as a substrate to be polished. By using such a substrate, a transistor with excellent properties or a transistor with low power consumption can be formed, a device with high durability and high heat resistance can be provided, or reduction in weight or thickness can be achieved.

Note that the structure of a transistor can be a variety of structures, without limitation to a certain structure. For example, a multi-gate structure having two or more gate electrodes can be used. By using the multi-gate structure, a structure where a plurality of transistors are connected in series is provided because channel regions are connected in series. With the multi-gate structure, the amount of off-state current can be reduced and the withstand voltage of the transistor can be increased (reliability can be improved). Further, with the multi-gate structure, drain-source current does not fluctuate very much even when drain-source voltage fluctuates when the transistor operates in a saturation region, so that a flat slope of voltage-current characteristics can be obtained. By utilizing the flat slope of the voltage-current characteristics, an ideal current source circuit or an active load having an extremely large resistance value can be realized. Accordingly, a differential circuit or a current mirror circuit having excellent properties can be realized.

As another example, a structure where gate electrodes are formed above and below a channel can be used. By using the structure where gate electrodes are formed above and below the channel, a channel region is increased, so that the amount of current can be increased. Alternatively, by using the structure where gate electrodes are formed above and below the channel, a depletion layer can be easily formed, so that subthreshold swing can be improved. Note that when the gate electrodes are formed above and below the channel, a structure where a plurality of transistors are connected in parallel is provided.

A structure where a gate electrode is formed above a channel region, a structure where a gate electrode is formed below a channel region, a staggered structure, an inverted staggered structure, a structure where a channel region is divided into a plurality of regions, or a structure where channel regions are connected in parallel or in series can be used. Alternatively, a structure where a source electrode or a drain electrode overlaps with a channel region (or part of it) can be used. By using the structure where the source electrode or the drain electrode overlaps with the channel region (or part of it), unstable operation due to accumulation of electric charge in part of the channel region can be prevented. Alternatively, a structure where an LDD region is provided can be used. By providing the LDD region, the amount of off-state current can be reduced or the withstand voltage of the transistor can be increased (reliability can be improved). Further, by providing the LDD region, drain-source current does not fluctuate very much even when drain-source voltage fluctuates when the transistor operates in the saturation region, so that the inclination of a voltage-current diagram can be flattened.

Note that a variety of transistors can be used as a transistor, and the transistor can be formed using a variety of substrates. Accordingly, all the circuits that am necessary to realize a predetermined function can be formed using the same substrate. For example, all the circuits that are necessary to realize the predetermined function can be formed using a glass substrate, a plastic substrate, a single crystal substrate, an SOI substrate, or any other substrate. When all the circuits that are necessary to realize the predetermined function are formed using the same substrate, cost can be reduced by reduction in the number of components or reliability can be improved by reduction in the number of connections to circuit components. Alternatively, some of the circuits which are necessary to realize the predetermined function can be formed using one substrate and some of the circuits which are necessary to realize the predetermined function can be formed using another substrate. That is, not all the circuits that are necessary to realize the predetermined function are required to be formed using the same substrate. For example, some of the circuits which are necessary to realize the predetermined function can be formed by transistors using a glass substrate and some of the circuits which are necessary to realize the predetermined function can be formed using a single crystal substrate, so that an IC chip formed by a transistor using the single crystal substrate can be connected to the glass substrate by COG (chip on glass) and the IC chip may be provided over the glass substrate. Alternatively, the IC chip can be connected to the glass substrate by TAB (tape automated bonding) or a printed wiring board. When some of the circuits are formed using the same substrate in this manner, cost can be reduced by reduction in the number of components or reliability can be improved by reduction in the number of connections to circuit components. Alternatively, when circuits with high driving voltage and high driving frequency, which consume large power, are formed using a single crystal substrate instead of forming such circuits using the same substrate, and an IC chip formed by the circuits is used, for example, the increase in power consumption can be prevented.

Note that one pixel corresponds to the minimum unit of an image. Accordingly, in the case of a full color display device having color elements of R (red), G (green), and B (blue), one pixel includes a dot of the color element of R, a dot of the color element of G, and a dot of the color element of B. Note that the color elements are not limited to three colors, and color elements of more than three colors may be used or a color other than RGB may be used. For example, RGBW (W corresponds to white) can be used by adding white. Alternatively, one or more colors of yellow, cyan, magenta, emerald green, vermilion, and the like may be added to RGB, for example. Alternatively, a color which is similar to at least one of R, G, and B may be added to RGB, for example. For example, R, G, B1, and B2 may be used. Although both B1 and B2 are blue, they have slightly different wavelengths. In a similar manner, R1, R2, G, and B may be used. By using such color elements, display which is closer to the real object can be performed or power consumption can be reduced. Note that one pixel may include a plurality of dots of color elements of the same color. In this case, the plurality of color elements may have different sizes of regions which contribute to display. Alternatively, by separately controlling the plurality of dots of color elements of the same color, gradation may be expressed. This method is referred to as an area-ratio gray scale method. Alternatively, by using the plurality of dots of color elements of the same color, signals supplied to each of the plurality of dots may be slightly varied so that the viewing angle is widened. That is, potentials of pixel electrodes included in the plurality of color elements of the same color may be different from each other. Accordingly, voltage applied to liquid crystal molecules are varied depending on the pixel electrodes. Therefore, the viewing angle can be widened.

Note that in the case of illustrating a circuit diagram, for example, one pixel corresponds to one element whose brightness can be controlled in some cases. Therefore, in that case, one pixel corresponds to one color element and brightness is expressed with the one color element. Accordingly, in that case, in the case of a color display device having color elements of R (red), G (green), and B (blue), the minimum unit of an image includes three pixels of an R pixel, a G pixel, and a B pixel in some cases.

Note that pixels am provided (arranged) in matrix in some cases. Here, description that pixels are provided (arranged) in matrix includes the case where the pixels are arranged in a straight line and the case where the pixels are arranged in a jagged line, in a longitudinal direction or a lateral direction. Thus, for example, in the case of performing full color display with three color elements (e.g., RGB), the following cases are included: the case where the pixels am arranged in stripes and the case where dots of the three color elements are arranged in a delta pattern. In addition, the case is also included in which dots of the three color elements are provided in Bayer arrangement. Note that the size of display regions may be different between dots of color elements. Thus, power consumption can be reduced or the life of a display element can be prolonged.

Note that an active matrix method in which an active element is included in a pixel or a passive matrix method in which an active element is not included in a pixel can be used.

In an active matrix method, as an active element (a non-linear element), not only a transistor but also a variety of active elements (non-linear elements) can be used. For example, an MIM (metal insulator metal), a TFD (thin film diode), or the like can also be used. Since such an element has a small number of manufacturing steps, manufacturing cost can be reduced or yield can be improved. Further, since the size of the element is small, the aperture ratio can be improved, so that power consumption can be reduced or higher luminance can be achieved.

Note that as a method other than the active matrix method, a passive matrix method in which an active element (a non-linear element) is not used can be used. Since an active element (a non-linear element) is not used, the number of manufacturing steps is small, so that manufacturing cost can be reduced or yield can be improved. Further, since an active element (a non-linear element) is not used, the aperture ratio can be improved, so that power consumption can be reduced or higher luminance can be achieved.

Note that a transistor is an element having at least three terminals of a gate, a drain, and a source. The transistor has a channel region between a drain region and a source region, and current can flow through the drain region, the channel region, and the source region. Here, since the source and the drain of the transistor change depending on the structure, the operating condition, and the like of the transistor, it is difficult to define which is a source or a drain. Thus, a region which serves as a source and a drain is not referred to as a source or a drain in some cases. In that case, one of the source and the drain might be referred to as a first terminal and the other of the source and the drain might be referred to as a second terminal, for example. Alternatively, one of the source and the drain might be referred to as a first electrode and the other of the source and the drain might be referred to as a second electrode. Alternatively, one of the source and the drain might be referred to as a first region and the other of the source and the drain might be referred to as a second region.

Note that a transistor may be an element having at least three terminals of a base, an emitter, and a collector. In this case, in a similar manner, one of the emitter and the collector might be referred to as a first terminal and the other of the emitter and the collector might be referred to as a second terminal.

Note that a semiconductor device corresponds to a device having a circuit including a semiconductor element (e.g., a transistor, a diode, or a thyristor). The semiconductor device may also correspond to all devices that can function by utilizing semiconductor characteristics. In addition, the semiconductor device corresponds to a device having a semiconductor material.

Note that a display device corresponds to a device having a display element. The display device may include a plurality of pixels each having a display element. Note that that the display device may include a peripheral driver circuit for driving the plurality of pixels. The peripheral driver circuit for driving the plurality of pixels may be formed using the same substrate as the plurality of pixels. The display device may include a peripheral driver circuit provided over a substrate by wire bonding or bump bonding, namely, an IC chip connected by chip on glass (COG) or an IC chip connected by TAB or the like. The display device may include a flexible printed circuit (FPC) to which an IC chip, a resistor, a capacitor, an inductor, a transistor, or the like is attached. Note that the display device may include a printed wiring board (PWB) which is connected through a flexible printed circuit (FPC) and to which an IC chip, a resistor, a capacitor, an inductor, a transistor, or the like is attached. The display device may include an optical sheet such as a polarizing plate or a retardation plate. The display device may include a lighting device, a housing, an audio input and output device, an optical sensor, or the like.

Note that a lighting device may include a backlight unit, a light guide plate, a prism sheet, a diffusion sheet, a reflective sheet, a light source (e.g., an LED or a cold cathode fluorescent lamp), a cooling device (e.g., a water cooling device or an air cooling device), or the like.

Note that a light-emitting device corresponds to a device having a light-emitting element or the like. In the case where a light-emitting device includes a light-emitting element as a display element, the light-emitting device is one of specific examples of a display device.

Note that a reflective device corresponds to a device having a light-reflective element, a light diffraction element, light-reflective electrode, or the like.

Note that a liquid crystal display device corresponds to a display device including a liquid crystal element. Liquid crystal display devices include a direct-view liquid crystal display, a projection liquid crystal display, a transmissive liquid crystal display, a reflective liquid crystal display, a transflective liquid crystal display, and the like.

Note that a driving device corresponds to a device having a semiconductor element, an electric circuit, or an electronic circuit. For example, a transistor which controls input of signals from a source signal line to pixels (also referred to as a selection transistor, a switching transistor, or the like), a transistor which supplies voltage or current to a pixel electrode, a transistor which supplies voltage or current to a light-emitting element, and the like are examples of the driving device. A circuit which supplies signals to a gate signal line (also referred to as a gate driver, a gate line driver circuit, or the like), a circuit which supplies signals to a source signal line (also referred to as a source driver, a source line driver circuit, or the like), and the like are also examples of the driving device.

Note that a display device, a semiconductor device, a lighting device, a cooling device, a light-emitting device, a reflective device, a driving device, and the like overlap with each other in some cases. For example, a display device includes a semiconductor device and a light-emitting device in some cases. Alternatively, a semiconductor device includes a display device and a driving device in some cases.

Note that when it is explicitly described that "B is formed on A" or "B is formed over A", it does not necessarily mean that B is formed in direct contact with A. The description includes the case where A and B are not in direct contact with each other, i.e., the case where another object is interposed between A and B. Here, each of A and B is an object (e.g., a device, an element, a circuit, a wiring, an electrode, a terminal, a conductive film, or a layer).

Accordingly, for example, when it is explicitly described that "a layer B is formed on (or over) a layer A", it includes both the case where the layer B is formed in direct contact with the layer A, and the case where another layer (e.g., a layer C or a layer D) is formed in direct contact with the layer A and the layer B is formed in direct contact with the layer C or the layer D. Note that another layer (e.g., a layer C or a layer D) may be a single layer or a plurality of layers.

In a similar manner, when it is explicitly described that "B is formed above A", it does not necessarily mean that B is formed in direct contact with A, and another object may be interposed therebetween. Thus, for example, when it is described that "a layer B is formed above a layer A", it includes both the case where the layer B is formed in direct contact with the layer A, and the case where another layer (e.g., a layer C or a layer D) is formed in direct contact with the layer A and the layer B is formed in direct contact with the layer C or the layer D. Note that another layer (e.g., a layer C or a layer D) may be a single layer or a plurality of layers.

Note that when it is explicitly described that "B is formed on A", "B is formed over A", or "B is formed above A", it includes the case where B is formed obliquely over/above A.

Note that the same can be said when it is described that "B is formed under A" or "B is formed below A".

Note that when an object is explicitly described in a singular form, the object is preferably singular. Note that the present invention is not limited to this, and the object can be plural. In a similar manner, when an object is explicitly described in a plural form, the object is preferably plural. Note that the present invention is not limited to this, and the object can be singular.

Note that size, the thickness of layers, or regions in the drawings are exaggerated for simplicity in some cases. Thus, the embodiments of the present invention are not limited to such scales illustrated in the drawings.

Note that the drawings are perspective views of ideal examples, and shapes or values are not limited to those illustrated in the drawings. For example, the following can be included: variation in shape due to a manufacturing technique; variation in shape due to an error; variation in signal, voltage, or current due to noise; variation in signal, voltage, or current due to a difference in timing: or the like.

Note that technical terms are used in order to describe a specific embodiment, example, or the like in many cases. However, one embodiment of the present invention should not be construed as being limited by the technical terms.

Note that terms which are not defined (including terms used for science and technology, such as technical terms or academic parlance) can be used as terms which have meaning equal to general meaning that an ordinary person skilled in the art understands. It is preferable that terms defined by dictionaries or the like be construed as consistent meaning with the background of related art.

Note that terms such as "first", "second", "third", and the like are used for distinguishing various elements, members, regions, layers, and areas from others. Therefore, the terms such as "first", "second", "third", and the like do not limit the number of the elements, members, regions, layers, areas, or the like. Further, for example, "first" can be replaced with "second", "third", or the like.

Note that terms for describing spatial arrangement, such as "over", "above", "under", "below", "laterally", "right", "left", "obliquely", "behind", "front", "inside", "outside", and "in" are often used for briefly showing a relationship between an element and another element or between a feature and another feature with reference to a diagram. Note that the embodiments of the present invention are not limited to this, and such terms for describing spatial arrangement can indicate not only the direction illustrated in a diagram but also another direction. For example, when it is explicitly described that "B is over A", it does not necessarily mean that B is placed over A, and can include the case where B is placed under A because a device in a diagram can be inverted or rotated by 180°. Accordingly, "over" can refer to the direction described by "under" in addition to the direction described by "over" Note that the embodiments of the present invention are not limited to this, and "over" can refer to any of the other directions described by "laterally", "right", "left", "obliquely", "behind", "front", "inside", "outside", and "in" in addition to the directions described by "over" and "under" because the device in the diagram can be rotated in a variety of directions. That is, the terms for describing spatial arrangement can be construed adequately depending on the situation.

According to one embodiment of the present invention, image quality can be improved.

BRIEF DESCRIPTION OF DRAWINGS

In the accompanying drawings:

FIGS. 3A to 3D illustrate flows according to one example of the embodiment;

FIGS. 7A to 7E illustrate flows according to one example of an embodiment;

FIGS. 12A and 12B illustrate flows according to one example of the embodiment;

FIGS. 20A to 20E illustrate structures of display devices according to one example of the embodiment;

BEST MODE FOR CARRYING OUT THE INVENTION

Figure 1A:
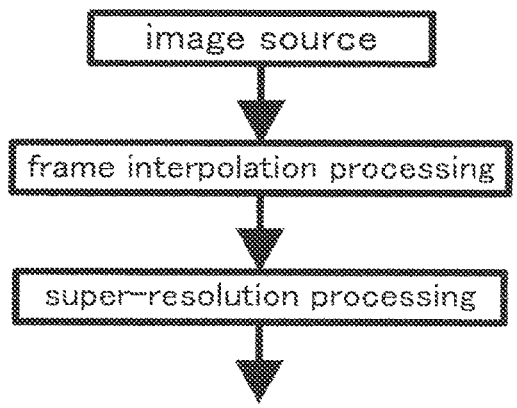
FIGS. 1A to 1C illustrate flows according to one example of an embodiment.

Hereinafter, embodiments will be described with reference to the drawings. Note that the embodiments can be implemented in various different ways and it will be readily appreciated by those skilled in the art that modes and details of the embodiments can be changed in various ways without departing from the spirit and scope of the present invention. Therefore, the present invention should not be construed as being limited to the following description of the embodiments. Note that in structures described below, the same portions or portions having similar functions are denoted by common reference numerals in different drawings, and description thereof is not repeated.

Note that a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in one or a plurality of different embodiments, much more diagrams can be formed.

Note that in a diagram or a text described in one embodiment, part of the diagram or the text is taken out, and one embodiment of the invention can be constituted. Thus, in the case where a diagram or a text related to a certain portion is described, the context taken out from part of the diagram or the text is also disclosed as one embodiment of the invention, and one embodiment of the invention can be constituted. Therefore, for example, in a diagram (e.g., a cross-sectional view, a plan view, a circuit diagram, a block diagram, a flow chart, a process diagram, a perspective view, a cubic diagram, a layout diagram, a timing chart, a structure diagram, a schematic view, a graph, a list, a ray diagram, a vector diagram, a phase diagram, a waveform chart, a photograph, or a chemical formula) or a text in which one or more active elements (e.g., transistors or diodes), wirings, passive elements (e.g., capacitors or resistors), conductive layers, insulating layers, semiconductor layers, organic materials, inorganic materials, components, substrates, modules, devices, solids, liquids, gases, operating methods, manufacturing methods, or the like are described, part of the diagram or the text is taken out, and one embodiment of the invention can be constituted. For example, M pieces of circuit elements (e.g., transistors or capacitors) (M is an integer, where M<N) are taken out from a circuit diagram in which N pieces of circuit elements (e.g., transistors or capacitors) (N is an integer) are provided, and one embodiment of the invention can be constituted. As another example, M pieces of layers (M is an integer, where M<N) are taken out from a cross-sectional view in which N pieces of layers (N is an integer) are provided, and one embodiment of the invention can be constituted. As another example, M pieces of elements (M is an integer, where M<N) are taken out from a flow chart in which N pieces of elements (N is an integer) are provided, and one embodiment of the invention can be constituted.

Embodiment 1

Super-resolution processing is processing for generating high-resolution images from low-resolution images. Alternatively, super-resolution processing is processing for restoring lost data in photographing, signal transmitting, or the like. Therefore, by performing super-resolution processing on averaged images whose detailed parts are crushed due to low resolution, images whose detailed parts can be accurately recognized can be generated. Thus, in the case of displaying such high-resolution images, high-quality images can be displayed. For example, in the case of an image of a park where a great number of small stones are disposed or a tree having a great number of small leaves, by performing super-resolution processing, an image of each small stone or each small leaf can be accurately recognized. In a similar manner, by performing super-resolution processing, detailed parts of a character which cannot be read due to blur can be recognized. Thus, the character can be accurately read. That is, the character can be read as if a person viewing the character recovered his/her eyesight. For example, in super-resolution processing, an image having a resolution (the number of pixels) of 1920×1080 is generated from an image having a resolution (the number of pixels) of 1440×1080 by restoration of image data. That is, it can be said that a super-resolution processing technology is a technology by which the amount of image data is increased from an original image and resolution conversion is performed. Alternatively, it can be said that a super-resolution processing is a technology by which a frequency component which is higher than Nyquist frequency determined by standard frequency of an input image is restored in data contained in an image.

In hold-type displays such as liquid crystal display devices, in the case where fast-moving images are displayed, motion blur occurs and afterimages are seen in some cases. For example, in the case where a character is displayed in a ticker and is moved up and down or right and left, the character is blurred and cannot be accurately recognized in some cases.

Figure 2A:
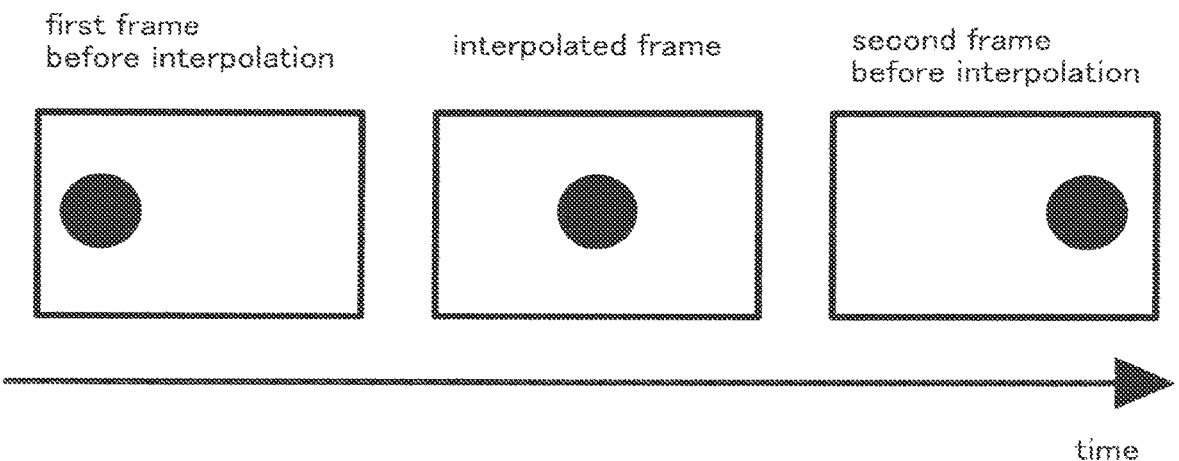
FIGS. 2A to 2C show display screens according to one example of the embodiment.

Therefore, by performing frame interpolation processing, frame frequency can be improved and the resolution of moving images can be improved. The frame interpolation processing is processing by which frame data is interpolated when display is performed at higher frame frequency in order to reduce afterimages or the like. For example, as illustrated in FIG. 2A, a circle is displayed on the left in an image of a first frame, and the circle is moved from left to right in an image of a second frame and is displayed on the right. In this case, data where a circle is displayed in the center is generated. Processing by which data is generated in this manner is the frame interpolation processing. In addition, by the frame interpolation processing, frame frequency in display can be made higher by the number of interpolated frames. By performing display with frame frequency made higher by frame interpolation processing in this manner, a smooth image where a circle is moved from left to right can be displayed and afterimages can be reduced. Therefore, since moving images can be displayed without blur, the resolution of the moving images can be improved. Note that in this specification, the resolution of moving images refers to visual resolution in displaying moving images and resolution which is perceived by a person in displaying moving images. For example, the resolution of moving images refers to the limiting resolution at which intervals can be recognized in the case where a wedged figure is scrolled on a screen.

Driving by which frame interpolation is performed and frame frequency is made higher to a corresponding extent in this manner is referred to as frame rate doubling. For example, when frame frequency is double, such driving is referred to as double-frame rate driving. When frame frequency is quadruple, such driving is referred to as quadruple-frame rate driving. In the case of the double-frame rate driving, images of frames whose number is the same as the number of original frames are generated by frame interpolation processing. Accordingly, the total amount of data is double, so that images can be displayed at double frame frequency. In a similar manner, in the case of the quadruple-frame rate driving, images of frames whose number is three times as large as the number of original frames are generated by frame interpolation processing. Accordingly, the total amount of data is quadruple, so that images can be displayed at quadruple frame frequency. By performing such frame rate doubling, moving-image characteristics can be improved and afterimages can be reduced. As a display device to which frame rate doubling is applied, a hold-type display device is preferable. For example, the frame rate doubling is preferably applied to a liquid crystal display, an organic EL display, or the like. Since afterimages are easily visible in hold-type display devices, afterimages can be reduced by frame rate doubling.

Thus, by performing both frame interpolation processing and super-resolution processing, the resolution of still images and the resolution of moving images can be improved. If neither frame interpolation processing nor frame rate doubling is performed but only super-resolution processing is performed, images are blurred due to afterimages or the like though the resolution of the images is made higher by the super-resolution processing. Thus, the higher resolution cannot be easily perceived. That is, an advantageous effect of the super-resolution processing is reduced. Alternatively, if super-resolution processing is not performed but only frame interpolation processing and frame rate doubling are performed, the resolution of images to be displayed itself is low though the moving images can be accurately perceived. Therefore, high-quality images cannot be displayed. Accordingly, regardless of still images or moving images, it is preferable to perform both frame interpolation processing and super-resolution processing in order to display high-resolution images accurately. Note that one example of this embodiment is not limited to this.

Figure 1B:
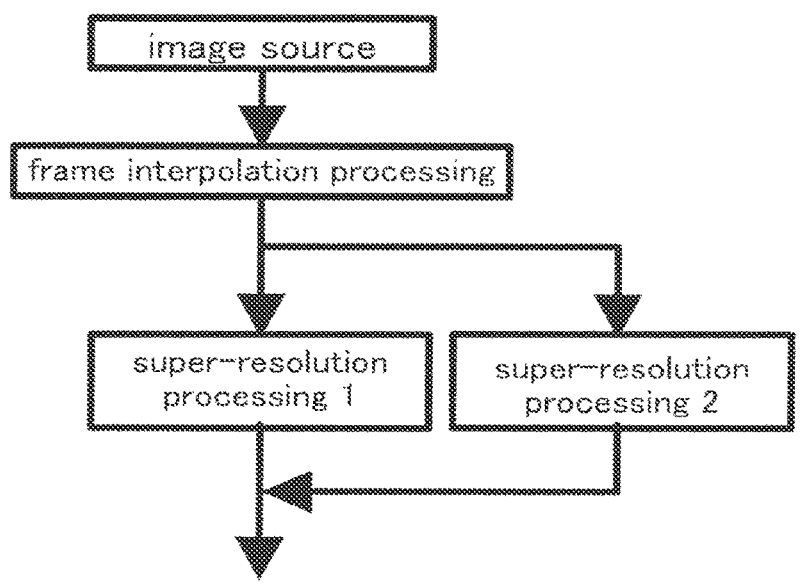
Figure 1C:
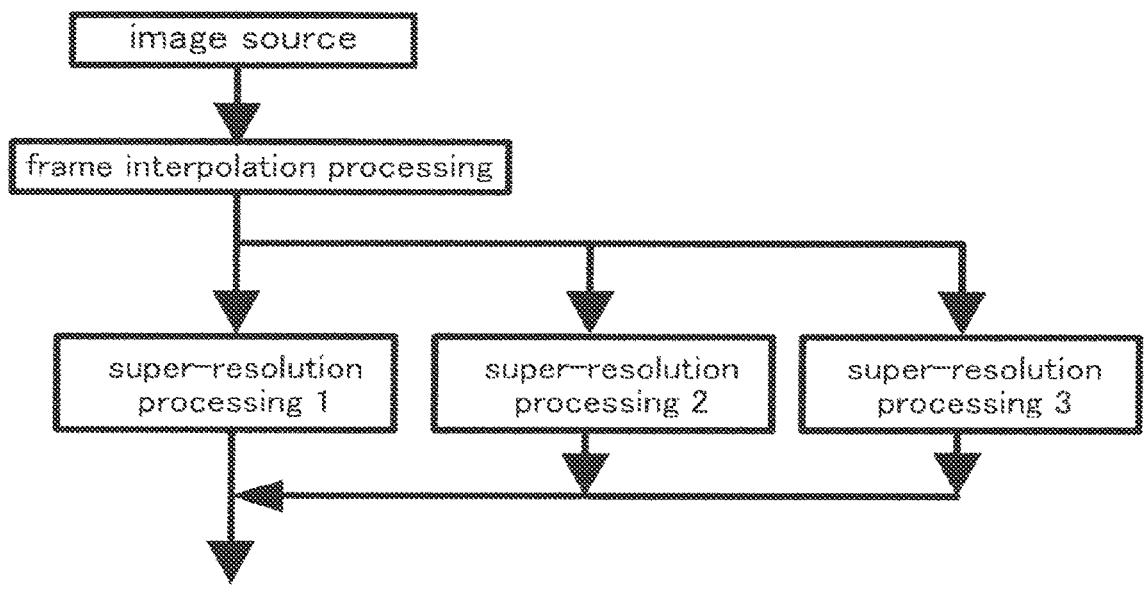

Thus, FIGS. 1A to 1C illustrate examples of processing flows in the case where super-resolution processing is performed after frame interpolation processing is performed.

FIG. 1A illustrates a processing flow in the case where super-resolution processing is performed so that resolution is increased after frame interpolation processing is performed using an image signal obtained from an image source. A variety of processings are further performed after the super-resolution processing is performed. After that, an image can be displayed.

Note that the image source includes a signal of TV broadcast, which is transmitted from a broadcast station, and/or an image generated from the signal. Alternatively, the image source includes a signal obtained from an optical storage medium (including a magnetic storage medium or a magnetooptical storage medium) such as a DVD (including a Blu-ray DVD or the like) or a CD, streaming, the Internet, or the like; and/or an image generated from the signal. Alternatively, the image source includes a signal obtained from a mobile phone, a computer, a CPU, a graphic microcomputer, a controller, an electronic device, or the like; and/or an image generated from the signal. Alternatively, the image source includes a signal used for performing display and/or an image generated from the signal.

Note that the image includes a still image and/or a moving image and/or a screen image.

Note that the image source can be an interlace image or a progressive (non-interlace) image. Alternatively, the image source can be an image on which IP conversion (interlace-progressive conversion), which is processing for converting interlace images into progressive images, has already been performed. Alternatively, IP conversion can be performed before and after frame interpolation processing is performed or before super-resolution processing is performed. FIG. 3A illustrates part of a processing flow in the case where super-resolution processing is performed on a progressive image. FIG. 3B illustrates part of a processing flow in the case where frame interpolation processing is performed after IP conversion is performed on an interlace image. FIG. 3C illustrates part of a processing flow in the case where frame interpolation processing is performed after IP conversion is performed on an interlace image, and then super-resolution processing is performed. FIG. 3D illustrates part of a processing flow in the case where super-resolution processing is performed after IP conversion is performed on an interlace image.

Usually, super-resolution processing is performed on one image (or part of the image) or a plurality of images (or parts of the images). In addition, in the super-resolution processing, new data is generated using such an image so that a high-resolution image is generated. Therefore, in order to accurately perform the super-resolution processing, it is not preferable that part of image data be lost as in an interlace image. Accordingly, it is preferable that an image on which the super-resolution processing be performed be a progressive (non-interlace) image. Thus, in the case of an interlace image, it is preferable that IP conversion be performed before the super-resolution processing is performed and the super-resolution processing be performed on a progressive image. Note that one example of this embodiment is not limited to this.

Note that IP conversion can be performed before or after super-resolution processing. Further/Alternatively, IP conversion can be performed before or after frame interpolation processing. Further/Alternatively, IP conversion can be performed before or after different processing.

Figure 4A:
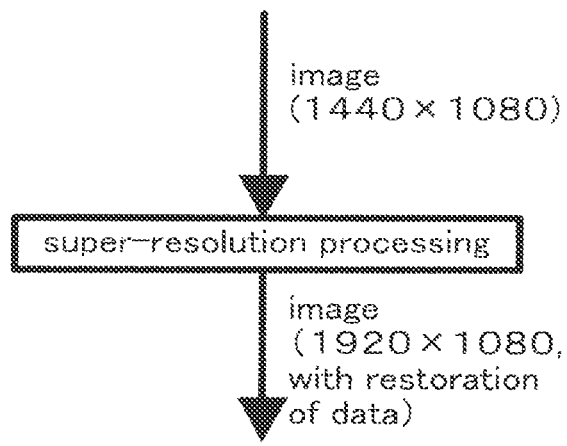
FIGS. 4A to 4C illustrate flows according to one example of the embodiment.
Figure 4B:
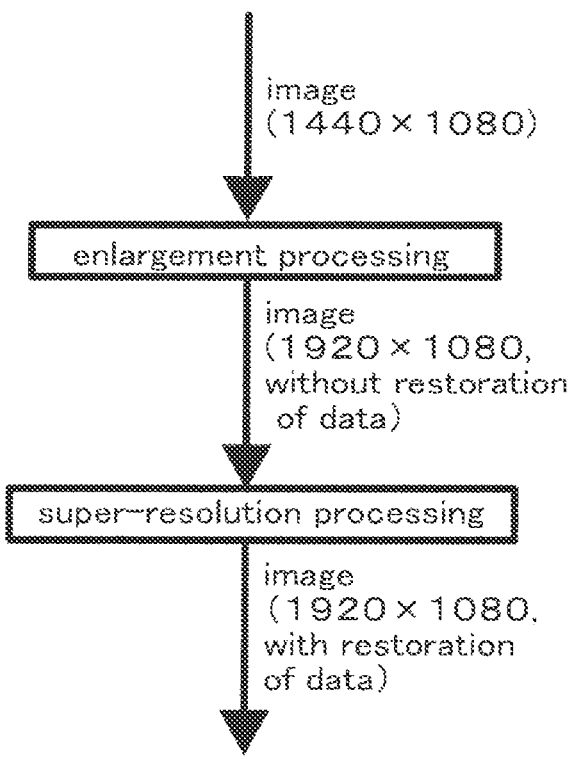

Note that as illustrated in FIG. 4A, for example, it is preferable that the resolution (the number of pixels) of an image subjected to super-resolution processing be higher than the resolution (the number of pixels) of an image before subjected to the super-resolution processing. However, one example of this embodiment is not limited to this. For example, before the super-resolution processing is performed, resolution (the number of pixels) has already been high by enlargement processing or the like. In that case, since the resolution has already been high, the resolution itself is not changed before and after the super-resolution processing. However, in enlargement processing before the super-resolution processing, missing image data is not restored. That is, the image is just enlarged and display itself does not have high quality. For example, in the case of an image of a park where a great number of small stones are disposed or a tree having a great number of small leaves, an image of each small stone or each small leaf is not accurately displayed by enlargement processing but is just enlarged in a blurred state. Thus, by performing the super-resolution processing, it is possible to restore missing image data and to generate a high-quality image whose detailed parts can be recognized, though the resolution (the number of pixels) of an image is not changed. In other words, as illustrated in FIG. 4B, it is possible to generate an image having a resolution of 1920×1080 from an image having a resolution of 1440×1080 by enlargement processing and to generate an image having a resolution of 1920×1080 from the image having a resolution of 1920×1080 by super-resolution processing. In this case, in the case where the image having a resolution of 1920×1080 is generated from the image having a resolution of 1440×1080 by the enlargement processing, there is no restored data. However, after the super-resolution processing is performed, data is restored. Thus, an image whose detailed parts can be accurately recognized can be generated.

Note that such processing is performed on the entire screen in many cases; however, one example of this embodiment is not limited to this. Such processing can be performed on part of the screen.

Note that it is possible to make resolution high by enlargement processing and then to make the resolution higher by super-resolution processing. For example, it is possible to generate an image having a resolution of 1440× 1080 from an image having a resolution of 800×600 by enlargement processing and to generate an image having a resolution of 1920×1080 from the image having a resolution of 1440×1080 by super-resolution processing. Note that in the case of making the resolution high by the enlargement processing, data is not restored. On the other hand, in the case of making the resolution high by the super-resolution processing, data is restored. Note that one example of this embodiment is not limited to this.

Alternatively, it is possible to make resolution high by super-resolution processing and then to make the resolution higher by enlargement processing. For example, it is possible to generate an image having a resolution of 1440×1080 from an image having a resolution of 800×600 by super-resolution processing and to generate an image having a resolution of 1920×1080 from the image having a resolution of 1440×1080 by enlargement processing. Note that in the case of making the resolution high by the enlargement processing, data is not restored. On the other hand, in the case of making the resolution high by the super-resolution processing, data is restored. Note that one example of this embodiment is not limited to this.

Note that enlargement processing can be performed before or after super-resolution processing. Alternatively, enlargement processing can be performed before or after frame interpolation processing. Alternatively, enlargement processing can be performed before or after different processing. Note that one example of this embodiment is not limited to this.

Both enlargement processing and super-resolution processing can be performed in this manner. For example, in the case where longitudinal or lateral resolution is made twice or more, preferably five times or more, it is preferable to perform both enlargement processing and super-resolution processing. Note that one example of this embodiment is not limited to this.

Note that as the enlargement processing, for example, bi-linear interpolation, bi-cubic convolution, or the like can be used. Bi-linear interpolation is a method by which four surrounding pixels are extracted and calculated and insufficient images are interpolated in enlargement. In bi-cubic convolution, 16 pixel values (4×4 pixel values) in standards of coordinate after conversion are extracted from a coordinate before the conversion. Then, weighted-average calculation is performed by weighting of the extracted 16 pixel values so that the pixel values after the conversion are determined.

Figure 4C:
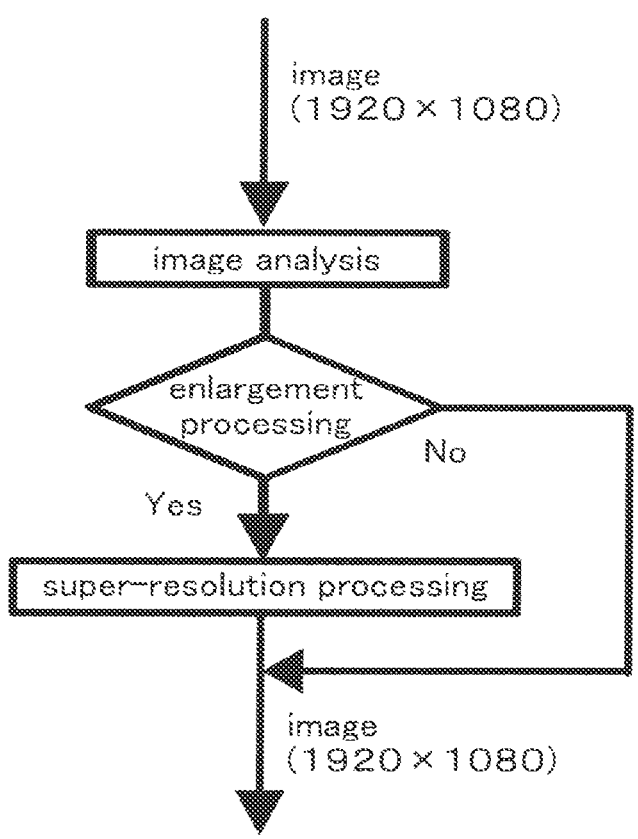

Note that as illustrated in FIG. 4C, whether enlargement processing is performed on an image is analyzed. In the case where enlargement processing is performed on part or all of a screen, super-resolution processing is performed. In the case where enlargement processing is not performed, i.e., in the case where resolution is originally high, super-resolution processing can be omitted. Since a variety of images are used as image sources, by performing image analysis, super-resolution processing can be accurately performed even on an image on which enlargement processing is performed. Note that as an example of an image analysis method, there is a method by which frequency analysis is performed and whether frequency is high is determined. In the case where frequency is low, it can be determined that enlargement processing has been performed.

Next, it is assumed that by performing super-resolution processing on an image having lateral resolution (the number of pixels) of A and longitudinal resolution (the number of pixels) of B, the image is changed into an image having lateral resolution (the number of pixels) of C and longitudinal resolution (the number of pixels) of D. Alternatively, it is assumed that by performing enlargement processing and the super-resolution processing on an image having the lateral resolution (the number of pixels) of A and the longitudinal resolution (the number of pixels) of B, the image is changed into an image having the lateral resolution (the number of pixels) of C and the longitudinal resolution (the number of pixels) of D. In this case, it can be said that a multiplying factor when the resolution is made higher by the super-resolution processing is C/A, where C is divided by A, or D/B, where D is divided by B. In addition, it is assumed that in the case of performing frame rate doubling, frame frequency is N times.

In this case, N>(C/A) or N>(D/B) is preferable. Alternatively, N≥(C/A) and N≥(D/B) are preferable. Note that one example of this embodiment is not limited to this.

Figure 2B:
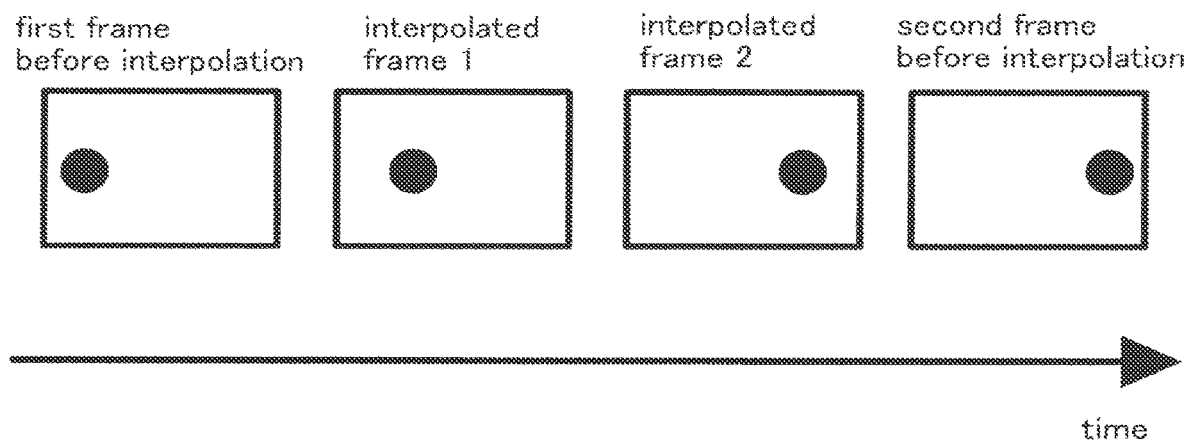

In the case of performing frame interpolation processing for frame rate doubling, even when the amount of frame data to be interpolated is made larger, data can be generated without problems. For example, FIG. 2A illustrates double-frame rate driving; however, by adjustment of the position of a circle as illustrated in FIG. 2B, triple-frame rate driving can be easily realized. That is, in the frame interpolation processing for the frame rate doubling, even when the amount of frame data to be interpolated is made larger, big problems do not occur in an image. Alternatively, by making the amount of frame data to be interpolated larger, moving-image characteristics can be further improved and afterimages can be further reduced.

On the other hand, the super-resolution processing is processing by which resolution data which is lost in photographing or signal transmitting is restored. Therefore, if a large amount of data is lost, it is difficult to restore the data adequately. Accordingly, when the value of (C/A) or (D/B) is too large, problems occur in an image itself and the image is distorted.

From the above, when both frame interpolation processing and super-resolution processing are performed, N>(C/A) or N>(D/B) is preferable. Alternatively, N≥(C/A) and N≥(D/B) are preferable. Thus, when both the frame interpolation processing and the super-resolution processing are performed and the above relationship is satisfied, a high-quality image in which detailed parts are clear and afterimage feeling is eliminated can be displayed. Note that one example of this embodiment is not limited to this.

Figure 2C:
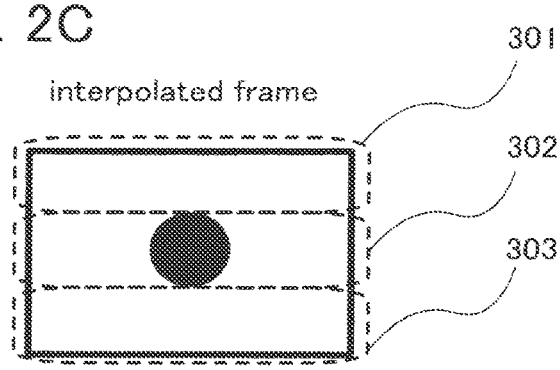

Note that in the case of performing frame interpolation processing, in a moving region of a screen, data is additionally generated for the frame interpolation processing in many cases. In addition, in a static region of the screen, data is not additionally generated in many cases. That is, in the screen, there are a region where data is additionally generated by frame interpolation processing and a region where data is not additionally generated. For example, in the case of FIG. 2A, in a region 301 and a region 303, data of the first frame before subjected to interpolation and data of the second frame before subjected to the interpolation do not change, as illustrated in FIG. 2C. Therefore, there is no change even in frame data to be interpolated and data is not additionally generated. Data is generated by utilizing the data of the first frame before subjected to the interpolation or the data of the second frame before subjected to the interpolation. On the other hand, in a region 302, data of the first frame before subjected to the interpolation and data of the second frame before subjected to the interpolation change, so that there are a region where the circle is erased and a region where the circle is generated. Thus, data is additionally generated.

In the case of performing frame interpolation processing in this manner, in a screen, there are a region where data is additionally generated and a region where data is not additionally generated. In addition, such regions change over time. For example, as an example of a region where data is generated, a region can be given in which a character is displayed in a ticker or the like and is moved up and down or right and left. In the case of a character, a symbol, or the like, when afterimages are generated and the character, the symbol, or the like is not easily seen, it is impossible to determine the type of the character, the symbol, or the like, which is a big problem.

Generation of additional data only in parts of regions in a screen when frame interpolation processing is performed in this manner has advantages such as improvement in processing speed, reduction in power consumption, and improvement in processing accuracy.

Further, super-resolution processing can be performed not on all regions in a screen but on parts of the regions in the screen. For example, in the case where a streaming broadcast is displayed on part of a screen, a low-resolution image is displayed on only in that region while being enlarged in some cases. In such a case, by performing super-resolution processing on only the region where the streaming broadcast is displayed, image quality can be improved.

In the case of performing super-resolution processing only on parts of regions in a screen in this manner, there is an advantage such as improvement in processing speed, reduction in power consumption, improvement in processing accuracy, or reduction in image defects.

Therefore, in a screen, there are a first region where data is additionally generated for frame interpolation processing and a second region where super-resolution processing is performed. Further, a third region where data is not additionally generated for frame interpolation processing and super-resolution processing is not performed can be provided. Furthermore, a region where the first region and the second region do not overlap with each other can be provided in the screen. Alternatively, a region where the first region and the second region overlap with each other can be provided in the screen.

Data is additionally generated for frame interpolation processing in a region where data related to a character or a symbol, such as a ticker in many cases. Super-resolution processing is performed on a region with little motion in many cases. Therefore, in the screen, it is preferable that the region be provided in which the first region where data is additionally generated for the frame interpolation processing does not overlap with the second region where the super-resolution processing is performed. The reason for this is as follows. Since the first region where data is additionally generated for the frame interpolation processing is a moving region, data is additionally generated for the frame interpolation processing in order to make afterimages invisible. However, in such a moving region, even if resolution is made higher by super-resolution processing, it may be difficult for eyes to recognize the resolution. Therefore, in such a moving region, it can be said that super-resolution processing is not performed in some cases. The second region where the super-resolution processing is performed is a region whose detailed parts are preferably seen clearly. In the case where a static image such as a still image is displayed, it can be said that detailed parts are seen clearly. Since there is a possibility of occurrence of the above condition, a region can be provided in which a first region where both frame interpolation processing and super-resolution processing are performed, the screen can be displayed with advantages of both of the processings, and data is additionally generated for the frame interpolation processing does not overlap with the second region where the super-resolution processing is performed. Accordingly, an appropriate image can be displayed. Note that one example of this embodiment is not limited to this.

By performing both frame interpolation processing and super-resolution processing in this manner, images having high image picture resolution and high moving image resolution can be displayed.

Note that in the case where super-resolution processing is performed after frame interpolation processing is performed, frame frequency is made higher for the frame interpolation processing. Therefore, processing speed of the super-resolution processing is not sufficiently high in some cases. Thus, a plurality of processing systems for the super-resolution processing can be provided. For example, FIG. 1B illustrates the case where two processing systems for the super-resolution processing are provided. Further, FIG. 1C illustrates the case where three processing systems for the super-resolution processing are provided. In a similar manner, any processing system can be provided.

In the case where a plurality of processing systems are provided, processings can be divided among the processing systems by a variety of methods. For example, processing for a right half of a screen can be performed by a first super-resolution processing system, and processing for a left half of the screen can be performed by a second super-resolution processing system. Since image data related to an image is usually transferred in each row, processings can be divided between the first super-resolution processing system and the second super-resolution processing system by division of image data for one row into two pieces of data for the right half and left half of the screen. Note that one example of this embodiment is not limited to this.

Alternatively, processing of a certain frame (e.g., an odd-numbered frame or a frame on which frame interpolation processing is not performed) can be performed by the first super-resolution processing system, and processing of a different frame (e.g., an even-numbered frame or a frame generated by frame interpolation processing) can be performed by the second super-resolution processing system. Thus, even when the processing speed of the super-resolution processing is lower than the frame frequency, processing can be completed normally by alternate processings. Alternatively, since the processing speed of one processing system may be low, power consumption can be reduced.

Figure 5A:
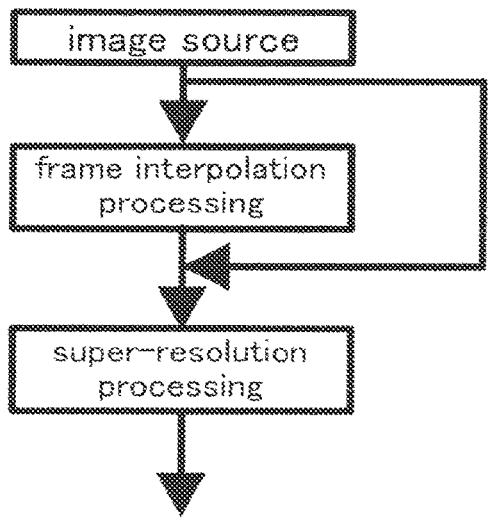
FIGS. 5A to 5C illustrate flows according to one example of the embodiment.

Note that one example of this embodiment is not limited to the case where super-resolution processing is performed after frame interpolation processing is performed. For example, as illustrated in FIG. 5A, super-resolution processing can be performed while performing frame interpolation processing. First, image data A is supplied from an image source. The image data A is not image data generated by the frame interpolation processing but original image data. Therefore, the super-resolution processing can be performed immediately. Next, image data B is supplied from the image source. Then, frame data is interpolated using the image data A and the image data B which have already been supplied. When the frame interpolation processing is performed using the image data A and the image data B, the super-resolution processing can be performed using the image data A. That is, the image data A is used for both of the frame interpolation processing and the super-resolution processing. Thus, the super-resolution processing and the frame interpolation processing can be performed concurrently. After that, by the frame interpolation processing with the use of the image data A and the image data B, image data C is generated. Then, super-resolution processing is performed on the image data C obtained by the frame interpolation with the use of the image data A and the image data B. By concurrently performing the frame interpolation processing and the super-resolution processing in this manner, the number of memories for storing the image data A can be reduced. When the image data A is stored in one memory, the super-resolution processing and the frame interpolation processing can be performed by reading of the data. Note that as for image data where frame data is generated, it can be said that the super-resolution processing is performed after the frame interpolation processing is performed. Note that one example of this embodiment is not limited to this.

Figure 5B:
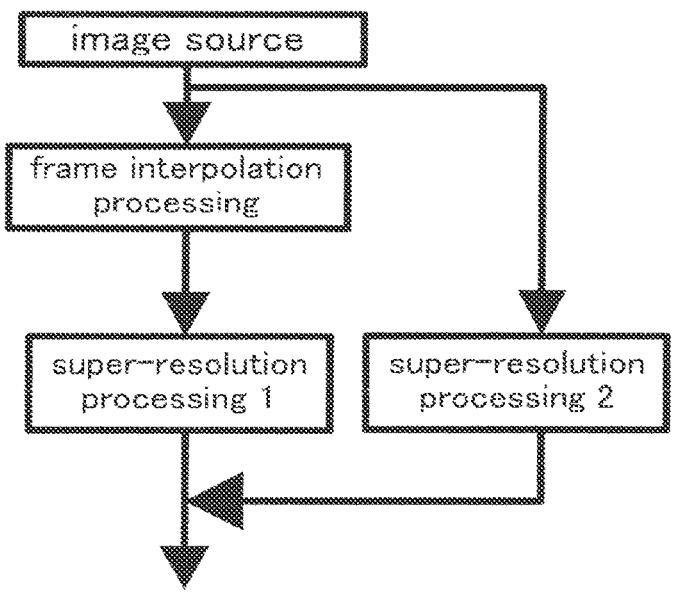

Note that as in FIG. 1B, a plurality of processing systems can be provided for super-resolution processing, and the super-resolution processing and frame interpolation processing can be performed concurrently. FIG. 5B illustrates an example of such a case. For example, the super-resolution processing is performed on at least the image data A by using the second super-resolution processing system. Concurrently, the frame interpolation processing is performed using at least the image data A. That is, the frame interpolation processing and the super-resolution processing are concurrently performed using at least the image data A. After that, the super-resolution processing is performed on image data on which frame interpolation is performed using the first super-resolution processing system. By providing a plurality of super-resolution processing systems in this manner, processings can be performed concurrently. Further, the super-resolution processing can be performed quickly on frame data which is not generated by the frame interpolation with the use of the second super-resolution processing system. Therefore, when image data is input, display can be performed quickly. Accordingly, such processing is preferable in the case of displaying an image of a game or the like, where real-time processing is needed. Note that one example of this embodiment is not limited to this.

Note that in the case where a plurality of processings are performed concurrently, the processings can be performed concurrently only in part of the processing period of each processing. In other words, even in the case where a plurality of processings are performed concurrently, a period during which the plurality of processings are not performed concurrently can be provided. Alternatively, the plurality of processings can be performed concurrently in all the processing period of each processing.

Figure 5C:
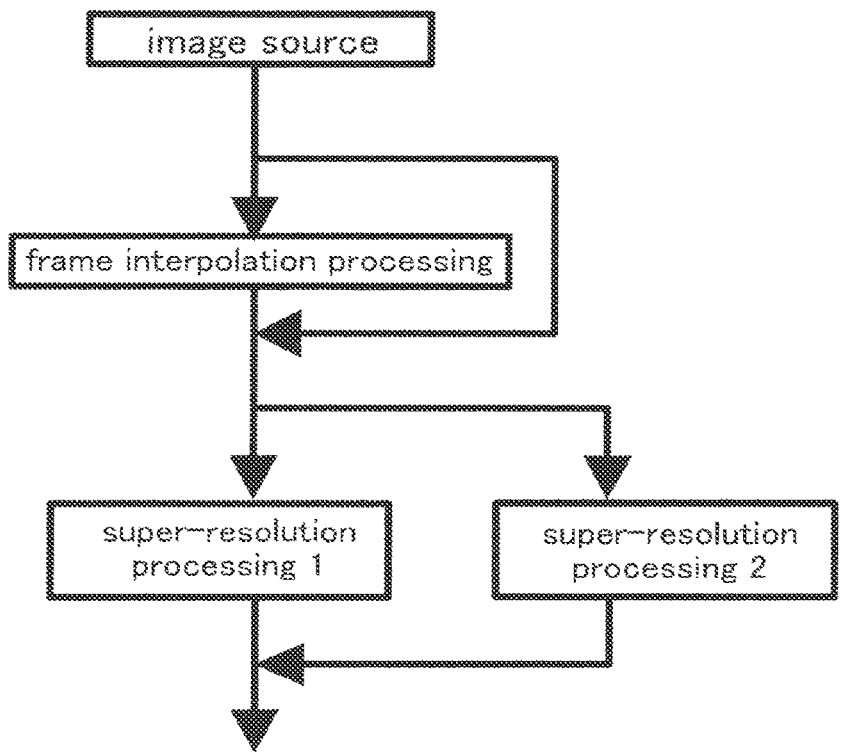

Alternatively, processing may be performed as in FIG. 5C. For example, super-resolution processing is performed on at least the image data A by using the first super-resolution processing system or the second super-resolution processing system. Concurrently, the frame interpolation processing is performed using at least the image data A. That is, the frame interpolation processing and the super-resolution processing are concurrently performed using at least the image data A. After that, the super-resolution processing is performed on image data on which frame interpolation is performed using the second super-resolution processing system or the first super-resolution processing system. By providing a plurality of super-resolution processing systems in this manner, processings can be performed concurrently. Further, the super-resolution processing can be performed quickly on frame data which is not generated by the frame interpolation with the use of the first super-resolution processing system or the second super-resolution processing system. Therefore, when image data is input, the image can be displayed quickly. Accordingly, such processing is preferable in the case of displaying an image of a game or the like, where real-time processing is needed. Note that one example of this embodiment is not limited to this.

Figure 6A:
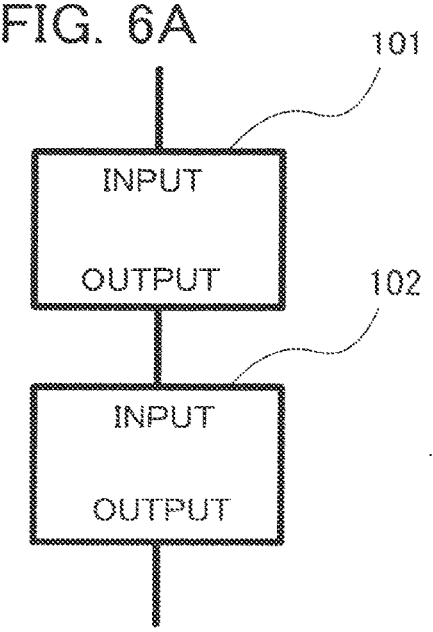
FIGS. 6A to 6C illustrate circuits according to one example of the embodiment.

Note that FIGS. 1A to 1C, FIGS. 3A to 3D, FIGS. 4A to 4C, and FIGS. 5A to 5C illustrate the processing flows as examples, and FIG. 6A illustrates an example of a structure (a block diagram) for realizing the processing flows. For example, an image source is input to an input terminal of a circuit 101. An output terminal of the circuit 101 is connected to an input terminal of the circuit 102. For example, the circuit 101 has a function of performing frame interpolation processing. For example, the circuit 102 has a function of performing super-resolution processing. The circuit 101 or the circuit 102 can include a memory circuit (a memory) for storing data. Alternatively, the circuit 101 or the circuit 102 can include a unit for calculation.

Figure 6B:
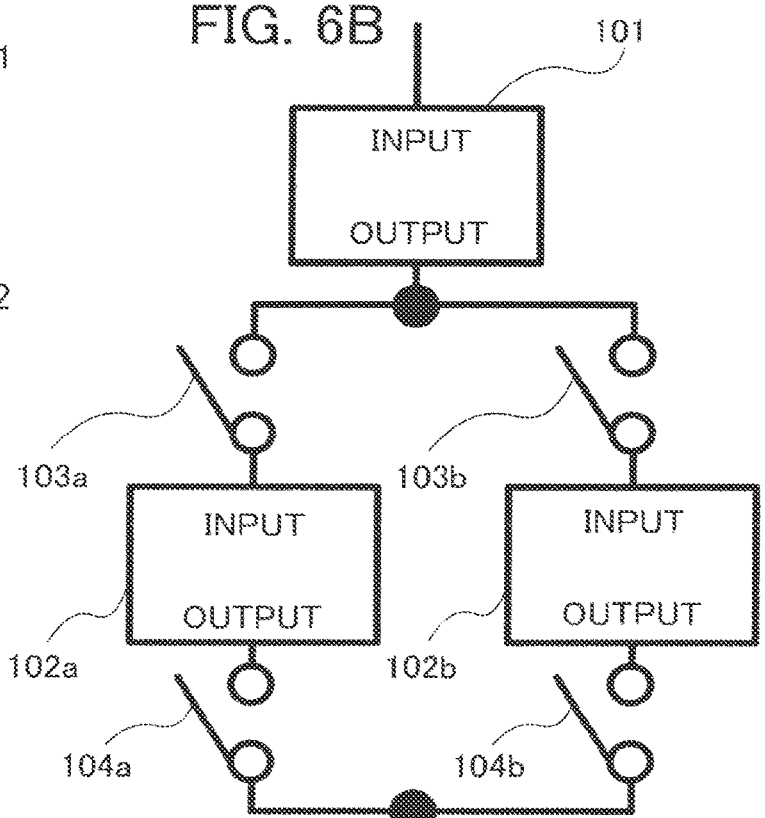
Figure 6C:
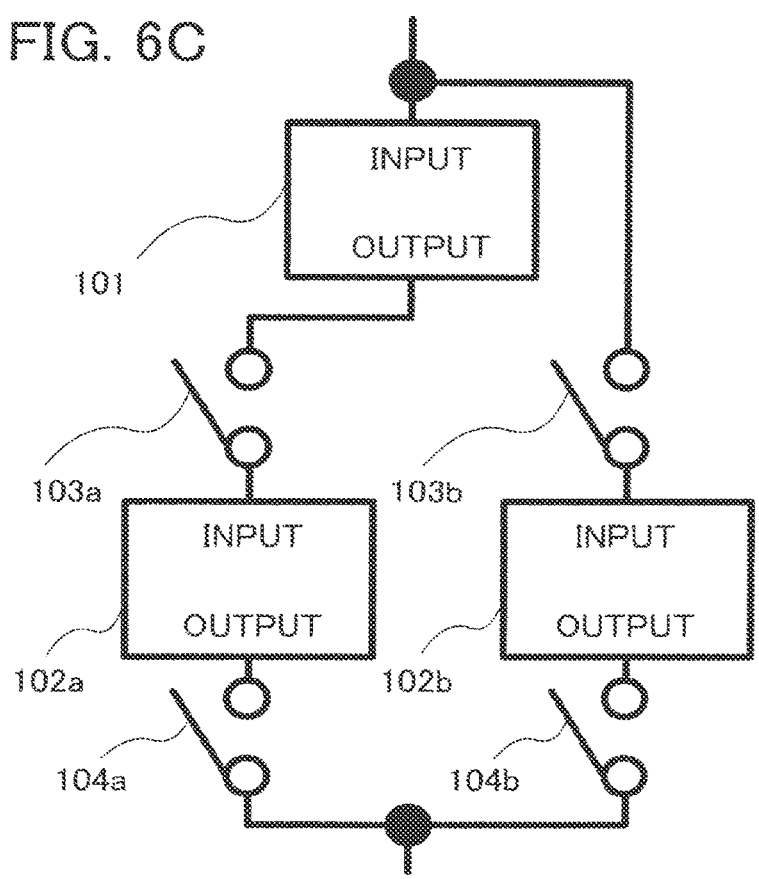

FIG. 6B illustrates another example of a structure (a block diagram) for realizing the processing flows. FIG. 6B corresponds to FIG. 1B. For example, an image source is input to the input terminal of the circuit 101. The output terminal of the circuit 101 is connected to an input terminal of a circuit 102a through a switch 103a. Further, the output terminal of the circuit 101 is connected to an input terminal of a circuit 102b through a switch 103b. An output terminal of the circuit 102a is connected to an output terminal through a switch 104a. Further, an output terminal of the circuit 102b is connected to the output terminal through a switch 104b. Note that as illustrated in FIG. 6C, the switch 103b can be connected between the input terminal of the circuit 102b and the input terminal of the circuit 101. Note that FIG. 6C corresponds to FIG. 5B. The circuit 101 has a function of performing frame interpolation processing. Each of the circuit 102a and the circuit 102b has a function of performing super-resolution processing. The circuit 101 or the circuit 102 can include a memory circuit (a memory) for storing data. Alternatively, the circuit 101 or the circuit 102 can include a unit for calculation. By controlling the switch 103a, the switch 103b, the switch 104a, and/or the switch 104b, processings can be performed concurrently.

Note that in the circuit 101, the circuit 102, the circuit 102a, and/or the circuit 102b can realize its function with hardware, software, or both hardware and software. When the circuit 101 and/or the circuit 102 realizes its function with hardware, processing speed can be made higher or power consumption can be reduced. When the circuit 101 and/or the circuit 102 realizes its function with software, the content of processing can be changed and a variety of processings can be performed as appropriate.

Alternatively, by using a multi-core CPU including a plurality of CPU cores and distributing processings across the CPU cores, a plurality of super-resolution processings or frame interpolation processings can be performed. With the use of a multi-core CPU in this manner, high-speed operation is possible with fewer components. Note that such a multi-core CPU can include a semiconductor device (or a transistor) formed using an SOI. With the use of an SOI, operation can be performed with low power consumption and heat generation during the operation can be suppressed.

Note that even when the number of processings is increased, a circuit can be formed in a manner similar to those in FIGS. 6A to 6C by increasing a circuit such as the circuit 101, the circuit 102, the circuit 102a, or the circuit 102b. Note that processing performed in the circuit 101, the circuit 102, the circuit 102a, or the circuit 102b is not limited to super-resolution processing or frame interpolation processing. A variety of different processings can be performed.

Note that in the contents described thus far and/or contents described below, simple enlargement processing or the like can be performed instead of super-resolution processing.

Embodiment 2

Next, examples of super-resolution processing technologies are described. By performing super-resolution processing, a high-resolution image can be displayed.

First, a moving region is detected and speed data of the region is extracted. That is, with respect to an image at given time, an optical flow, which is a vector illustrating the flow of each pixel, is calculated from two images before and after the image. Then, from the extracted speed data, the amount of positional deviation per image in the region is detected with accuracy of less than the size of one pixel. That is, from the calculated optical flow, the amount of positional deviation between images is calculated. Then, in accordance with the amount of detected positional deviation, the level of luminance between pixels is interpolated from a plurality of images in an image column. With such processing, a high-resolution image having resolution which is higher than physical resolution can be generated. Thus, it can be said that the super-resolution processing technology is a technology by which data for restoring a high-resolution image is extracted and restored from a low-resolution image in accordance with motion vector data or the like.

In a similar super-resolution processing technology, for example, first, consecutive frames having close correlation are selected from images. After that, the motion vector of the images are detected with fineness which is close to the size of one pixel. Then, the motion of each pixel is tracked, and a missing high-resolution pixel is estimated from data related to a change in the tracked pixel between respective frames. In this case, since a camera slightly swings, crushing of a photographed low-resolution portion is varied between the frames, though the same portion is photographed. Thus, with this data, the missing pixel can be compensated and high resolution can be realized. That is, it can be said that this processing method is a super-resolution technology by which search is performed sufficiently in a time direction. In the case of this super-resolution technology, motion vectors can be recognized precisely. Thus, a missing pixel between frames, which cannot be acquired in photographing due to the resolution of a camera, can also be restored.

Alternatively, in different super-resolution processing, the similarity of a plurality of frames is found out. After that, the frames having similarity are aligned, and a time change in each pixel is recognized. Then, a method by which a missing high-resolution pixel is estimated and generated can be used.

Alternatively, in different super-resolution processing, first, data related to a consecutive plurality of images is analyzed. Then, a high-frequency component is restored by correction of common portions of photographic objects. Thus, a high-resolution image can be obtained.

Alternatively, as different super-resolution processing, a reconstruction super-resolution processing method can be used. In the reconstruction super-resolution processing method, first, high-resolution images (initial high-resolution images) are assumed from original low-resolution images. Then, in accordance with a point spread function (PSF) obtained from the model of a camera, the pixel values of all the pixels of the low-resolution images are estimated from the assumed high-resolution images. In other words, the assumed high-resolution images are down-converted by a unique function (an imaging model function) so that low-resolution images having the same resolution as the original low-resolution images are generated. Then, a difference between the estimated value and an observed pixel value (an observed value) is calculated. After that, with respect to the images before subjected to down conversion, high-resolution images in which the above difference is smaller are searched. Note that this search processing can be repeated until convergence so that accuracy is made higher, or can be performed only once. Thus, high-resolution images can be obtained.

Note that as the imaging model function, for example, an imaging element model where processing is performed two-dimensionally (lengthwise and widthwise) by using a one-dimensional linear filter can be used.

In the case of this reconstruction super-resolution processing method, high-resolution images are reconstructed by iterative calculation which needs initial high-resolution images. As a calculation method in that case, an ML (maximum-likelihood) method, a MAP (maximum a posterior) method, a POCS (projection on to convex sets) method, or the like can be used.

In the ML method, a square error between an estimated pixel value of an assumed high-resolution image and a pixel value which is actually observed is used as an evaluation function. In the ML method, a high-resolution image in which the evaluation function is minimized is used as an estimated image.

The MAP method is a method by which a high-resolution image in which an evaluation function where the probability information of a high-resolution image is added to a square error is minimized is estimated. In other words, the MAP method is a super-resolution processing method by which a high-resolution image is estimated as an optimization problem for maximizing posterior probability by utilizing foreseeing data related to a high-resolution image.

The POCS method is a method by which a simultaneous equation of pixel values of a high-resolution image and a low-resolution image is formed and sequentially solved.

Note that one frame is formed by merging a plurality of frames of an image. Thus, the image is made to have higher resolution by the increase in the number of pixels. In this case, processing for making resolution higher can be performed such that a return component is canceled.

Alternatively, as a super-resolution processing method, an iteration method, a frequency-domain method, a statistical method, or the like can be used. The iteration method mainly includes three steps: a first step of initial estimation, a second step of imaging, and a third step of reconstructing.

Note that super-resolution processing can be performed on the whole screen. However, one example of this embodiment is not limited to this. The super-resolution processing can be performed depending on the content of an image. For example, the super-resolution processing is not performed on an edge portion or a flat portion of an image but the super-resolution processing can be performed on a textual portion of the image. In that case, real-time spectrum analysis is performed on the image. In addition, the super-resolution processing can be performed on only a high-frequency region. By controlling whether the super-resolution processing is performed or not depending on an image, the image can be prevented from deteriorating.

Note that the flat portion is a portion where regions having specific frequency or regions having specific luminance are highly distributed. Thus, a sky whose color distribution is comparatively gradual, a dim background, or the like corresponds to the flat portion. Therefore, it can be said that the flat portion is a region whose color is mainly expressed gradationally in an image.

Note that the textual portion is a high-frequency portion of an image. Since this region has high frequency, it is highly possible that a more detailed portion exist. Therefore, by performing the super-resolution processing on the textural portion, it can be said that the increase in resolution is highly effective.

Note that in the case of performing super-resolution processing, resolution of a variety of regions of an image is recognized and super-resolution processing can be performed on each region at different intensity.

Note that if the resolution of an original image is sufficiently high, super-resolution processing can be omitted. After determining whether the resolution of the original image is high, whether super-resolution processing is performed can be controlled depending on the result.

Although a variety of super-resolution processing technologies have been described above, the super-resolution processing technology in this specification is not limited to them.

Embodiment 3

Note that an image can be displayed by performing a variety of processings after super-resolution processing or frame interpolation processing. Therefore, the content described in any of the other embodiments can be applied to, combined with, or replaced with this embodiment.

FIG. 7A illustrates a processing flow in the case where super-resolution processing is performed using an image signal on which frame interpolation processing is performed so that resolution is increased, and then edge enhancement processing is performed. A variety of processings are further performed after the edge enhancement processing. After that, an image can be displayed. Therefore, the processing flow in FIG. 7A corresponds to a processing flow where edge enhancement processing is added to the processing flow in FIG. 1A.

By performing super-resolution processing before edge enhancement processing in this manner, resolution can be accurately improved. Since the edge enhancement processing is not performed on an image before subjected to the super-resolution processing, unnecessary processing is not performed. If the edge enhancement processing is performed before the super-resolution processing, processing is performed on an image by the edge enhancement processing. When such an image on which the processing is performed is used, there is a possibility that the super-resolution processing cannot be accurately performed. Since the super-resolution processing is processing for generating a new high-resolution image, in order to generate a high-resolution image accurately, it is preferable to perform the super-resolution processing on an image on which the edge enhancement processing is not performed, i.e., an image which is close to an original image. Therefore, by performing the super-resolution processing before the edge enhancement processing, the super-resolution processing can be accurately performed. By performing the edge enhancement processing on a more accurate high-resolution image which is generated by the super-resolution processing, the edge of an object in the image can be more accurately acquired, so that a clearer image can be obtained. Accordingly, in order to obtain a high-quality image, it is preferable to perform the super-resolution processing before the edge enhancement processing is performed. Note that one example of this embodiment is not limited to this.

In a similar manner, by performing the frame interpolation processing before the edge enhancement processing is performed, data for frame interpolation can be accurately generated. By performing the edge enhancement processing on a more accurate high-resolution image, the edge of an object in the image can be more accurately acquired, so that a clearer image can be obtained.

Note that as for the edge enhancement processing, one example of this embodiment is not limited to the above example. Different image processing can be performed. As different image processing, for example, smoothing, distortion correction, error processing, flaw correction, color correction, gamma correction, inverse gamma correction, or the like can be performed instead of or in addition to the edge enhancement processing. For example, by color correction, an image with 100% or less NTSC ratio can be converted into an image with 100% or more NTSC ratio. Thus, an image having high color impurity can be displayed.

Note that a plurality of image processings such as edge enhancement processing am performed, the processings can be performed successively. However, one example of this embodiment is not limited to this. The plurality of processings can be separately performed. For example, certain image processing can be performed before processing A and different image processing can be performed after processing B.

Note that the content or the drawing described in Embodiment 1 can be applied to the case where different processing such as edge enhancement processing is performed in a similar manner. In a similar manner, the content or the drawing described in certain processing can be applied to the case where different processing is performed.

For example, FIG. 7B illustrates a processing flow in the case where a plurality processing systems are provided for super-resolution processing. The processing flow in FIG. 7B corresponds to a processing flow where edge enhancement processing is added to the processing flow in FIG. 1B. Note that edge enhancement processing can be applied to a different processing flow in a similar manner.

Note that before and after each stage in the processing flow, a variety of different processings can be performed. As examples of a variety of different processings, there are IP conversion processing, enlargement processing, and the like. Further, another processing is possible.

Next, in a manner similar to that of the case where edge enhancement processing is performed, FIG. 7C illustrates a processing flow in the case where overdrive processing is performed as processing performed after super-resolution processing. Therefore, the content or the drawing described in the edge enhancement processing can be applied to the case where different processing such as overdrive processing is performed in a similar manner. In a similar manner, the content or the drawing described in certain processing can be applied to the case where different processing is performed.

The overdrive processing is processing for making the response speed of a liquid crystal element higher. Usually, a signal corresponding to a gray level which is to be expressed in each pixel is supplied to each pixel in a screen. However, since the liquid crystal element has low response speed, even if a signal corresponding to a gray level is supplied, display which corresponds to the gray level cannot be performed in one frame period. After several frame periods, display which corresponds to the gray level is eventually performed. Thus, in supplying voltage to the liquid crystal element, not voltage corresponding to an original gray level but voltage having larger amplitude is supplied to the liquid crystal element. Accordingly, the transmittance of the liquid crystal element is drastically changed. After that, voltage corresponding to the original gray level is supplied. Through the above operation, the response speed of the liquid crystal element can be made higher. Driving by which voltage having larger amplitude than voltage corresponding to the original gray level is temporarily supplied to the liquid crystal element before the voltage corresponding to the original gray level is supplied is referred to as overdrive. Further, processing for determining which level of voltage is supplied as voltage having larger amplitude than voltage corresponding to the original gray level is referred to as overdrive processing.

By performing overdrive processing after super-resolution processing is performed, response speed can be made higher, the amount of overdrive can be controlled adequately, and display with fewer afterimages can be performed. Alternatively, since the super-resolution processing is processing by which a new image is generated, an image is changed by the processing. Thus, the gray level of each pixel is changed. Therefore, by performing the overdrive processing after the super-resolution processing is performed, the overdrive processing can be changed in accordance with the amount of change generated by the super-resolution processing. Accordingly, by performing the overdrive processing after the super-resolution processing is performed, the amount of overdrive can be controlled adequately, so that the gray level of each pixel can be optimized. Thus, the response speed can be made higher and the overdrive can be accurately performed. Further, by the super-resolution processing, a high-resolution image can be displayed without generation of afterimages. Accordingly, in order to obtain a high-quality image, it is preferable to perform the super-resolution processing before the overdrive processing is performed. Note that one example of this embodiment is not limited to this.

Note that here, the amount of overdrive corresponds to an increase in voltage supplied to a liquid crystal element or the like, which is an increase in the amplitude of the voltage by overdrive processing.

In a similar manner, by performing overdrive processing after frame interpolation processing is performed, response speed can be made higher, the amount of overdrive can be controlled adequately, and display with fewer afterimages can be performed. Alternatively, since the frame interpolation processing is processing for generating new frame data, an image which is changed is generated by the processing. Thus, the gray level of each pixel is changed. Therefore, by performing the overdrive processing after the frame interpolation processing is performed, the overdrive processing can be changed in accordance with the amount of change generated by the frame interpolation processing. Accordingly, by performing the overdrive processing after the frame interpolation processing is performed, the amount of overdrive can be controlled adequately, so that the gray level of each pixel can be optimized. Thus, the response speed can be made higher and the overdrive can be accurately performed. Further, by the frame interpolation processing, display with fewer afterimages can be performed. Accordingly, in order to obtain a high-quality image, it is preferable to perform the frame interpolation processing before the overdrive processing is performed. Note that one example of this embodiment is not limited to this.

Note that on a moving region of a screen, overdrive processing is performed in many cases. In addition, on a static region of the screen, overdrive processing is hardly performed because afterimages are not generated. That is, in the screen, there are a region where overdrive processing is performed and a region where overdrive processing is not performed. In addition, such regions change over time. In the case of performing overdrive processing only on parts of regions in a screen in this manner, there is an advantage such as improvement in processing speed, reduction in power consumption, or improvement in processing accuracy.

Further, super-resolution processing can be performed not on all regions in a screen but on parts of the regions in the screen. In the case of performing super-resolution processing only on parts of regions in a screen in this manner, there is an advantage such as improvement in processing speed, reduction in power consumption, improvement in processing accuracy, or reduction in image defects.

In the case where processing is performed on parts of regions in a screen, in the screen, there are a first region where overdrive processing is performed and a second region where super-resolution processing is performed. Further, a third region where neither of the processings is performed can be provided. Furthermore, a region where the first region and the second region do not overlap with each other can be provided in the screen. Alternatively, a region where the first region and the second region overlap with each other can be provided in the screen.

Thus, the region is considered in which the first region where the overdrive processing is performed does not overlap with the second region where the super-resolution processing is performed. In this case, since the first region where the overdrive processing is performed is a moving region, the overdrive processing is performed in order to make afterimages invisible. However, in such a moving region, even if resolution is made higher by super-resolution processing, it may be difficult for eyes to recognize the resolution. Therefor, in such a moving region, super-resolution processing is not performed in some cases. Accordingly, in that case, it can be said that the region in which the first region where the overdrive processing is performed does not overlap with the second region where the super-resolution processing is performed is provided in some cases. Further in that case, the second region whom the super-resolution processing is performed is a region whose detailed parts are preferably seen clearly. In the case where a static image such as a still image is displayed, detailed parts can be seen clearly. Accordingly, it can be said that the region in which the first region where the overdrive processing is performed does not overlap with the second region where the super-resolution processing is performed is provided in some cases.

In the region in which the first region where the overdrive processing is performed overlaps with the second region where the super-resolution processing is performed, response speed is high, an image with fewer afterimages is displayed, and detailed parts can be seen clearly. Thus, a realistic image can be displayed.

Thus far, the case has been described in which edge enhancement processing or overdrive processing is performed after super-resolution processing; however, processing performed after the super-resolution processing is not limited to this. In a manner similar to the case of performing edge enhancement processing or overdrive processing, local dimming processing of a backlight can be performed after super-resolution processing. FIG. 7D illustrates a processing flow of such a case. Therefore, the content or the drawing described in the edge enhancement processing or the overdrive processing can be applied to the case where local dimming processing of a backlight is performed in a similar manner. In a similar manner, the content or the drawing described in the local dimming processing of a backlight can be applied to the case where different processing is performed.

Here, the local dimming of a backlight is a technique by which display is performed with the luminance of a backlight changed in each region in a screen. Therefore, depending on an image, the luminance of the backlight is varied in each region in one screen. For example, in the case where there is a region for displaying a low gray level in a screen, the luminance of a backlight in the region is made lower. Further, in the case where there is a region for displaying a high gray level in the screen, the luminance of the backlight in the region is made higher. Then, the transmittance of each pixel is determined in accordance with the luminance of the backlight so that an accurate image can be displayed. Thus, in the region for displaying a low gray level in the screen, the luminance of the backlight itself is low, so that adverse effects of light leakage can be reduced. Therefore, in the case of displaying a black image in such a region, the image can be displayed as a completely black image. In addition, in the region for displaying a high gray level in the screen, the luminance of the backlight itself is high, so that sufficiently bright display can be performed. Therefore, in the case of displaying a white image in such a region, luminance is made higher than that in the case of displaying a normal white image, and the image can be displayed with higher peak luminance. Accordingly, contrast can be improved and a clear image can be displayed. Further, since the luminance of the backlight itself can be made lower by local dimming, power consumption can be reduced. Thus, in order to perform local dimming, there are processing for determining the luminance of a backlight in each region depending on an image to be displayed and processing for determining the transmittance of each pixel in accordance with the luminance of the backlight so that the image to be displayed can be accurately displayed. These processings or one of these processings is referred to as local dimming processing. Therefore, in the local dimming processing, after processing for determining the luminance of a backlight in each region is performed, processing for determining a video signal supplied to each pixel can be performed. Note that one example of this embodiment is not limited to this. Thus, for example, a processing flow in the case where the processing for determining the luminance of a backlight in each region and the processing for determining a video signal supplied to each pixel are separately described can be illustrated as in FIG. 7B.

It is preferable that local dimming processing be performed after super-resolution processing is performed in this manner. When the super-resolution processing is performed, due to restoration of data, new data is added. Thus, the gray level of each pixel is different before and after the super-resolution processing in some cases. Alternatively, before and after the super-resolution processing, there is a region where the gray level of a pixel is changed in a screen. Thus, by performing the local dimming after image data is restored by the super-resolution processing, the local dimming processing can be accurately performed. Therefore, contrast can be improved and an accurate image can be displayed. Accordingly, in order to obtain a high-quality image, it is preferable to perform the super-resolution processing before the local dimming processing is performed. Alternatively, in the local dimming processing, it is preferable to perform the super-resolution processing before the processing for determining the luminance of a backlight is performed. Alternatively, in the local dimming processing, it is preferable to perform the super-resolution processing before the processing for determining a video signal supplied to a pixel is performed. Note that one example of this embodiment is not limited to this.

Further, in the case of performing the local dimming processing, the luminance of the backlight is low. Thus, even when the transmittance of the pixel is slightly changed, the gray level of actual display is not changed so much. On the other hand, in a state where the luminance of the backlight is low, a more detailed gradation can be expressed by the change in the transmittance of the pixel. That is, the number of gray levels to be displayed can be increased. Therefore, by performing both the local dimming processing and the super-resolution processing, a high-resolution image can be displayed with high power of expression, by which detailed parts can be perceived. In particular, gradation can be expressed adequately in a region of a low gray level in the screen, and display where gradation is crushed can be prevented.

Note that in a region where a gray level is low in a screen, local dimming processing is performed in many cases. In addition, in a region where a gray level is high in the screen, i.e., a region where luminance is high and bright display is performed, local dimming processing is rarely performed because the luminance of a backlight is not easily lowered. That is, in the screen, there are a region where local dimming processing is performed and a region where local dimming processing is not performed. In addition, such regions change over time. In the case of performing local dimming processing only on parts of regions in a screen in this manner, there is an advantage such as improvement in processing speed, reduction in power consumption, or improvement in processing accuracy.

Further, super-resolution processing can be performed not on all regions in a screen but on parts of the regions in the screen. In the case of performing super-resolution processing only on parts of regions in a screen in this manner, there is an advantage such as improvement in processing speed, reduction in power consumption, improvement in processing accuracy, or reduction in image defects.

In the case where processing is performed on parts of regions in a screen, in the screen, there are a first region where local dimming processing is performed and the luminance of a backlight is lowered and a second region where super-resolution processing is performed. Further, a third region where neither the local dimming processing nor the super resolution processing is performed can be provided. Furthermore, a region in which the first region where the local dimming processing is performed and the luminance of the backlight is lowered does not overlap with the second region where the super-resolution processing is performed can be provided in the screen. Alternatively, a region where the first region and the second region overlap with each other can be provided in the screen.

In the region in which the first region where the local dimming processing is performed and the luminance of the backlight is lowered overlaps with the second region where the super-resolution processing is performed, contrast is high, an image can be displayed with smooth gradation expression, and detailed parts of the image can be clearly seen. Thus, a realistic image can be displayed.

Note that in the case of performing local dimming, a screen is divided into a plurality of regions, and a backlight is provided in each region. When the length (or the width) of the region or the pitch of the region is compared to the length (or the width) or the pitch of a pixel included in a display device in which super-resolution processing is performed on parts of the regions of the screen and which displays a region of a higher-resolution image, the length (or the width) of the region of the backlight or the pitch of the region is preferably longer than the length (or the width) or the pitch of the pixel included in the display device in which the super-resolution processing is performed on parts of the regions of the screen and which displays the region of a higher-resolution image. This is because in the case of performing the local dimming, an image is displayed by controlling not only the luminance of the backlight provided in each region but also the transmittance of the pixel. Therefore, even in the case of displaying an image on which super-resolution processing is performed, a high-resolution image can be clearly displayed sufficiently when the pitch of each pixel is short, though the length (or the width) or the pitch of the region of the backlight is long.

Note that it is preferable that the screen be divided into a plurality of regions where the luminance of the backlight is controlled; however, one example of this embodiment is not limited to this. The luminance of the entire screen can be controlled without division of the screen into a plurality of regions.

In a similar manner, it is preferable that local dimming processing be performed after frame interpolation processing is performed. Since the frame interpolation processing is processing for generating new frame data, an image which is changed is generated by the processing. Thus, the gray level of each pixel is changed. Alternatively, before and after the frame interpolation processing, there is a region where the gray level of a pixel is changed in a screen. Therefore, by performing local dimming processing after new frame data is generated by frame interpolation processing, the local dimming processing can be accurately performed. Thus, contrast can be improved and an accurate image can be displayed. Accordingly, in order to obtain a high-quality image, it is preferable to perform the frame interpolation processing before the local dimming processing is performed. Alternatively, in the local dimming processing, it is preferable to perform the frame interpolation processing before processing for determining the luminance of a backlight is performed. Alternatively, in the local dimming processing, it is preferable to perform the frame interpolation processing before processing for determining a video signal supplied to a pixel is performed. Note that one example of this embodiment is not limited to this.

In each of FIGS. 7A to 7D, the case is described in which super-resolution processing, frame interpolation processing, and different processing (e.g., edge enhancement processing, overdrive processing, or local dimming processing of a backlight) are performed. Note that one example of this embodiment is not limited to this. In addition to the above processings, processing such as edge enhancement processing, overdrive processing, or local dimming processing of a backlight can be performed. Therefore, in a similar manner, any of the contents or the drawings described thus far can be applied to the case where different processing is further performed.

Figure 8A:
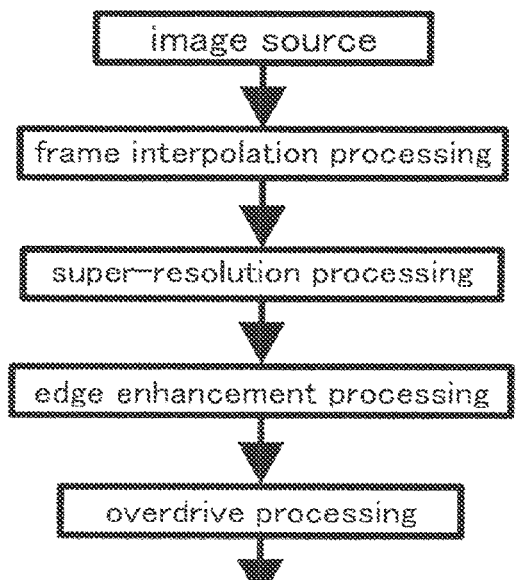
FIGS. 8A to 8E illustrate flows according to one example of the embodiment.
Figure 8B:
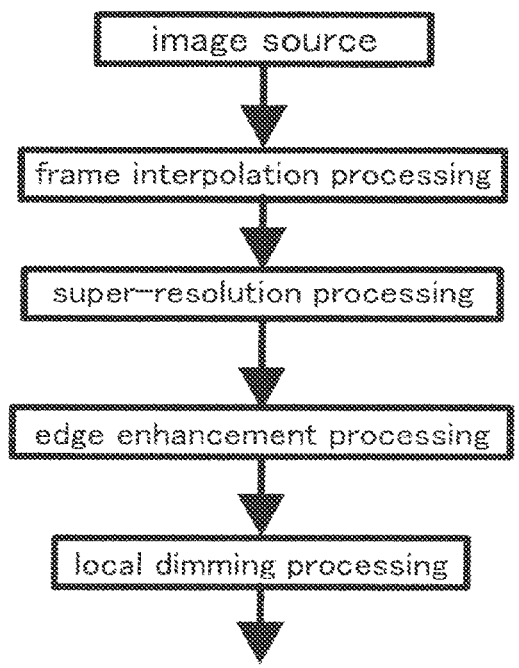

For example, FIGS. 8A and 8B each illustrate a processing flow in the case where different processing is performed in addition to super-resolution processing, frame interpolation processing, and edge enhancement processing. That is, the processing flows illustrated in FIGS. 8A and 8B each correspond to a processing flow where different processing is added to the processings illustrated in FIG. 7A and FIG. 1A. Note that one example of this embodiment is not limited to this.

FIG. 8A illustrates a processing flow in the case where frame interpolation processing is performed using an image signal obtained from an image source so that frame frequency is made higher, super-resolution processing is performed so that resolution is increased, edge enhancement processing is performed, and then overdrive processing is performed. Therefore, the processing flow in FIG. 8A corresponds to a processing flow where edge enhancement processing is added to the processing flow in FIG. 7C. The processing flow in FIG. 8A corresponds to a processing flow where edge enhancement processing and overdrive processing are added to the processing flow in FIG. 1A.

Note that a variety of processings are further performed after the overdrive processing is performed. After that, an image can be displayed.

Figure 9A:
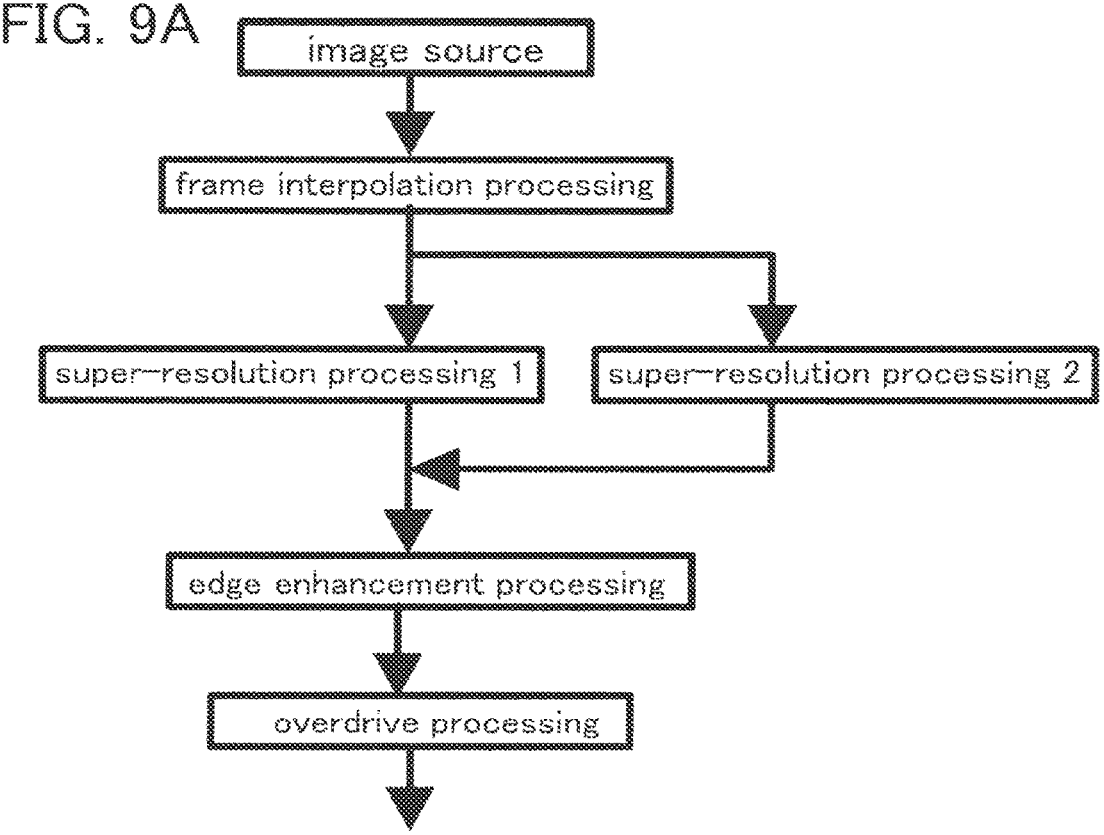
FIGS. 9A and 9B illustrate flows according to one example of the embodiment.
Figure 9B:
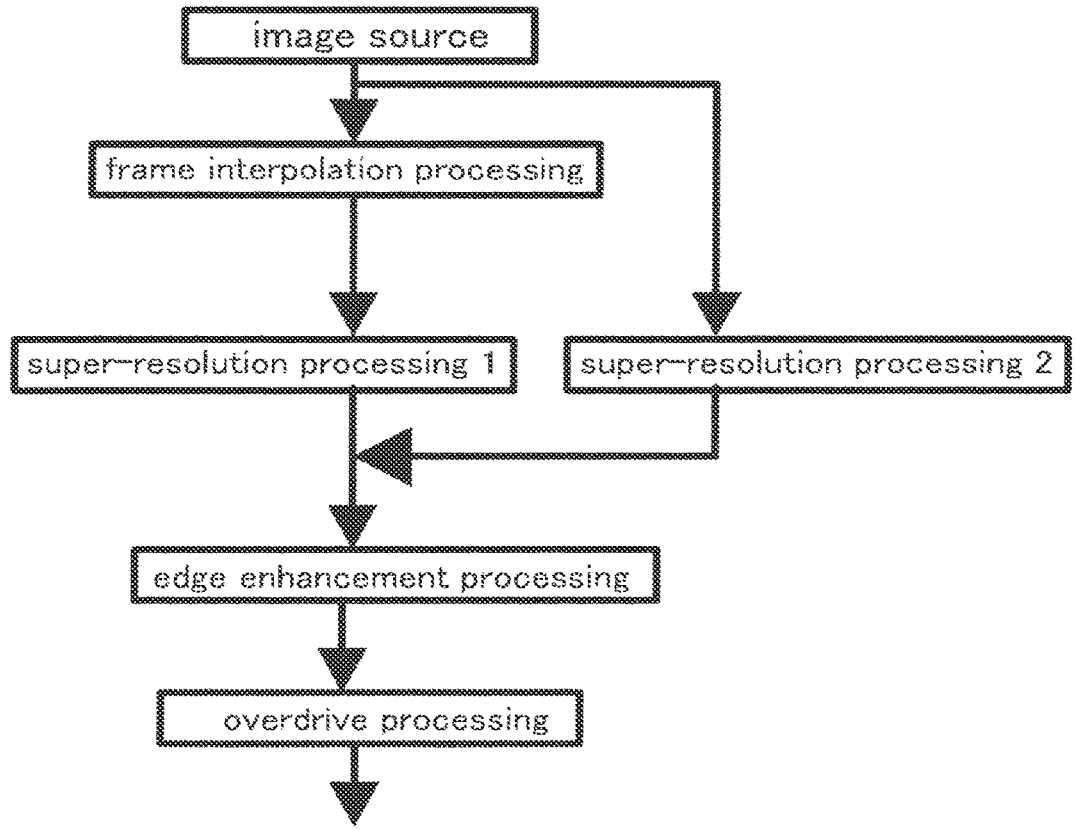

Note that as in FIG. 1B. FIG. 1C, FIG. 5B, FIG. 5C, FIG. 7B, or the like, super-resolution processing can be performed using a plurality of processing systems. FIGS. 9A and 9B illustrate examples of such a case.

By performing super-resolution processing before edge enhancement processing is performed as in FIG. 8A, FIG. 9A, FIG. 9B, or the like, resolution can be accurately improved. Since the edge enhancement processing is not performed on an image before subjected to the super-resolution processing, unnecessary processing is not performed. Therefore, the super-resolution processing can be accurately performed.

In a similar manner, since the frame interpolation processing is performed before the edge enhancement processing is performed, data for frame interpolation can be accurately generated. By performing the edge enhancement processing on a more accurate high-resolution image, the edge of an object in the image can be more accurately acquired, so that a clearer image can be obtained.

By performing overdrive processing after super-resolution processing, edge enhancement processing, and frame interpolation processing are performed, response speed can be made higher, the amount of overdrive can be controlled adequately, and display with fewer afterimages can be performed. Alternatively, since frame frequency is made higher by frame interpolation processing, overdrive processing can be changed in accordance with an increase in frame frequency. Alternatively, the gray level of each pixel is changed in accordance with a change in an image by super-resolution processing, edge enhancement processing, and frame interpolation processing; thus, overdrive processing can be changed in accordance with the amount of a change in gray level. Therefore, by performing the overdrive processing after the super-resolution processing, the edge enhancement processing, and the frame interpolation processing are performed, the amount of overdrive can be controlled adequately, so that the gray level of each pixel can be optimized. Thus, the response speed can be made higher and the overdrive can be accurately performed. Further, by the super-resolution processing, a high-resolution image can be displayed without generation of afterimages. Furthermore, by the edge enhancement processing, a sharply-defined image can be displayed. Alternatively, by the frame interpolation processing, afterimages can be reduced and moving images can be accurately displayed. Accordingly, in order to obtain a high-quality image, it is important to perform the super-resolution processing, the edge enhancement processing, and the frame interpolation processing before the overdrive processing is performed. Note that one example of this embodiment is not limited to this.

FIG. 8B illustrates a processing flow in the case where frame interpolation processing is performed using an image signal obtained from an image source so that frame frequency is made higher, super-resolution processing is performed so that resolution is increased, edge enhancement processing is performed, and then local dimming processing is performed. Therefore, the processing flow in FIG. 8B corresponds to a processing flow where edge enhancement processing is added to the processing flow in FIG. 7D.

Note that a variety of processings are further performed after the local dimming processing is performed. After that, an image can be displayed.

By performing super-resolution processing before edge enhancement processing is performed in this manner, resolution can be accurately improved. Since the edge enhancement processing is not performed on an image before subjected to the super-resolution processing, unnecessary processing is not performed. Therefore, the super-resolution processing can be accurately performed.

In a similar manner, since the frame interpolation processing is performed before the edge enhancement processing is performed, data for frame interpolation can be accurately generated. By performing the edge enhancement processing on a more accurate high-resolution image, the edge of an object in the image can be more accurately acquired, so that a clearer image can be obtained.

Alternatively, it is preferable that local dimming processing be performed after super-resolution processing, edge enhancement processing, and frame interpolation processing are performed. When the super-resolution processing is performed, due to restoration of data, new data is added. Thus, the gray level of each pixel is different before and after the super-resolution processing in some cases. Alternatively, before and after the super-resolution processing, there is a region where the gray level of a pixel is changed in a screen. In a similar manner, by the edge enhancement processing, an image is processed such that the edge of an object in the image is enhanced. Thus, there is a region where the gray level of a pixel is changed in a screen. In a similar manner, by the frame interpolation processing, a new frame and a new image are generated. Thus, there is a region where the gray level of a pixel is changed in a screen. Thus, by performing local dimming after a new frame is generated by frame interpolation processing, image data is restored by super-resolution processing, and image processing is performed by edge enhancement processing, the local dimming processing can be accurately performed. Therefore, contrast can be improved and an accurate image can be displayed. Accordingly, in order to obtain a high-quality image, it is preferable to perform the super-resolution processing, the edge enhancement processing, and the frame interpolation processing before the local dimming processing is performed. Alternatively, in the local dimming processing, it is preferable to perform the super-resolution processing, the edge enhancement processing, and the frame interpolation processing before processing for determining the luminance of a backlight is performed. Alternatively, in the local dimming processing, it is preferable to perform the super-resolution processing, the edge enhancement processing, and the frame interpolation processing before processing for determining a video signal supplied to a pixel is performed. Note that one example of this embodiment is not limited to this.

Figure 8C:
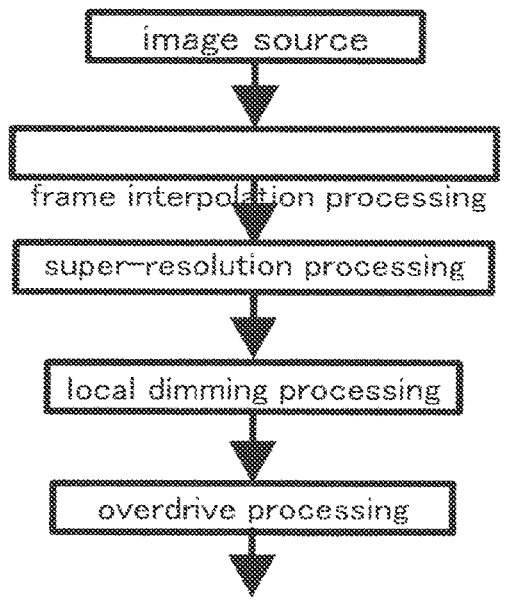

FIG. 8C illustrates a processing flow in the case where frame interpolation processing is performed using an image signal obtained from an image source, super-resolution processing is performed so that resolution is increased, local dimming processing is performed, and then overdrive processing is performed. Therefore, the processing flow in FIG. 8C corresponds to a processing flow where local dimming processing is added to the processing flow in FIG. 8A. Alternatively, the processing flow in FIG. 8C corresponds to a processing flow where overdrive processing is added to the processing flow in FIG. 8B. Alternatively, the processing flow in FIG. 8C corresponds to a processing flow where overdrive processing and local dimming processing are added to the processing flow in FIG. 1A. Alternatively, the processing flow in FIG. 8C corresponds to a processing flow where local dimming processing is added to the processing flow in FIG. 7C. Alternatively, the processing flow in FIG. 8C corresponds to a processing flow where local dimming processing is added to the processing flow in FIG. 7D.

It is preferable that local dimming processing be performed after super-resolution processing and frame interpolation processing are performed in this manner. When the super-resolution processing is performed, due to restoration of data, new data is added. Thus, the gray level of each pixel is different before and after the super-resolution processing in some cases. Alternatively, before and after the super-resolution processing, there is a region where the gray level of a pixel is changed in a screen. In a similar manner, by the frame interpolation processing, a new fame and a new image are generated. Thus, there is a region where the gray level of a pixel is changed in a screen. Therefore, by performing local dimming after a new frame is generated by frame interpolation processing and image data is restored by super-resolution processing, the local dimming processing can be accurately performed. Thus, contrast can be improved and an accurate image can be displayed. Accordingly, in order to obtain a high-quality image, it is preferable to perform the super-resolution processing and the frame interpolation processing before the local dimming processing is performed. Alternatively, in the local dimming processing, it is preferable to perform the super-resolution processing and the frame interpolation processing before processing for determining the luminance of a backlight is performed. Alternatively, in the local dimming processing, it is preferable to perform the super-resolution processing and the frame interpolation processing before processing for determining a video signal supplied to a pixel is performed. Note that one example of this embodiment is not limited to this.

Alternatively, by performing overdrive processing after frame interpolation processing, super-resolution processing, and local dimming processing are performed, response speed can be made higher, the amount of overdrive can be controlled adequately, and display with fewer afterimages can be performed. Alternatively, the gray level of each pixel is changed in accordance with a change in luminance of an image or a backlight by frame interpolation processing, super-resolution processing, and local dimming processing; thus, overdrive processing can be changed in accordance with the amount of a change in luminance. Therefore, by performing the overdrive processing after the frame interpolation processing, the super-resolution processing, and the local dimming processing are performed, the amount of overdrive can be controlled adequately, so that the gray level of each pixel can be optimized. Thus, the response speed can be made higher and the overdrive can be accurately performed. Further, by the super-resolution processing, a high-resolution image can be displayed without generation of afterimages. Furthermore, by the local dimming processing, a high-contrast image can be displayed. Alternatively, by the frame interpolation processing, afterimages can be reduced and moving images can be accurately displayed. Accordingly, in order to obtain a high-quality image, it is preferable to perform the frame interpolation processing, the super-resolution processing, and the local dimming processing before the overdrive processing is performed. Note that one example of this embodiment is not limited to this.

Figure 8E:
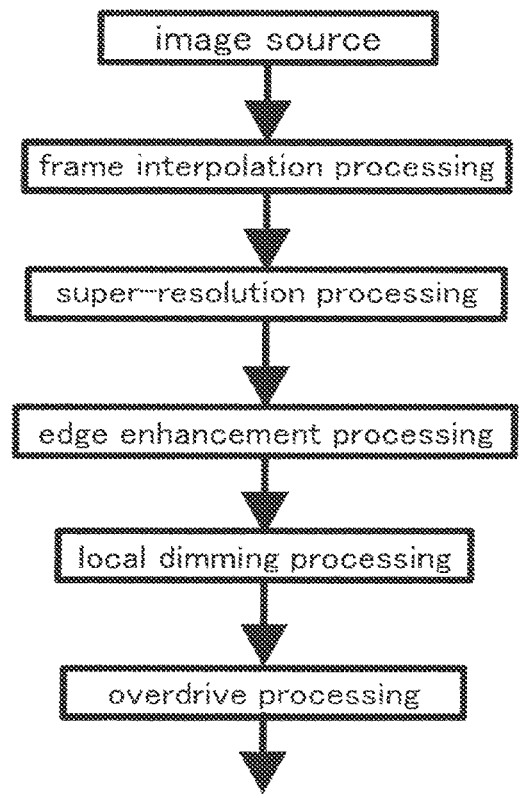
Figure 8D:
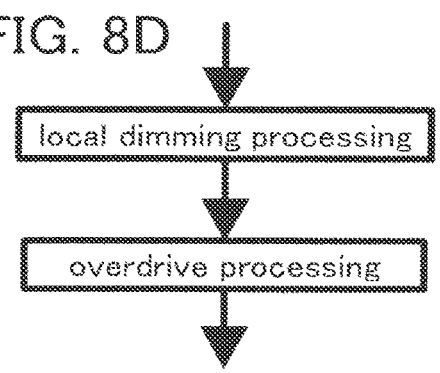

In the case where both local dimming processing and overdrive processing are performed in this manner, it is preferable that overdrive processing be performed after the local dimming processing is performed, as illustrated in FIG. 8D. Note that one example of this embodiment is not limited to this. Note that before and after each stage in the processing flow, a variety of different processings can be performed. As examples of a variety of different processings, there are super-resolution processing, edge enhancement processing, frame interpolation processing, overdrive processing, local dimming processing, IP conversion processing, enlargement processing, and the like. Further, different processing is possible.

Therefore, in the case where overdrive processing is performed in FIG. 8B or in the case where local dimming processing is performed in FIG. 8A, a processing flow as in FIG. 8E is preferably used. Note that one example of this embodiment is not limited to this.

Embodiment 4

Next, the case where part of a processing flow is deformed is described. Therefore, the content described in any of the other embodiments can be applied to, combined with, or replaced with this embodiment.

Figure 10A:
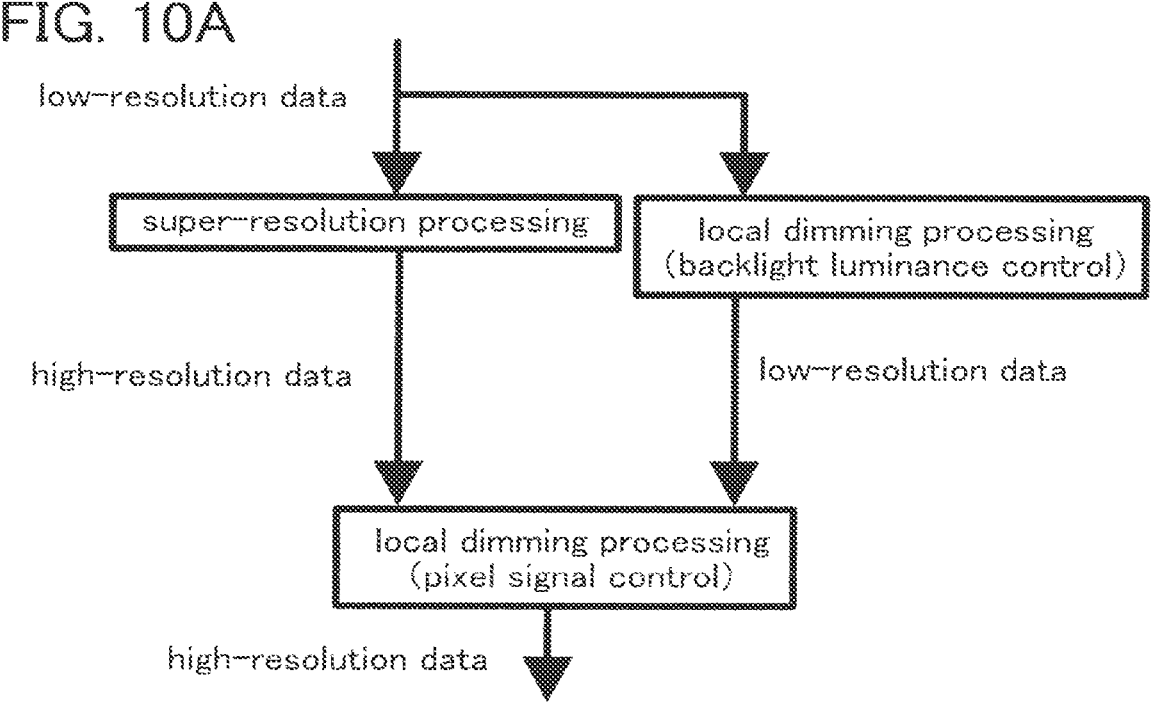
FIGS. 10A and 10B illustrate flows according to one example of an embodiment.
Figure 10B:
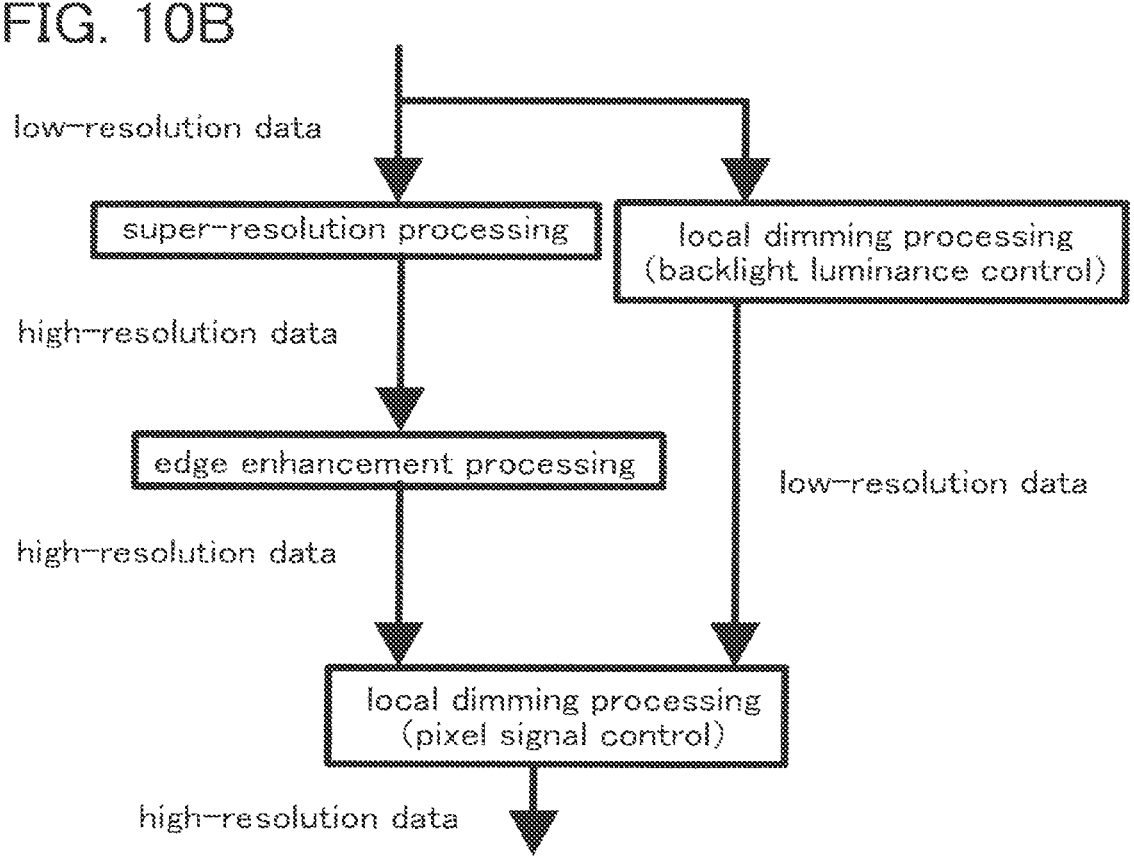

FIGS. 10A and 10B each illustrate an example of the case where part of FIG. 7E, FIG. 7D, FIG. 8B, FIG. 8C, FIG. 8E, or the like is deformed. First, super-resolution processing is performed. Concurrently, processing for controlling the luminance of a backlight in local dimming processing is performed using image data on which super-resolution processing is not performed. Then, by using data whose resolution is made higher by super-resolution processing and data related to the determined luminance of each region of the backlight, which has low resolution, processing for determining a video signal to be supplied to each pixel in the local dimming processing is performed.

In the case of performing the super-resolution processing, an image is not significantly changed in some cases. In addition, the pitch of the backlight is much larger than the pixel pitch. Therefore, even when processing for determining the luminance of a backlight in each region in the local dimming processing is performed by using data before subjected to the super-resolution processing, there is no practical problem.

By performing such processing, the super-resolution processing and the processing for controlling the luminance of a backlight in local dimming processing can be concurrently performed. Thus, the total processing time can be shortened. Accordingly, even in the case where real-time display is needed, for example, in the case of displaying a game, display can be performed without delay.

For example, by using a multi-core CPU including a plurality of CPU cores and distributing processings across the CPU cores, super-resolution processing and local dimming processing can be performed concurrently. With the use of a multi-core CPU in this manner, high-speed operation is possible with fewer components. Note that such a multi-core CPU can include a semiconductor device (or a transistor) formed using an SOI. With the use of an SOI, operation can be performed with low power consumption and heat generation during the operation can be suppressed.

Note that in FIG. 10A, edge enhancement processing, overdrive processing, frame interpolation processing, or the like can be added. For example, a flow chart in the case where edge enhancement processing is added is illustrated in FIG. 10B. FIG. 10B illustrates a flow chart in the case where edge enhancement processing is performed after super-resolution processing is performed. Note that one example of this embodiment is not limited to this.

Figure 11A:
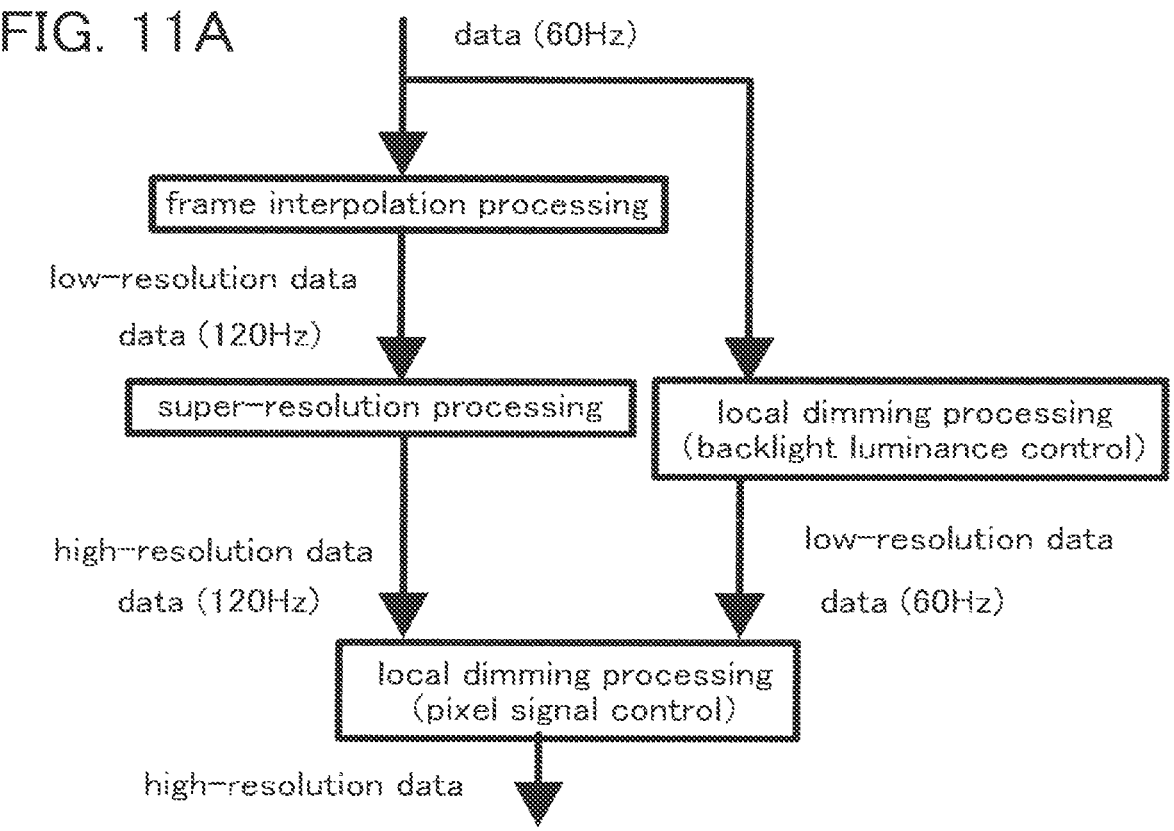
FIGS. 11A and 11B illustrate flows according to one example of the embodiment.
Figure 11B:
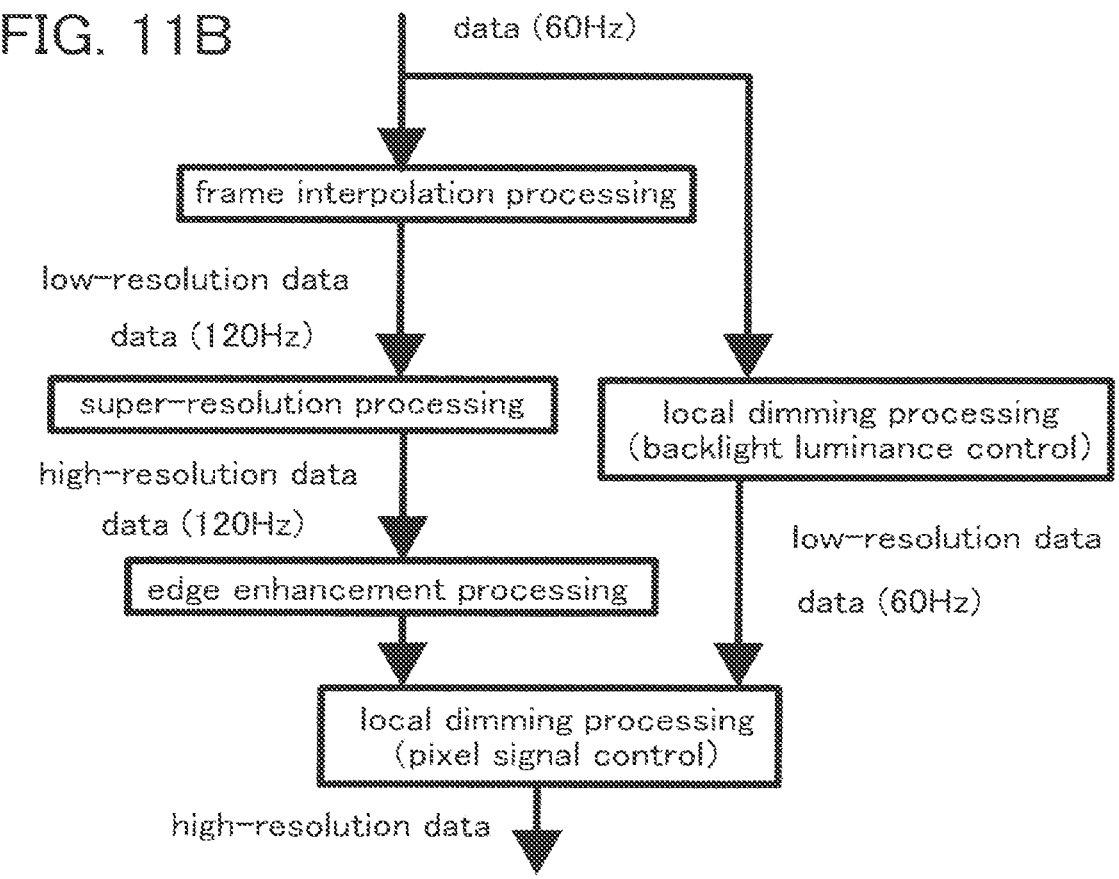

FIGS. 11A and 11B each illustrate another example of the case where part of FIG. 7D, FIG. 8B, FIG. 8C, FIG. 8E, or the like is deformed. First, frame interpolation processing is performed. Concurrently, processing for controlling the luminance of a backlight in local dimming processing is performed using image data whose frame frequency has not been made higher. Next, super-resolution processing is performed using image data whose frame frequency has been made higher by the frame interpolation processing. Then, by using data whose resolution is made higher and data related to the determined luminance of each region of the backlight, which has low resolution, processing for determining a video signal supplied to each pixel in the local dimming processing is performed.

Note that the super-resolution processing and the processing for controlling the luminance of a backlight in the local dimming processing can be performed concurrently.

For example, by using a multi-core CPU including a plurality of CPU cores and distributing processings across the CPU cores, frame interpolation processing, super-resolution processing, and local dimming processing can be performed concurrently. With the use of a multi-core CPU in this manner, high-speed operation is possible with fewer components. Note that such a multi-core CPU can include a semiconductor device (or a transistor) formed using an SOI. With the use of an SOL, operation can be performed with low power consumption and heat generation during the operation can be suppressed.

In the case of performing the frame interpolation processing, an image is not significantly changed in some cases. In addition, the pitch of the backlight is much larger than the pixel pitch. Therefore, even when processing for determining the luminance of a backlight in each region in the local dimming processing is performed by using data before subjected to the frame interpolation processing, there is no practical problem.

By performing such processing, the frame interpolation processing and the processing for controlling the luminance of a backlight in local dimming processing can be concurrently performed. Thus, the total processing time can be shortened. Accordingly, even in the case where real-time display is needed, for example, in the case of displaying a game, display can be performed without delay.

Note that in FIG. 11A, edge enhancement processing, overdrive processing, or the like can be added. For example, FIG. 11B illustrates an example of the case where edge enhancement processing is also performed. Note that one example of this embodiment is not limited to this.

Note that in FIG. 11A, the super-resolution processing can be performed using a plurality of processing systems. FIGS. 12A and 12B illustrate examples of such a case. FIG. 12A corresponds to a processing flow to which the processing flow in FIG. 1B is applied. FIG. 12B corresponds to a processing flow to which the processing flow in FIG. 5B is applied. The content described in Embodiment 1 can be applied in this manner. The other contents can be applied in a similar manner.

Embodiment 5

In this embodiment, examples of lighting devices are described. The lighting device can be used as a backlight of a liquid crystal display device, an interior lamp, or the like. Note that one example of this embodiment is not limited to this.

Figure 13A:
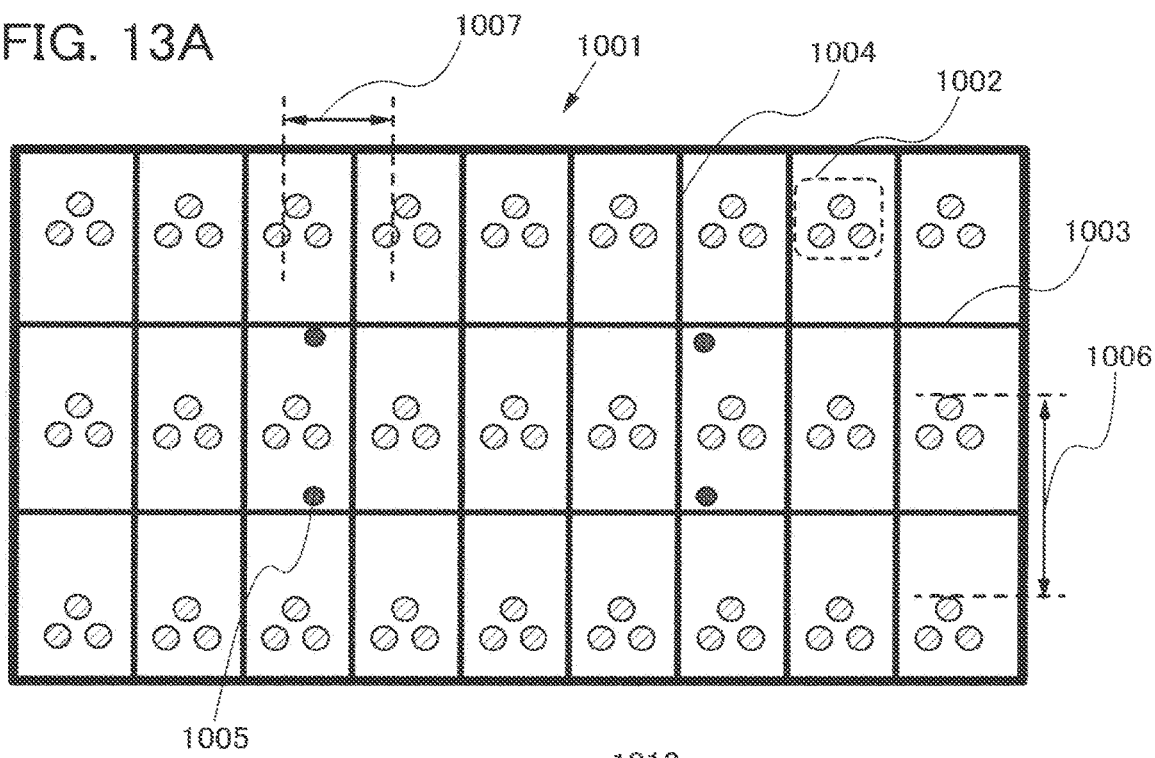
FIG. 13A is a top view illustrating a device according to one example of an embodiment.
Figure 13B:
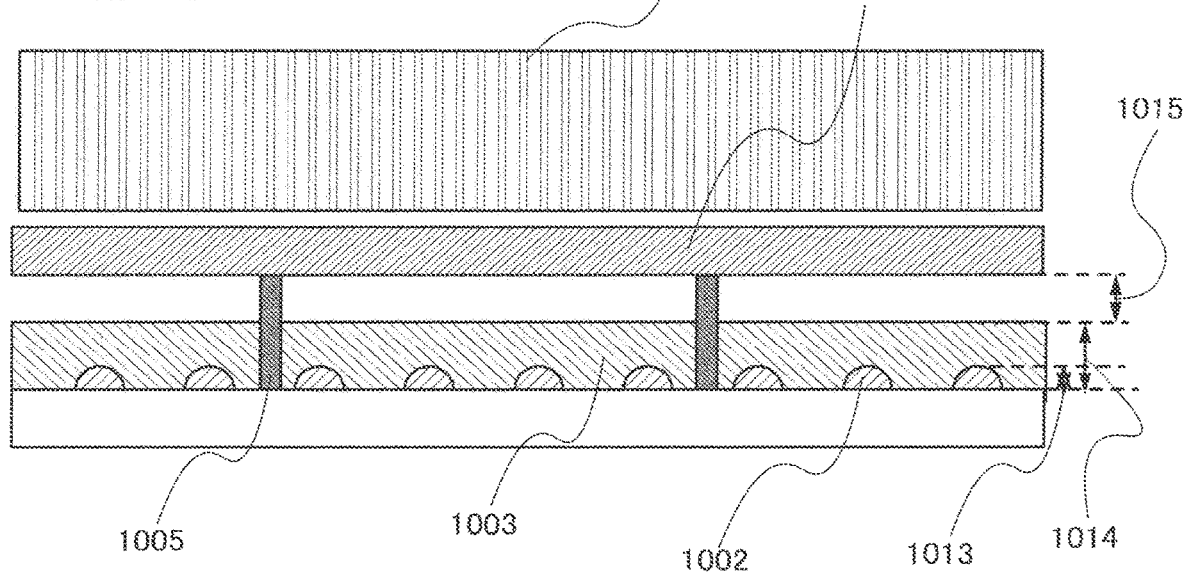
FIG. 13B is a cross-sectional view illustrating the device.

FIGS. 13A and 13B illustrate a backlight or a lighting device in the case where a point light source is used. As illustrated in FIG. 13A, a device 1001 includes a plurality of point light sources 1002. By arranging the point light sources 1002 in array, a uniform planar light source can be formed. The device 1001 can be used as a backlight of a liquid crystal display device or part of the backlight of the liquid crystal display device.

In addition, partitions 1003 are arranged in a lateral direction. Further, partitions 1004 are arranged in a longitudinal direction. By arranging the plurality of partitions 1003 and the plurality of partitions 1004, the planar light source can be divided into a plurality of regions. In FIG. 10A, the planar light source is divided into three regions in the longitudinal direction and is divided into nine regions in the lateral direction. Therefore, light can be prevented from leaking into a different region by the partitions. Further, by controlling the luminance of the point light source 1002 in each region, local dimming (local dimming of a backlight) can be realized. In particular, by arranging the partitions, light can be prevented from leaking into a different region, so that the luminance of each region can be accurately controlled. Therefore, the transmittance of a liquid crystal element in each region can be easily derived. Alternatively, contrast can be improved because of little light leakage. Note that one example of this embodiment is not limited to this.

Alternatively, some of the light sources can be set to be in a non-lighting state and the non-lighting state can be moved line by line or block by block in a screen. That is, the point light sources in the screen can be party turned off and the off-state regions can be scanned. For example, the point light sources can be scanned from the top to the bottom. By performing such backlight scanning, afterimages can be reduced and moving-image characteristics can be improved.

Note that as the partitions, only partitions which are arranged in a lateral direction like the partitions 1003 can be arranged. Alternatively, as the partitions, only partitions which are arranged in a longitudinal direction like the partitions 1004 can be arranged. Alternatively, it is possible not to provide a partition itself.

Note that it is preferable that a surface of the partition 1003 or the partition 1004 be a mirror surface or a white surface. Note that one example of this embodiment is not limited to this. In the case of the mirror surface, light can be reflected, so that light can be efficiently utilized. Therefore, power consumption can be reduced. In the case of the white surface, light can be diffused. Therefore, boundaries between regions are not easily seen, so that visibility can be improved.

Note that the transmittance of the partition 1003 or the partition 1004 is preferably less than or equal to 50%, more preferably less than or equal to 30%. Alternatively, the transmittance of the partition 1003 or the partition 1004 is preferably greater than or equal to 1%, more preferably greater than or equal to 5%. Note that one example of this embodiment is not limited to this. Because of low transmittance, light leakage can be reduced and the luminance of each region can be accurately controlled. However, in the case where light does not pass completely, the boundaries between the regions are seen, so that visibility is decreased in some cases. Therefore, when a slight amount of light passes, the boundaries between the regions are not easily seen, so that visibility can be improved.

Note that the partition 1003 or the partition 1004 can be formed using an organic matter such as acrylic, plastics, polycarbonate, or PET. Note that one example of this embodiment is not limited to this.

Note that a spacer 1005 can be provided. Note that one example of this embodiment is not limited to this. It is possible not to provide the spacer 1005. The spacer 1005 has a function of preventing a sheet provided over the point light sources 1002, the partitions 1003, the partitions 1004, and the like from bending.

Note that in the case of providing the spacer 1005, the number of the spacers 1005 is not so large but can be small. Therefore, in FIG. 13A, the planar light source is divided into three regions in the longitudinal direction and is divided into nine regions in the lateral direction, so that twenty seven regions are provided in total. It is possible to provide regions where the spacers 1005 are provided and regions where the spacers 1005 are not provided. Alternatively, the number of the spacers 1005 can be smaller than the number of the regions. In the case where the spacers 1005 are not provided in all the regions in this manner, manufacture can be facilitated and/or cost can be reduced.

Note that it is preferable that the spacer 1005 be a transparent spacer, a black spacer, or a white spacer. With the transparent spacer, the black spacer, or the white spacer, generation of unevenness in luminance or deviation of color depending on existence and nonexistence of the spacer 1005 can be suppressed. Note that one example of this embodiment is not limited to this.

Note that the spacer 1005 can be formed using an organic matter such as acrylic, plastics, polycarbonate, or PET. Note that one example of this embodiment is not limited to this.

Note that for example, the point light source 1002 is formed using light-emitting diodes of three colors or lasers of three colors. In addition, the light-emitting diodes or the lasers have colors of red, blue, and green. Further, for example, by using the lasers of three colors, a white color can be expressed. Therefore, colors are not limited to red, blue, and green as long as a white color can be expressed. For example, cyan, magenta, yellow, and the like (CMYK) can be used for the point light source.

In the case where luminance can be controlled in each color in this manner, local dimming can be performed more precisely. Thus, power consumption can be reduced or contrast can be improved, for example.

Note that the number of light-emitting diodes of each color is preferably the same. Note that one example of this embodiment is not limited to this. Only the number of light-emitting diodes of a certain color can be increased. For example, the number of green light-mitting diodes can be twice the number of red or blue light-emitting diodes. By changing the number of light-emitting diodes in each color in this manner, chromaticity can be easily adjusted. Further, a difference in the life of light-emitting diodes between the respective colors can be suppressed.

Note that colors of the light-emitting diodes are not limited to three colors. For example, by using a light-emitting diode having a color which is similar to a certain color, chromaticity can be increased. For example, four colors can be used by addition of a color which is similar to green to red, blue, and green.

Note that a white light-emitting diode can be used in addition to a red light-emitting diode, a blue light-emitting diode, and a green light-emitting diode. By using the white light-emitting diode, the lives of the light-emitting diodes can be prolonged. Alternatively, by using the white light-emitting diode, the change in color due to temperature can be suppressed.

Note that it is possible to use only a white light-emitting diode and not to use a light-emitting diode other than the white light-emitting diode, such as a red light-emitting diode, a blue light-emitting diode, or a green light-emitting diode. By using only the white light-emitting diode, colors can be prevented from not being mixed with each other. Alternatively, by using only the white light-emitting diode, deviation of color due to deterioration can be suppressed.

Note that a pitch 1007 of the point light source 1002 in the lateral direction is preferably shorter than a pitch 1006 of the point light source 1002 in the longitudinal direction. Note that one example of this embodiment is not limited to this.

Note that as for the number of regions, the number of regions in the lateral direction is preferably larger than the number of regions in the longitudinal direction. For example, the number of regions in the longitudinal direction is three and the number of regions in the lateral direction is nine in FIG. 13A.

Note that the number of regions in one screen is preferably smaller than the number of light-emitting diodes of a certain color. That is, as for a certain color in one region, a plurality of point light sources are preferably provided. As for the point light sources provided in one region, the luminance of the plurality of point light sources of a certain color is preferably controlled so as to be the same luminance at the same time. That is, luminance is preferably controlled in each color in one region. For example, in the case where three red light-emitting diodes are provided in one region, it is preferable that the luminance of the three light-emitting diodes be raised when the luminance is raised and the luminance of the three light-emitting diodes be lowered when the luminance is lowered. However, since characteristics of light-emitting diodes or the like vary, it is difficult to make the light-emitting diode have the same luminance. Therefore, it is preferable that the light-emitting diodes emit light at the same luminance in consideration of variations in characteristics. For example, it is preferable that the light-emitting diodes emit light at the same luminance in consideration of a variation of approximately 30%. By providing a plurality of point light sources in one region in this manner, unevenness in luminance can be suppressed. Alternatively, deterioration of the point light sources can be suppressed. Note that one example of this embodiment is not limited to this.

FIG. 13B illustrates an example of part of a cross section in FIG. 13A. A diffusing plate 1011 is provided over the device 1001. Unevenness in luminance is suppressed by the diffusing plate 1011. The diffusing plate 1011 is supported by the spacers 1005 so as not to bend even in the center of the screen.

A display panel 1012 is provided over the diffusing plate 1011. The display panel includes, for example, a pixel, a driver circuit, a liquid crystal element, a glass substrate, a thin film transistor, a polarization plate, a retardation plate, a color filter, and/or a prism sheet. By operating the display panel 1012 in cooperation with the backlight, appropriate display can be performed.

Note that the diffusing plate 1011 has a function of diffusing light while transmitting light. Thus, it is preferable that the diffusing plate 1011 have a function of diffusing light and have high transmittance. Therefore, the transmittance of the diffusing plate 1011 is preferably higher than the transmittance of the partition 1003. When the transmittance of the diffusing plate 1011 is high, light reflected on the partition 1003 can be transmitted through the diffusing plate 1011. Thus, light can be prevented from leaking into a different region and can be easily emitted to the screen. Therefore, luminance in each region can be precisely controlled and local dimming can be accurately performed. Note that one example of this embodiment is not limited to this.

Note that height 1014 of the partition 1003 is preferably higher than height 1013 of the point light source 1002. In order to prevent light emitted from the point light source 1002 from leaking into a different region, the height 1014 of the partition 1003 is preferably higher than the height 1013 of the point light source 1002. Note that one example of this embodiment is not limited to this.

Note that a distance 1015 between the partition 1003 and the diffusing plate 1011 is preferably shorter than the height 1014 of the partition 1003. In the case where the distance 1015 is long, a large amount of light leaks. Therefore, the distance 1015 is preferably shorter than the height 1014 of the partition 1003. Note that one example of this embodiment is not limited to this.

Note that the distance 1015 between the partition 1003 and the diffusing plate 1011 is preferably longer than the height 1013 of the point light source 1002. In the case where the distance 1015 is too short, boundaries between regions may be seen on the screen because the boundaries are sharp. Therefore, in order that the boundaries between the regions are not seen on the screen, length for leakage of some light is needed. Thus, by making the height of the partition 1003 higher than the height 1013 of the point light source 1002, an appropriate amount of light can leak. Note that one example of this embodiment is not limited to this.

Note that it is preferable that the height 1014 of the partition 1003 be substantially the same as the height of the point light source 1002. Description "substantially the same" refers to the case where two objects have the same values in consideration of an error in manufacturing, variation, or a slight difference. For example, a variation of approximately 10% can be included. By making the height of the partition be substantially the same as the height of the point light source 1002, the amount of light leakage can be uniform, so that unevenness in luminance can be suppressed. Note that one example of this embodiment is not limited to this.

Note that although the point light source is provided in each region in FIGS. 13A and 13B, one example of this embodiment is not limited to this. A small planar light source can be provided in each region. FIGS. 14A to 14D illustrate an example of the case where a planar light source is provided in each region. The planar light source can be formed in a manner similar to that in the case of point light source. Therefore, the content (may be part of the content) or the diagram (may be part of the diagram) described in FIGS. 13A and 13B can be applied to FIGS. 14A to 14D.

Figure 14A:
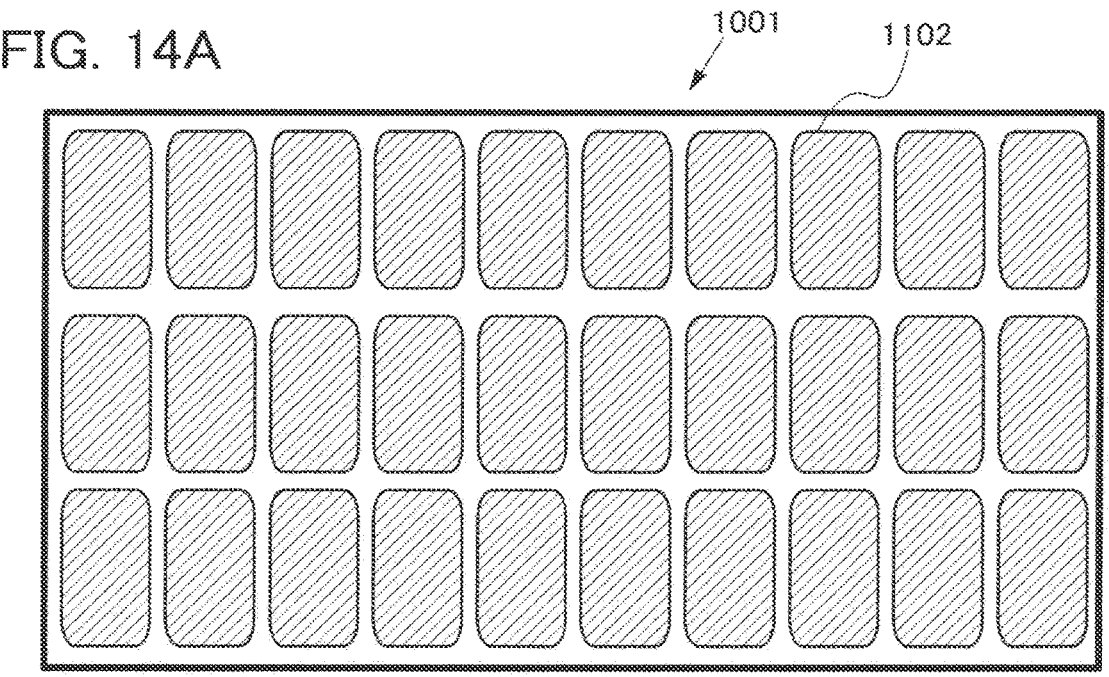
FIGS. 14A and 14C are top views illustrating a device according to one example of the embodiment.

In FIG. 14A, a planar light source 1102 is provided in each region. The planar light source 1102 can be realized with a variety of structures.

Note that although FIG. 11A illustrates the case where the partition 1003 and the partition 1004 are not provided, one example of this embodiment is not limited to this. Only partitions which are arranged in a lateral direction like the partitions 1003 can be arranged. Alternatively, only partitions which are arranged in a longitudinal direction like the partitions 1004 can be arranged. Alternatively, it is possible to provide both of the partitions.

Note that the spacer 1005 can be provided. Note that one example of this embodiment is not limited to this. It is possible not to provide the spacer 1005. The spacer 1005 has a function of preventing a sheet provided over the planar light sources 1102 and the like from bending. Note that in the case of the planar light source, the area of a void in a region is small, so that it is possible not to provide the spacer 1005.

Note that the pitch of the planar light source 1102 in the lateral direction is preferably shorter than the pitch of the planar light source 1102 in the longitudinal direction. Note that one example of this embodiment is not limited to this.

Note that the height of the partition is preferably higher than the height of the planar light source 1102. In order to prevent light emitted from the planar light source 1102 from leaking into a different region, the height of the partition is preferably higher than the height of the planar light source 1102. Note that one example of this embodiment is not limited to this.

Further, in the case where a diffusing plate is provided over the planar light source 1102, a distance between the partition and the diffusing plate is preferably longer than the height of the planar light source 1102. In the case where the distance is too short, boundaries between regions may be seen on a screen because the boundaries are sharp. Therefore, in order that the boundaries between the regions are not seen on the screen, length for leakage of some light is needed. Thus, by making the height of the partition higher than the height of the planar light source 1102, an appropriate amount of light can leak. Note that one example of this embodiment is not limited to this.

Figure 14B:
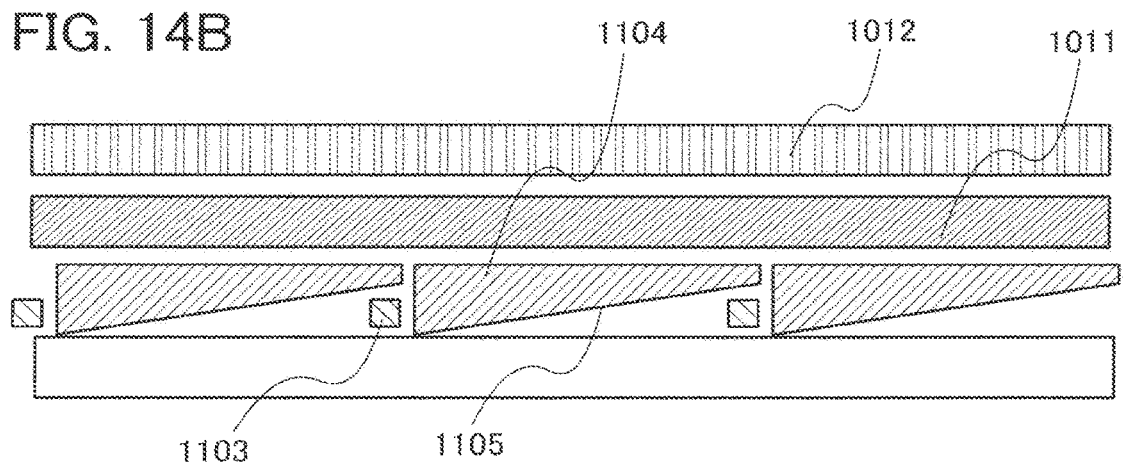
FIGS. 14B and 14D are cross-sectional views illustrating the device.

Next, as an example of the planar light source 1102, FIG. 14B illustrates a cross section in the case where a light guide plate and a line light source (or a group of point light sources) are provided and a small planar light source is formed. FIG. 14B illustrates a cross section of three planar light sources. Light enters a light guide plate 1104 from a line light source 1103. Light is fully reflected in the light guide plate 1104 repeatedly and is transmitted. In addition, a bottom surface 1105 of the light guide plate 1104 is processed. Therefore, light is emitted from a surface of the light guide plate 1104, so that a planar light source is realized.

For example, the bottom surface 1105 is processed as follows: unevenness is formed like a prism, or ink is printed. By controlling density, shape, or the like thereof, a uniform planar light source can be realized.

Note that in the case where a planar light source as in FIG. 14A is used, the diffusing plate 1011 can be provided over the planar light source. Thus, unevenness in luminance can be suppressed. Note that unlike the case of using a point light source, in the case of using the planar light source 1102, luminance has already been uniformed to some extent. Thus, it is possible not to provide the diffusing plate 1011.

As another example of the planar light source 1102, a plane fluorescent tube (plane cathode tube) can be used.

Figure 14C:
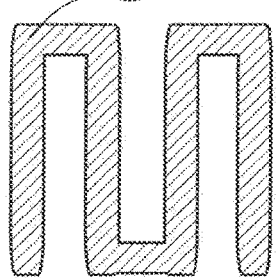
Figure 14D:
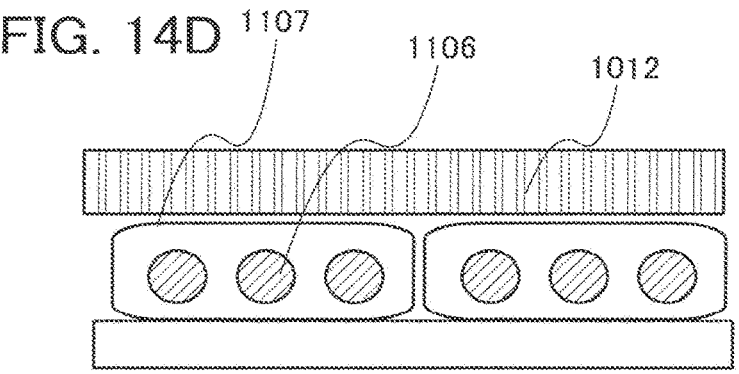

Alternatively, as illustrated in FIG. 14C, a fluorescent tube (cathode tube) 1106 is bent and provided in a region so as to be used like a plane fluorescent tube (plane cathode tube). Thus, a planar light source can be realized. In that case, as illustrated in a cross-sectional view in FIG. 14D, by providing a diffusing plate 1107 around the fluorescent tube (cathode tube) 1106, in particular, above the fluorescent tube (cathode tube) 1106, it is possible to make the planar light source closer to a uniform planar light source. Note that one example of this embodiment is not limited to this.

Embodiment 6

Next, another structure example and a driving method of a display device are described. In this embodiment, the case of using a display device including a display element whose luminance response with respect to signal writing is slow (response time is long) is described. In this embodiment, a liquid crystal element is described as an example of the display element with long response time. In this embodiment, a liquid crystal element is illustrated as an example of the display element with long response time. However, a display element in this embodiment is not limited to this, and a variety of display elements whose luminance response with respect to signal writing is slow can be used.

In a general liquid crystal display device, luminance response with respect to signal writing is slow, and it sometimes takes more than one frame period to complete the response even when signal voltage is continuously applied to a liquid crystal element. Moving images cannot be displayed precisely by such a display element. Further, in the case of active matrix driving, time for signal writing to one liquid crystal element is only a period (one scan line selection period) obtained by dividing a signal writing cycle (one frame period or one subframe period) by the number of scan lines, and the liquid crystal element cannot respond in such a short time in many cases. Therefore, most of the response of the liquid crystal element is performed in a period during which signal writing is not performed. Here, the dielectric constant of the liquid crystal element is changed in accordance with the transmittance of the liquid crystal element, and the response of the liquid crystal element in a period during which signal writing is not performed means that the dielectric constant of the liquid crystal element is changed in a state where electric charge is not exchanged with the outside of the liquid crystal element (in a constant charge state). In other words, in a formula where charge=(capacitance)−(voltage), the capacitance is changed in a state where the charge is constant. Accordingly, voltage applied to the liquid crystal element is changed from voltage in signal writing, in accordance with the response of the liquid crystal element. Therefore, in the case where the liquid crystal element whose luminance response with respect to signal writing is slow is driven by active matrix driving, voltage applied to the liquid crystal element cannot theoretically reach the voltage in signal writing.

In the display device in this embodiment, a signal level in signal writing is corrected in advance (a correction signal is used) so that a display element can reach desired luminance within a signal writing cycle. Thus, the above problem can be solved. Further, since the response time of the liquid crystal element becomes shorter as the signal level becomes higher, the response time of the liquid crystal element can also be shorter by writing a correction signal. A driving method by which such a correction signal is added is referred to as overdrive. By overdrive in this embodiment, even when a signal writing cycle is shorter than a cycle for an image signal input to the display device (an input image signal cycle $T_{in}$), the signal level is corrected in accordance with the signal writing cycle, so that the display element can reach desired luminance within the signal writing cycle. The case where the signal writing cycle is shorter than the input image signal cycle $T_{in}$ is, for example, the case where one original image is divided into a plurality of subimages and the plurality of subimages are sequentially displayed in one frame period.

Figure 15A:
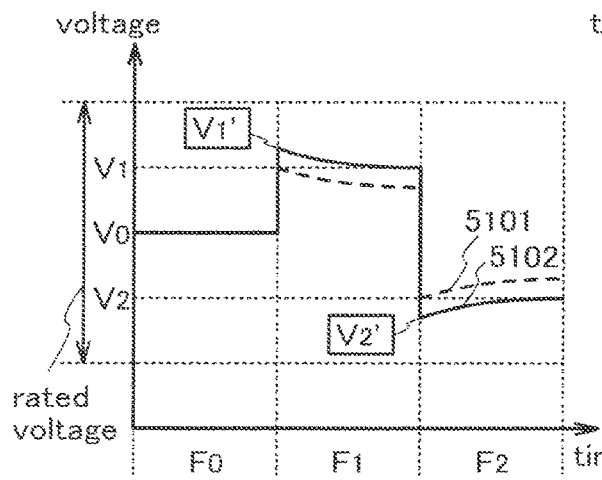
FIGS. 15A, 15C, and 15E show voltage of a display element according to one example of an embodiment.
Figure 15B:
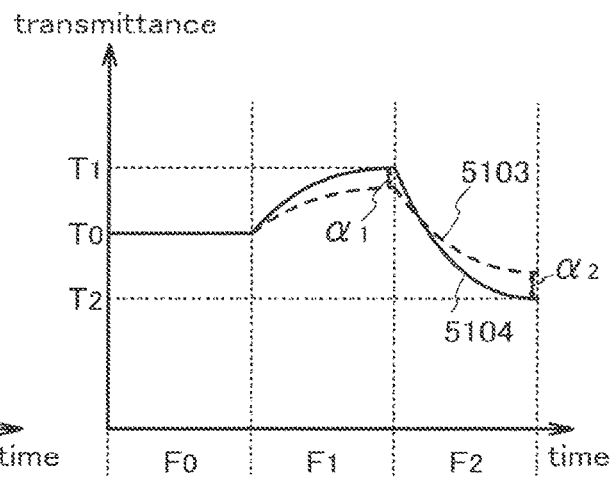
FIGS. 15B, 15D, and 15F show transmittance of the display element.

Next, an example of correcting a signal level in signal writing in a display device driven by active matrix driving is described with reference to FIGS. 15A and 15B. FIG. 15A is a graph schematically illustrating a time change in luminance of signal level in signal writing in one display element, with the time as the horizontal axis and the signal level in signal writing as the vertical axis. FIG. 15B is a graph schematically illustrating a time change in display level, with the time as the horizontal axis and the display level as the vertical axis. Note that when the display element is a liquid crystal element, the signal level in signal writing can be voltage, and the display level can be the transmittance of the liquid crystal element. In the following description, the vertical axis in FIG. 15A is regarded as the voltage, and the vertical axis in FIG. 15B is regarded as the transmittance. Note that in the overdrive in this embodiment, the signal level may be other than the voltage (may be a duty ratio or current, for example). Note that in the overdrive in this embodiment, the display level may be other than the transmittance (may be luminance or current, for example). Liquid crystal elements are classified into two modes: a normally black mode in which black is displayed when voltage is 0 (e.g., a VA mode and an IPS mode), and a normally white mode in which white is displayed when voltage is 0 (e.g., a TN mode and an OCB mode). The graph illustrated in FIG. 5B corresponds to both of the modes. The transmittance increases in the upper part of the graph in the normally black mode, and the transmittance increases in the lower part of the graph in the normally white mode. That is, a liquid crystal mode in this embodiment may be either a normally black mode or a normally white mode. Note that timing of signal writing is represented on the time axis by dotted lines, and a period after signal writing is performed until the next signal writing is performed is referred to as a retention period $F_i$. In this embodiment, i is an integer and an index for representing each retention period. In FIGS. 15A and 15B, i is 0 to 2; however, i can be an integer other than 0 to 2 (only the case where i is 0 to 2 is illustrated). Note that in the retention period $F_i$, transmittance for realizing luminance corresponding to an image signal is denoted by $T_i$, and voltage for providing the transmittance $T_1$ in a constant state is denoted by $V_i$. In FIG. 15A, a dashed line 5101 represents a time change in voltage applied to the liquid crystal element in the case where overdrive is not performed, and a solid line 5102 represents a time change in voltage applied to the liquid crystal element in the case where the overdrive in this embodiment is performed. In a similar manner, in FIG. 15B, a dashed line 5103 represents a time change in transmittance of the liquid crystal element in the case where overdrive is not performed, and a solid line 5104 represents a time change in transmittance of the liquid crystal element in the case where the overdrive in this embodiment is performed. Note that a difference between the desired transmittance $T_i$ and the actual transmittance at the end of the retention period $F_i$ is referred to as an error $α_i$.

It is assumed that, in the graph illustrated in FIG. 15A, both the dashed line 5101 and the solid line 5102 represent the case where desired voltage $V_0$ is applied in a retention period $F_0$; and in the graph illustrated in FIG. 15B, both the dashed line 5103 and the solid line 5104 represent the case where desired transmittance $T_0$ is obtained. In the case where overdriving is not performed, desired voltage $V_1$ is applied at the beginning of a retention period $F_1$ as shown by the dashed line 5101. As has been described above, a period for signal writing is much shorter than a retention period, and the liquid crystal element is in a constant charge state in most of the retention period. Accordingly, voltage applied to the liquid crystal element in the retention period $F_1$ is changed along with a change in transmittance and is greatly different from the desired voltage $V_1$ at the end of the retention period $F_1$. In this case, the dashed line 5103 in the graph of FIG. 15B is greatly different from desired transmittance $T_1$. Accordingly, accurate display of an image signal cannot be performed, so that image quality is decreased. On the other hand, in the case where the overdrive in this embodiment is performed, voltage $V_1$ which is higher than the desired voltage $V_1$ is applied to the liquid crystal element at the beginning of the retention period $F_1$ as shown by the solid line 5102. That is, the voltage $V_1'$ which is corrected from the desired voltage $V_1$ is applied to the liquid crystal element at the beginning of the retention period $F_1$ so that the voltage applied to the liquid crystal element at the end of the retention period $F_1$ is close to the desired voltage $V_1$ in anticipation of a gradual change in voltage applied to the liquid crystal element in the retention period $F_1$. Thus, the desired voltage $V_1$ can be accurately applied to the liquid crystal element. In this case, as shown by the solid line 5104 in the graph of FIG. 15B, the desired transmittance $T_1$ can be obtained at the end of the retention period $F_1$. In other words, the response of the liquid crystal element within the signal writing cycle can be realized, despite the fact that the liquid crystal element is in a constant charge state in most of the retention period. Then, in a retention period $F_2$, the case where desired voltage $V_2$ is lower than $V_1$ is described. Also in that case, as in the retention period $F_1$, voltage $V_2$ which is corrected from the desired voltage $V_2$ may be applied to the liquid crystal element at the beginning of the retention period $F_2$ so that the voltage applied to the liquid crystal element at the end of the retention period $F_2$ is close to the desired voltage $V_2$ in anticipation of a gradual change in voltage applied to the liquid crystal element in the retention period $F_2$. Thus, as shown by the solid line 5104 in the graph of IG 15B, desired transmittance $T_2$ can be obtained at the end of the retention period $F_2$. Note that in the case where $V_i$ is higher than $V_{i-1}$ as in the retention period $F_1$, the corrected voltage $V_i'$ is preferably corrected so as to be higher than desired voltage $V_i$. Further, when $V_i$ is lower than $V_{i-1}$ as in the retention period $F_2$, the corrected voltage $V_i'$ is preferably corrected so as to be lower than the desired voltage $V_i$. Note that a specific correction value can be derived by measuring response characteristics of the liquid crystal element in advance. As a method of realizing overdrive in a device, a method by which a correction formula is formulated and included in a logic circuit, a method by which a correction value is stored in a memory as a look-up table and is read as necessary, or the like can be used.

Figure 15C:
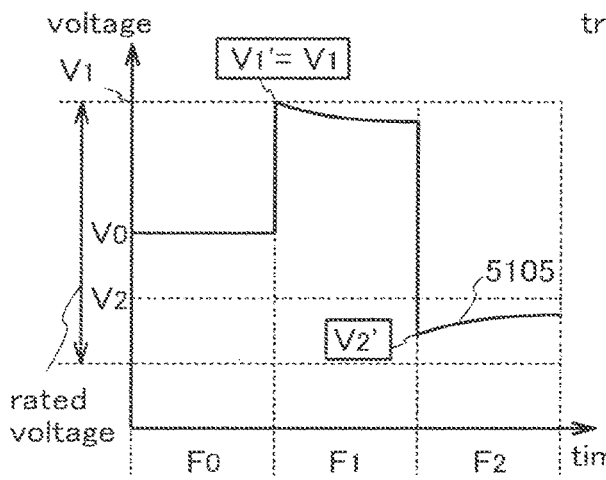
Figure 15D:
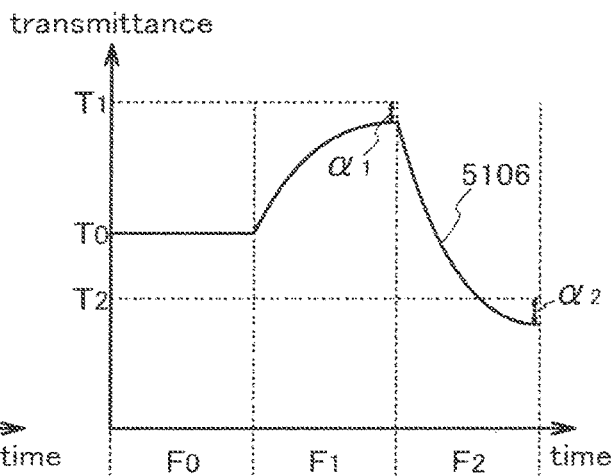
Figure 15E:
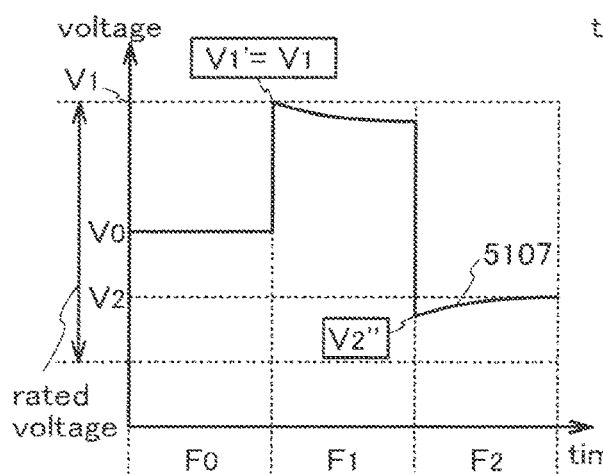
Figure 15F:
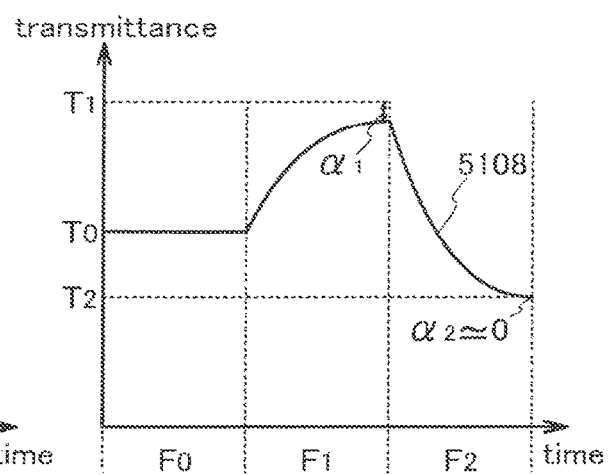

Note that there are several limitations on realization of the overdrive in this embodiment in a device. For example, voltage correction has to be performed in the range of the rated voltage of a source driver. That is, in the case where desired voltage is originally high and ideal correction voltage exceeds the rated voltage of the source driver, not all the correction can be performed. Problems in such a case are described with reference to FIOS. 15C and 15D. As in FIG. 15A, FIG. 15C is a graph in which a time change in voltage in one liquid crystal element is schematically illustrated as a solid line 5105 with the time as the horizontal axis and the voltage as the vertical axis. As in FIG. 15B, FIG. 15D is a graph in which a time change in transmittance of one liquid crystal element is schematically illustrated as a solid line 5106 with the time as the horizontal axis and the transmittance as the vertical axis. Note that since other references are similar to those in FIGS. 15A and 15B, description thereof is omitted. FIGS. 15C and 15D illustrate a state where sufficient correction cannot be performed because the correction voltage $V_1'$ for realizing the desired transmittance $T_1$ in the retention period $F_1$ exceeds the rated voltage of the source driver; thus $V_1'=V_1$ has to be given. In this case, the transmittance at the end of the retention period $F_1$ is deviated from the desired transmittance $T_1$ by the error $\alpha_1$. Note that the error $\alpha_1$ is increased only when the desired voltage is originally high; therefore, a decrease in image quality due to occurrence of the error $\alpha_1$ is in the allowable range in many cases. However, as the error cc is increased, an error in algorithm for voltage correction is also increased. In other words, in the algorithm for voltage correction, when it is assumed that the desired transmittance is obtained at the end of the retention period, even though the error $\alpha_1$ is increased, voltage correction is performed on the basis that the error $\alpha_1$ is small. Accordingly, the error is included in correction in the following retention period $F_2$; thus, an error $\alpha_2$ is also increased. Further, in the case where the error $\alpha_2$ is increased, the following error $\alpha_3$ is further increased, for example, and the error is increased in a chain reaction manner, which results in a significant decrease in image quality. In the overdrive in this embodiment, in order to prevent increase of errors in such a chain reaction manner, when the correction voltage $V_i'$ exceeds the rated voltage of the source driver in the retention period $F_i$, an error $\alpha_i$ at the end of the retention period $F_i$ is estimated, and the correction voltage in a retention period $F_{i+1}$ can be adjusted in consideration of the amount of the error $\alpha_i$. Thus, even when the error $\alpha_i$ is increased, the effect of the error $\alpha_i$ on the error $\alpha_{i+1}$ can be minimized, so that increase of errors in a chain reaction manner can be prevented. An example where the error $\alpha_2$ is minimized in the overdrive in this embodiment is described with reference to FIGS. 15E and 15F. In a graph of FIG. 15E, a solid line 5107 represents a time change in voltage in the case where the correction voltage $V_2'$ in the graph of FIG. 15C is further adjusted to be correction voltage $V_2''$. A graph of FIG. 15F illustrates a time change in transmittance in the case where voltage is corrected in accordance with the graph of FIG. 15E. The solid line 5106 in the graph of FIG. 15D indicates that excessive correction is caused by the correction voltage $V_2'$. On the other hand, the solid line 5108 in the graph of FIG. 15P indicates that excessive correction is suppressed by the correction voltage $V_2''$ which is adjusted in consideration of the error $\alpha_1$ and the error $\alpha_2$ is minimized. Note that a specific correction value can be derived from measuring response characteristics of the liquid crystal element in advance. As a method of realizing overdrive in a device, a method by which a correction formula is formulated and included in a logic circuit, a method by which a correction value is stored in a memory as a look-up table and read as necessary, or the like can be used. Further, such a method can be added separately from a portion for calculating correction voltage $V_i'$ or can be included in the portion for calculating correction voltage $V_i'$. Note that the amount of correction of correction voltage $V_i''$ which is adjusted in consideration of an error $\alpha_{i-1}$ (a difference with the desired voltage $V_i$) is preferably smaller than that of $V_i'$. That is, $|V_i'''-V_i|<|V_i'-V_i|$ is preferable.

Note that the error $\alpha_i$ which is caused because ideal correction voltage exceeds the rated voltage of the source driver is increased as a signal writing cycle becomes shorter.

This is because the response time of the liquid crystal element needs to be shorter as the signal writing cycle becomes shorter, so that higher correction voltage is necessary. Further, as a result of an increase in correction voltage needed, the correction voltage exceeds the rated voltage of the source driver more frequently, so that the large error $\alpha_i$ occurs more frequently. Therefore, it can be said that the overdrive in this embodiment becomes more effective as the signal writing cycle becomes shorter. Specifically, the overdrive in this embodiment is significantly effective in the case of performing the following driving methods: a driving method by which one original image is divided into a plurality of subimages and the plurality of subimages are sequentially displayed in one frame period, a driving method by which motion of an image is detected from a plurality of images and an intermediate image of the plurality of images is generated and inserted between the plurality of images (so-called motion compensation frame rate doubling), and a driving method in which such driving methods are combined, for example.

Note that the rated voltage of the source driver has the lower limit in addition to the upper limit described above. An example of the lower limit is the case where voltage which is lower than the voltage 0 cannot be applied. In this case, since ideal correction voltage cannot be applied as in the case of the upper limit described above, the error $\alpha_i$ is increased. However, also in that case, the error $\alpha_i$ at the end of the retention period $F_i$ is estimated, and the correction voltage in the retention period $F_{i+1}$ can be adjusted in consideration of the amount of the error $\alpha_i$ in a manner similar to the above method. Note that in the case where voltage which is lower than the voltage 0 (negative voltage) can be applied as the rated voltage of the source driver, the negative voltage may be applied to the liquid crystal element as correction voltage. Thus, the voltage applied to the liquid crystal element at the end of retention period $F_i$ can be adjusted so as to be close to the desired voltage $V_i$ in anticipation of a change in potential due to a constant charge state.

Note that in order to suppress deterioration of the liquid crystal element, so-called inversion driving by which the polarity of voltage applied to the liquid crystal element is periodically inverted can be performed in combination with the overdrive. That is, the overdrive in this embodiment includes the case where the overdrive is performed at the same time as the inversion driving. For example, in the case where the length of the signal writing cycle is half of that of the input image signal cycle $T_{in}$, when the length of a cycle for inverting polarity is the same or substantially the same as that of the input image signal cycle $T_{in}$, two sets of writing of a positive signal and two sets of writing of a negative signal are alternately performed. The length of the cycle for inverting polarity is made larger than that of the signal writing cycle in this manner, so that the frequency of charge and discharge of a pixel can be reduced. Thus, power consumption can be reduced. Note that when the cycle for inverting polarity is made too long, a defect in which luminance difference due to the difference of polarity is recognized as a flicker occurs in some cases; therefore, it is preferable that the length of the cycle for inverting polarity be substantially the same as or smaller than that of the input image signal cycle $T_{in}$.

Embodiment 7

Next, another structure example and a driving method of a display device are described. In this embodiment, a method is described by which an image for interpolating motion of an image input from the outside of a display device (an input image) is generated inside the display device in response to a plurality of input images and the generated image (the generation image) and the input image are sequentially displayed. Note that when an image for interpolating motion of an input image is a generation image, motion of moving images can be made smooth, and a decrease in quality of moving images because of afterimages or the like due to hold driving can be suppressed. Here, moving image interpolation is described below. Ideally, display of moving images is realized by controlling the luminance of each pixel in real time; however, individual control of pixels in real time has problems such as the enormous number of control circuits, space for wirings, and the enormous amount of input image data. Thus, it is difficult to realize the individual control of pixels. Therefore, for display of moving images by a display device, a plurality of still images are sequentially displayed in a certain cycle so that display appears to be moving images. The cycle (in this embodiment, referred to as an input image signal cycle and denoted by $T_{in}$) is standardized, and for example, 1/60 second in NTSC and 1/50 second in PAL. Such a cycle does not cause a problem of moving image display in a CRT, which is an impulsive display device. However, in a hold-type display device, when moving images conforming to these standards are displayed without change, a defect in which display is blurred because of afterimages or the like due to hold driving (hold blur) occurs. Since hold blur is recognized by discrepancy between unconscious motion interpolation due to human eyes tracking and hold-type display, the hold blur can be reduced by making the input image signal cycle shorter than that in conventional standards (by making the control closer to individual control of pixels in real time). However, it is difficult to reduce the length of the input image signal cycle because the standard needs to be changed and the amount of data is increased. However, an image for interpolating motion of an input image is generated inside the display device in response to a standardized input image signal, and display is performed while the generation image interpolates the input image, so that hold blur can be reduced without a change in the standard or an increase in the amount of data. Operation such that an image signal is generated inside the display device in response to an input image signal to interpolate motion of the input image is referred to as moving image interpolation.

Figure 16A:
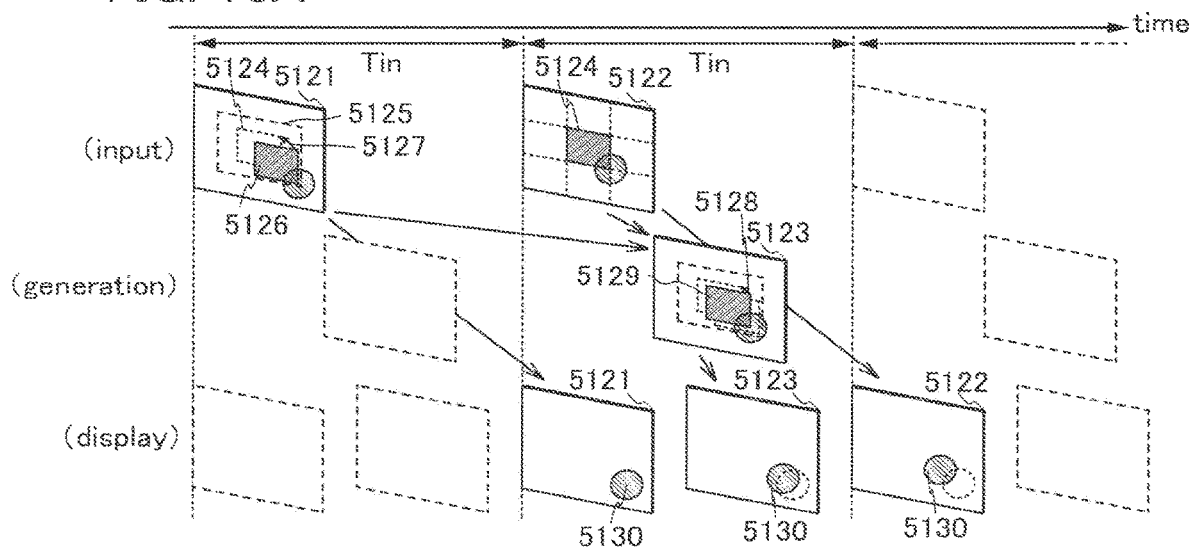
FIGS. 16A to 16C show display screens according to one example of an embodiment.
Figure 16B:
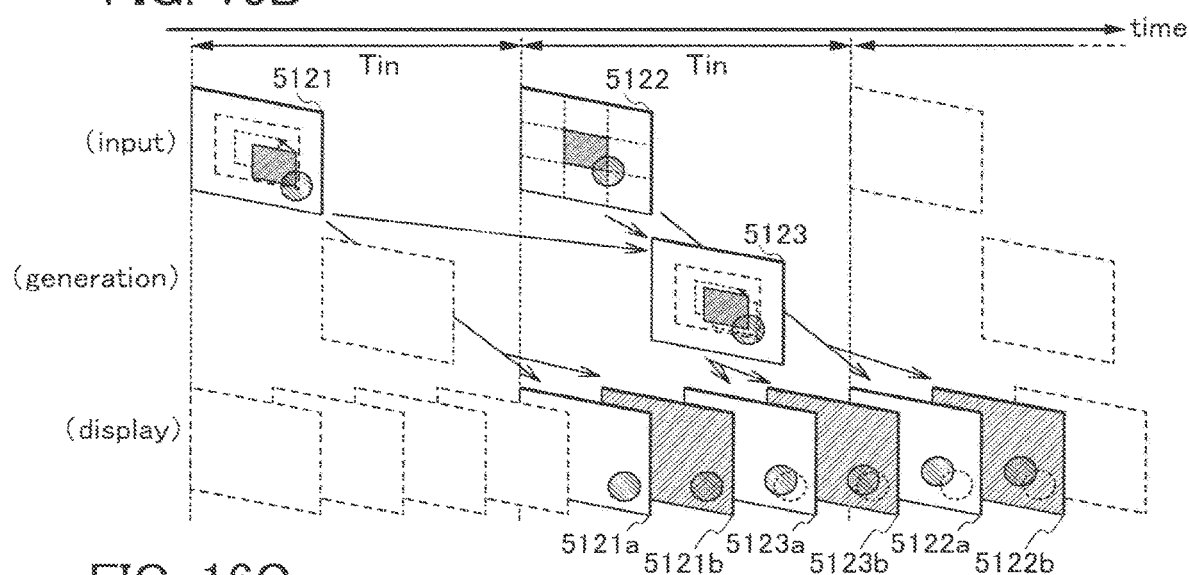

By a method for interpolating moving images in this embodiment, motion blur can be reduced. The method for interpolating moving images in this embodiment can include an image generation method and an image display method. Further, by using a different image generation method and/or a different image display method for motion with a specific pattern, motion blur can be effectively reduced. FIGS. 16A and 16B are schematic diagrams each illustrating an example of a method for interpolating moving images in this embodiment. FIGS. 16A and 16B each illustrate timing of treating each image by using the position of the horizontal direction, with the time as the horizontal axis. A portion represented as "input" indicates timing at which an input image signal is input. Here, images 5121 and 5122 are focused as two images that are temporally adjacent. An input image is input at an interval of the cycle $T_{in}$. Note that the length of one cycle $T_{in}$ is referred to as one frame or one frame period in some cases. A portion represented as "generation" indicates timing at which a new image is generated from an input image signal. Here, an image 5123 which is a generation image generated in response to the images 5121 and 5122 is focused. A portion represented as "display" indicates timing at which an image is displayed in the display device. Note that images other than the focused images are only represented by dashed lines, and by treating such images in a manner similar to that of the focused images, the example of the method for interpolating moving images in this embodiment can be realized.

In the example of the method for interpolating moving images in this embodiment, as illustrated in FIG. 16A, a generation image which is generated in response to two input images that am temporally adjacent is displayed in a period after one image is displayed until the other image is displayed, so that moving image interpolation can be performed. In this case, a display cycle of a display image is preferably half of an input cycle of the input image. Note that the display cycle is not limited to this and can be a variety of display cycles. For example, in the case where the length of the display cycle is shorter than half of that of the input cycle, moving images can be displayed more smoothly. Alternatively, in the case where the length of the display cycle is longer than half of that of the input cycle, power consumption can be reduced. Note that here, an image is generated in response to two input images which are temporally adjacent; however, the number of input images serving as a basis is not limited to two and can be other numbers. For example, when an image is generated in response to three (may be more than three) input images which are temporally adjacent, a generation image with higher accuracy can be obtained as compared to the case where an image is generated in response to two input images. Note that the display timing of the image 5121 is the same as the input timing of the image 5122, that is, the display timing is one frame later than the input timing. However, display timing in the method for interpolating moving images in this embodiment is not limited to this and can be a variety of display timings. For example, the display timing can be delayed with respect to the input timing by more than one frame. Thus, the display timing of the image 5123 which is the generation image can be delayed, which allows enough time to generate the image 5123 and leads to reduction in power consumption and manufacturing cost. Note that when the display timing is delayed with respect to the input timing for a long time, a period for holding an input image becomes longer, and the memory capacity which is necessary for holding the input image is increased. Therefore, the display timing is preferably delayed with respect to the input timing by approximately one to two frames.

Here, an example of a specific generation method of the image 5123 which is generated in response to the images 5121 and 5122 is described. It is necessary to detect motion of an input image in order to interpolate moving images. In this embodiment, a method called a block matching method can be used in order to detect motion of an input image. Note that this embodiment is not limited to this, and a variety of methods (e.g., a method for obtaining a difference of image data or a method of using Fourier transformation) can be used. In the block matching method, first, image data for one input image (here, image data of the image 5121) is stored in a data storage means (e.g., a memory circuit such as a semiconductor memory or a RAM). Then, an image in the next frame (here, the image 5122) is divided into a plurality of regions. Note that the divided regions can have the same rectangular shapes as illustrated in FIG. 16A; however, the divided regions are not limited to them and can have a variety of shapes (e.g., the shape or size varies depending on images). After that, in each divided region, data is compared to the image data in the previous frame (here, the image data of the image 5121), which is stored in the data storage means, so that a region where the image data is similar to each other is searched. The example of FIG. 16A illustrates that the image 5121 is searched for a region where data is similar to that of a region 5124 in the image 5122, and a region 5126 is found. Note that a search range is preferably limited when the image 5121 is searched. In the example of FIG. 16A, a region 5125 which is approximately four times larger than the region 5124 is set as the search range. By making the search range larger than this, detection accuracy can be increased even in a moving image with high-speed motion. Note that search in an excessively wide range needs an enormous amount of time, which makes it difficult to realize detection of motion. Thus, the region 5125 has preferably approximately two to six times larger than the area of the region 5124. After that, a difference of the position between the searched region 5126 and the region 5124 in the image 5122 is obtained as a motion vector 5127. The motion vector 5127 represents motion of image data in the region 5124 in one frame period. Then, in order to generate an image illustrating the intermediate state of motion, an image generation vector 5128 obtained by changing the size of the motion vector without a change in the direction thereof is generated, and image data included in the region 5126 of the image 5121 is moved in accordance with the image generation vector 5128, so that image data in a region 5129 of the image 5123 is generated. By performing a series of processings on the entire region of the image 5122, the image 5123 is generated. Then, by sequentially displaying the input image 5121, the image 5123, and the image 5122, moving images can be interpolated. Note that the position of an object 5130 in the image is different (i.e., the object is moved) between the images 5121 and 5122. In the generated image 5123, the object is located at the midpoint between the images 5121 and 5122. By displaying such images, motion of moving images can be made smooth, and blur of moving images due to afterimages or the like can be reduced.

Note that the size of the image generation vector 5128 can be determined in accordance with the display timing of the image 5123. In the example of FIG. 16A, since the display timing of the image 5123 is the midpoint ($\frac{1}{2}$) between the display timings of the images 5121 and 5122, the size of the image generation vector 5128 is half of that of the motion vector 5127. Alternatively, for example, when the display timing is $\frac{1}{3}$ between the display timings of the images 5121 and 5122, the size of the image generation vector 5128 can be $\frac{1}{3}$, and when the display timing is $\frac{2}{3}$ between the display timings of the images 5121 and 5122, the size can be $\frac{2}{3}$.

Note that in the case where a new image is generated by moving a plurality of regions having different motion vectors in this manner, a portion where one region has already been moved to a region that is a destination for another region or a portion to which any region is not moved is generated in some cases (i.e., overlap or blank occurs in some cases). For such portions, data can be compensated. As a method for compensating an overlap portion, a method by which overlap data is averaged; a method by which data is arranged in order of priority according to the direction of motion vectors or the like, and high-priority data is used as data in a generation image; or a method by which one of color and brightness is arranged in order of priority and the other thereof is averaged can be used, for example. As a method for compensating a blank portion, a method by which image data of the portion of the image 5121 or the image 5122 is used as data in a generation image without modification, a method by which image data of the portion of the image 5121 or the image 5122 is averaged, or the like can be used. Then, the generated image 5123 is displayed in accordance with the size of the image generation vector 5128, so that motion of moving images can be made smooth, and the decrease in quality of moving images because of afterimages or the like due to hold driving can be suppressed.

In another example of the method for interpolating moving images in this embodiment, as illustrated in FIG. 16B, when a generation image which is generated in response to two input images which are temporally adjacent is displayed in a period after one image is displayed until the other image is displayed, each display image is divided into a plurality of subimages to be displayed. Thus, moving images can be interpolated. This case can have advantages of displaying a dark image at regular intervals (advantages when a display method is made closer to impulsive display) in addition to advantages of a shorter image display cycle. That is, blur of moving images due to afterimages or the like can be further reduced as compared to the case where the length of the image display cycle is just made to half of that of the image input cycle. In the example of FIG. 16B, "input" and "generation" can be similar to the processings in the example of FIG. 16A; therefore, description thereof is omitted. For "display" in the example of FIG. 16B, one input image and/or one generation image can be divided into a plurality of subimages to be displayed. Specifically, as illustrated in FIG. 16B, the image 5121 is divided into subimages 5121a and 5121b and the subimages 5121a and 5121b are sequentially displayed so as to make human eyes perceive that the image 5121 is displayed; the image 5123 is divided into subimages 5123a and 5123b and the subimages 5123a and 5123b are sequentially displayed so as to make human eyes perceive that the image 5123 is displayed; and the image 5122 is divided into subimages 5122a and 5122b and the subimages 5122a and 5122b are sequentially displayed so as to make human eyes perceive that the image 5122 is displayed. That is, the display method can be made closer to impulsive display while the image perceived by human eyes is similar to that in the example of FIG. 16A, so that blur of moving images due to afterimages or the like can be further reduced. Note that the number of division of subimages is two in FIG. 16B; however, the number of division of subimages is not limited to this and can be other numbers. Note that subimages are displayed at regular intervals (½) in FIG. 16B; however, timing of displaying subimages is not limited to this and can be a variety of timings. For example, when timing of displaying dark subimages 5121b, 5122b, and 5123b is made earlier (specifically, timing at ¼ to ½), the display method can be made much closer to impulsive display, so that blur of moving images due to afterimages or the like can be further reduced. Alternatively, when the timing of displaying dark subimages is delayed (specifically, timing at ½ to ¾), the length of a period for displaying a bright image can be increased, so that display efficiency can be increased and power consumption can be reduced.

Figure 16C:
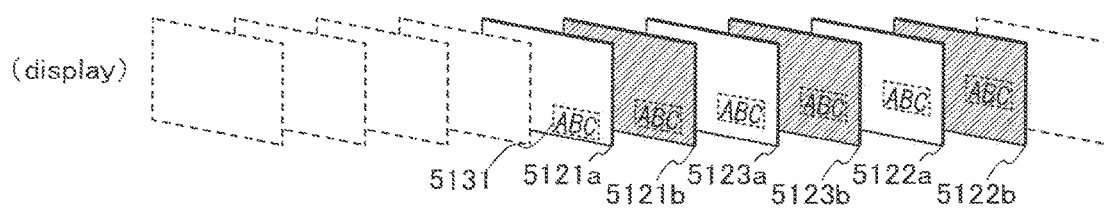

Another example of the method for interpolating moving images in this embodiment is an example in which the shape of an object which is moved in an image is detected and different processings are performed depending on the shape of the moving object. FIG. 16C illustrates display timing as in the example of FIG. 16B and the case where moving characters (also referred to as scrolling texts, subtitles, captions, or the like) are displayed. Note that since terms "input" and "generation" may be similar to those in FIG. 16B, they are not illustrated in FIG. 16C. The amount of blur of moving images by hold driving varies depending on properties of a moving object in some cases. In particular, blur is recognized remarkably when characters are moved in many cases. This is because eyes track moving characters to read the characters, so that hold blur easily occur. Further, since characters have clear outlines in many cases, blur due to hold blur is further emphasized in some cases. That is, determining whether an object which is moved in an image is a character and performing special processing when the object is the character are effective in reducing hold blur. Specifically, when edge detection, pattern detection, and/or the like are/is performed on an object which is moved in an image and the object is determined to be a character, motion compensation is performed even on subimages generated by division of one image so that an intermediate state of motion is displayed. Thus, motion can be made smooth. In the case where the object is determined not to be a character, when subimages are generated by division of one image as illustrated in FIG. 16B, the subimages can be displayed without a change in the position of the moving object. The example of FIG. 16C illustrates the case where a region 5131 determined to be characters is moved upward, and the position of the region 5131 is different between the images 5121a and 5121b. In a similar manner, the position of the region 5131 is different between the images 5123a and 5123b, and between the images 5122a and 5122b. Thus, motion of characters for which hold blur is particularly easily recognized can be made smoother than that by normal motion compensation frame rate doubling, so that blur of moving images due to afterimages or the like can be further reduced.

Embodiment 8

In this embodiment, structures and operation of a pixel which can be used in a liquid crystal display device are described. Note that as the operation mode of a liquid crystal element in this embodiment, a TN (twisted nematic) mode, an IPS (in-plane-switching) mode, an FFS (fringe field switching) mode, an MVA (multi-domain vertical alignment) mode, a PVA (patterned vertical alignment) mode, an ASM (axially symmetric aligned microcell) mode, an OCB (optically compensated birefringence) mode, an FLC (ferroelectric liquid crystal) mode, an AFLC (anti-ferroelectric liquid crystal) mode, or the like can be used.

Figure 17A:
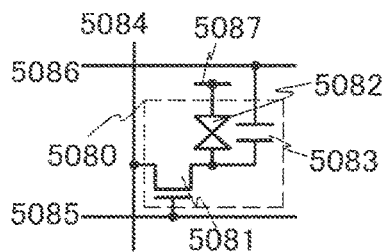
FIGS. 17A to 17G illustrate circuits according to one example of an embodiment.

FIG. 17A illustrates an example of a pixel structure which can be used in the liquid crystal display device. A pixel 5080 includes a transistor 5081, a liquid crystal element 5082, and a capacitor 5083. A gate of the transistor 5081 is electrically connected to a wiring 5085. A first terminal of the transistor 5081 is electrically connected to a wiring 5084. A second terminal of the transistor 5081 is electrically connected to a first terminal of the liquid crystal element 5082. A second terminal of the liquid crystal element 5082 is electrically connected to a wiring 5087. A first terminal of the capacitor 5083 is electrically connected to the first terminal of the liquid crystal element 5082. A second terminal of the capacitor 5083 is electrically connected to a wiring 5086. Note that a first terminal of a transistor is one of a source and a drain, and a second terminal of the transistor is the other of the source and the drain. That is, when the first terminal of the transistor is the source, the second terminal of the transistor is the drain. In a similar manner, when the first terminal of the transistor is the drain, the second terminal of the transistor is the source.

The wiring 5084 can serve as a signal line. The signal line is a wiring for transmitting signal voltage, which is input from the outside of the pixel, to the pixel 5080. The wiring 5085 can serve as a scan line. The scan line is a wiring for controlling on/off of the transistor 5081. The wiring 5086 can serve as a capacitor line. The capacitor line is a wiring for applying predetermined voltage to the second terminal of the capacitor 5083. The transistor 5081 can serve as a switch. The capacitor 5083 can serve as a storage capacitor. The storage capacitor is a capacitor with which the signal voltage is continuously applied to the liquid crystal element 5082 even when the switch is off. The wiring 5087 can serve as a counter electrode. The counter electrode is a wiring for applying predetermined voltage to the second terminal of the liquid crystal element 5082. Note that the function of each wiring is not limited to this, and each wiring can have a variety of functions. For example, by changing voltage applied to the capacitor line, voltage applied to the liquid crystal element can be adjusted. Note that it is acceptable as long as the transistor 5081 serves as a switch, and the transistor 5081 may be either a p-channel transistor or an n-channel transistor.

Figure 17B:
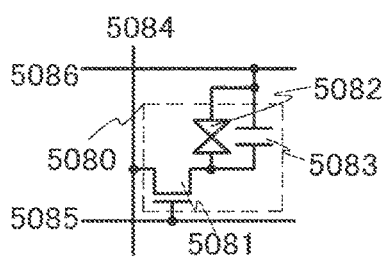

FIG. 17B illustrates an example of a pixel structure which can be used in the liquid crystal display device. The example of the pixel structure illustrated in FIG. 17B is the same as that in FIG. 17A except that the wiring 5087 is eliminated and the second terminal of the liquid crystal element 5082 and the second terminal of the capacitor 5083 are electrically connected to each other. The example of the pixel structure illustrated in FIG. 17B can be particularly used in the case of using a horizontal electric field mode (including an IPS mode and an FFS mode) liquid crystal element. This is because in the horizontal electric field mode liquid crystal element, the second terminal of the liquid crystal element 5082 and the second terminal of the capacitor 5083 can be formed over the same substrate, so that it is easy to electrically connect the second terminal of the liquid crystal element 5082 and the second terminal of the capacitor 5083 to each other. With the pixel structure as illustrated in FIG. 17B, the wiring 5087 can be eliminated, so that a manufacturing process can be simplified and manufacturing cost can be reduced.

Figure 17C:
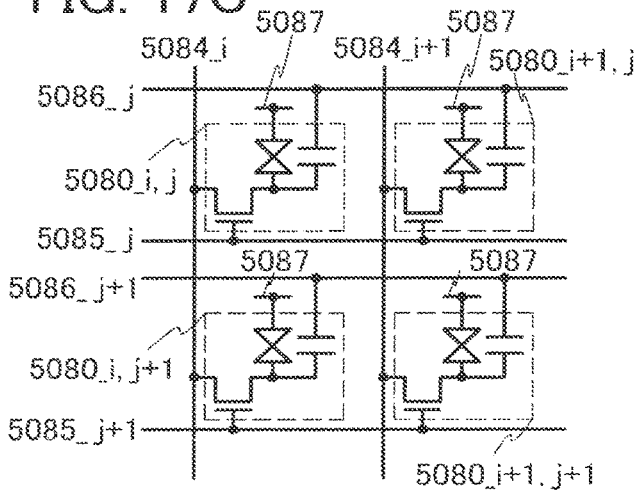

A plurality of pixel structures illustrated in FIG. 17A or FIG. 17B can be arranged in matrix. Thus, a display portion of a liquid crystal display device is formed, and a variety of images can be displayed. FIG. 17C illustrates a circuit structure in the case where a plurality of pixel structures illustrated in FIL 17A are arranged in matrix. FIG. 17C is a circuit diagram illustrating four pixels among a plurality of pixels included in the display portion. A pixel arranged in an i-th column and a j-th row (each of i and j is a natural number) is represented as a pixel 5080_i, j, and a wiring 5084_i, a wiring 5085_j, and a wiring 5086_j are electrically connected to the pixel 5080_i, j. In a similar manner, a wiring 5084_i+1, the wiring 5085_j, and the wiring 5086_j are electrically connected to a pixel 5080_i+1, j. In a similar manner, the wiring 5084j, a wiring 5085_j+1, and a wiring 5086_j+1 are electrically connected to a pixel 5080_i, j+1. In a similar manner, the wiring 5084_i+1, the wiring 5085_j+1, and the wiring 5086_j+1 are electrically connected to a pixel 5080_i+1, j+1. Note that each wiring can be used in common with a plurality of pixels in the same row or the same column. In the pixel structure illustrated in FIG. 17C, the wiring 5087 is a counter electrode, which is used by all the pixels in common; therefore, the wiring 5087 is not indicated by the natural number i or j. Note that since the pixel structure in FIG. 17B can also be used in one example of this embodiment, the wiring 5087 is not required even in a structure where the wiring 5087 is provided and can be eliminated when another wiring serves as the wiring 5087, for example.

Figure 17D:
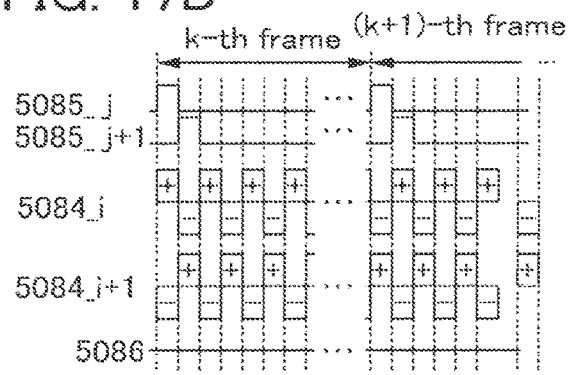

The pixel structure in FIG. 17C can be driven by a variety of methods. In particular, when the pixels are driven by a method called AC drive, deterioration (burn-in) of the liquid crystal element can be suppressed. FIG. 17D is a timing chart of voltage applied to each wiring in the pixel structure in FIG. 17C in the case where dot inversion driving, which is a kind of AC drive, is performed. By the dot inversion driving, flickers seen when the AC drive is performed can be suppressed.

In the pixel structure in FIG. 17C, a switch in a pixel electrically connected to the wiring 5085_j is selected (in an on state) in a j-th gate selection period in one frame period and is not selected (in an off state) in the other periods. Then, a (j+1)th gate selection period is provided after the J-th gate selection period. By performing sequential scanning in this manner, all the pixels are sequentially selected in one frame period. In the timing chart of FIG. 17D, the switch in the pixel is selected when the level of voltage is high, and the switch is not selected when the level of the voltage is low. Note that this is the case where the transistor in each pixel is an n-channel transistor. In the case of using a p-channel transistor, a relationship between voltage and a selection state is opposite to that in the case of using an n-channel transistor.

In the timing chart illustrated in FIG. 17D, in the j-th gate selection period in a k-th frame (k is a natural number), positive signal voltage is applied to the wiring 5084_i used as a signal line, and negative signal voltage is applied to the wiring 5084_i+1. Then, in the (j+1)th gate selection period in the k-th frame, negative signal voltage is applied to the wiring 5084_i, and positive signal voltage is applied to the wiring 5084_i+1. After that, signals whose polarities are inverted every gate selection period are alternately supplied to the signal line. Accordingly, in the k-th frame, the positive signal voltage is applied to the pixels 5080_i, j and 5080_i+1, j+1, and the negative signal voltage is applied to the pixels 5080_i+1, j and 5080_i, j+1. Then in a (k+1)th frame, signal voltage whose polarity is opposite to that of the signal voltage written in the kth frame is written to each pixel. Accordingly, in the (k+1)th frame, the positive signal voltage is applied to the pixels 5080_i+1, j and 5080_i, j+1, and the negative signal voltage is applied to the pixels 5080_i, j and 5080_i+1, j+1. In this manner, the dot inversion driving is a driving method by which signal voltage whose polarity is different between adjacent pixels is applied in the same frame and the polarity of the voltage signal for the pixel is inverted every one frame. By the dot inversion driving, flickers seen when the entire or part of an image to be displayed is uniform can be suppressed while deterioration of the liquid crystal element is suppressed. Note that voltage applied to all the wirings 5086 including the wirings 5086_j and 5086_j+1 can be fixed voltage. Note that although only the polarity of the signal voltage for the wirings 5084 is illustrated in the timing chart, the signal voltage can actually have a variety of levels in the polarity illustrated. Note that here, the case where the polarity is inverted per dot (per pixel) is described; however, this embodiment is not limited to this, and the polarity can be inverted per a plurality of pixels. For example, the polarity of signal voltage to be written is inverted per two gate selection periods, so that power consumed in writing signal voltage can be reduced. Alternatively, the polarity can be inverted per column (source line inversion) or per row (gate line inversion).

Figure 17E:
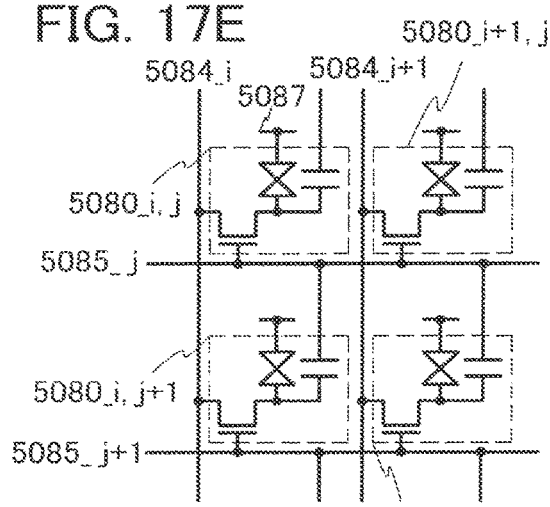

Note that fixed voltage may be applied to the second terminal of the capacitor 5083 in the pixel 5080 in one frame period. Here, since the level of voltage applied to the wiring 5085 used as a scan line is low in most of one frame period, which means that substantially constant voltage is applied to the wiring 5085; therefore, the second terminal of the capacitor 5083 in the pixel 5080 may be connected to the wiring 5085. FIG. 17E illustrates an example of a pixel structure which can be used in the liquid crystal display device. Compared to the pixel structure in FIG. 17C, a feature of the pixel structure in FIG. 17E lies in that the wiring 5086 is eliminated and the second terminal of the capacitor 5083 in the pixel 5080 and the wiring 5085 in the previous row are electrically connected to each other. Specifically, in the range illustrated in FIG. 17E, the second terminals of the capacitors 5083 in the pixels 5080_i, j+1 and 5080_i+1, j+1 are electrically connected to the wiring 5085_j. By electrically connecting the second terminal of the capacitor 5083 in the pixel 5080 and the wiring 5085 in the previous row to each other in this manner, the wiring 5086 can be eliminated, so that the aperture ratio of the pixel can be increased. Note that the second terminal of the capacitor 5083 may be connected to the wiring 5085 in another row instead of in the previous row. Note that the pixel structure in FIG. 17E can be driven by a driving method which is similar to that in the pixel structure in FIG. 17C.

Note that voltage applied to the wiring 5084 used as a signal line can be lowered by using the capacitor 5083 and the wiring electrically connected to the second terminal of the capacitor 5083. A pixel structure and a driving method in this case are described with reference to FIGS. 17F and 17G. Compared to the pixel structure in FIG. 17A, a feature of the pixel structure in FIG. 17F lies in that two wirings 5086 are provided per pixel column, and in adjacent pixels, one wiring is electrically connected to every other second terminal of the capacitors 5083 and the other wiring is electrically connected to the remaining every other second terminal of the capacitors 5083. Note that two wirings 5086 are referred to as a wiring 5086-1 and a wiring 5086-2. Specifically, in the range illustrated in FIG. 17F, the second terminal of the capacitor 5083 in the pixel 5080_i, j is electrically connected to a wiring 5086-1_j; the second terminal of the capacitor 5083 in the pixel 5080_i+1, j is electrically connected to a wiring 5086-2; the second terminal of the capacitor 5083 in the pixel 5080_i, j+1 is electrically connected to a wiring 5086-2_j+1; and the second terminal of the capacitor 5083 in the pixel 5080_i+1, j+1 is electrically connected to a wiring 5086-1_j+1.

Figure 17F:
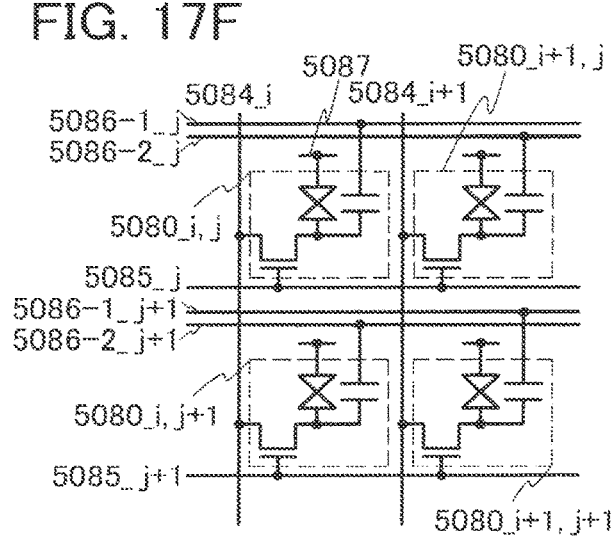
Figure 17G:
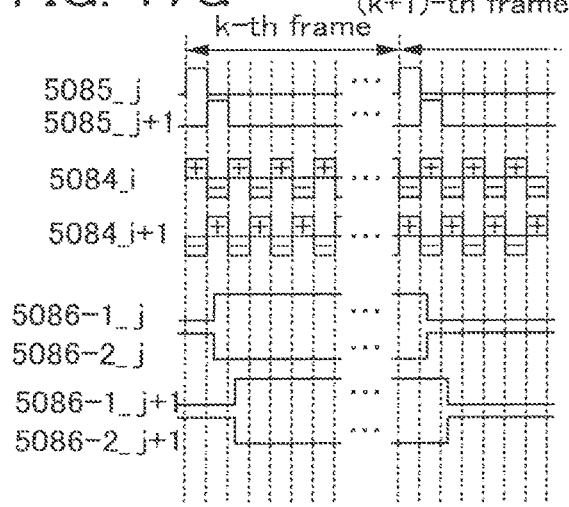

For example, when positive signal voltage is written to the pixel 5080, j in the k-th frame as illustrated in FIG. 17C the wiring 5086-1J becomes a low level, and is changed to a high level after the j-th gate selection period. Then, the wiring 5086-1_j is kept at a high level in one frame period, and after negative signal voltage is written in the f-th gate selection period in the (k+1)th frame, the wiring 5086-1_j is changed to a high level. In is manner, voltage of the wiring which is electrically connected to the second terminal of the capacitor 5083 is changed in a positive direction after positive signal voltage is written to the pixel, so that voltage applied to the liquid crystal element can be changed in the positive direction by a predetermined level. That is, signal voltage written to the pixel can be lowered by the predetermined level, so that power consumed in signal writing can be reduced. Note that when negative signal voltage is written in the j-th gate selection period, voltage of the wiring which is electrically connected to the second terminal of the capacitor 5083 is changed in a negative direction after negative signal voltage is written to the pixel. Thus, voltage applied to the liquid crystal element can be changed in the negative direction by a predetermined level, and the signal voltage written to the pixel can be reduced as in the case of the positive polarity. In other words, as for the wiring which is electrically connected to the second terminal of the capacitor 5083, different wirings are preferably used for a pixel to which positive signal voltage is applied and a pixel to which negative signal voltage is applied in the same row of the same frame. FIG. 17F illustrates an example in which the wiring 5086-1 is electrically connected to the pixel to which positive signal voltage is applied in the k-th frame and the wiring 5086-2 is electrically connected to the pixel to which negative signal voltage is applied in the k-th frame. Note that this is just an example, and for example, in the case of using a driving method by which pixels to which positive signal voltage is written and pixels to which negative signal voltage is written appear every two pixels, it is preferable to perform electrical connections with the wirings 5086-1 and 5086-2 alternately every two pixels. Further, in the case where signal voltage of the same polarity is written to all the pixels in one row (gate line inversion), one wiring 5086 may be provided per row. In other words, in the pixel structure in FIG. 17C, the driving method by which signal voltage written to a pixel is lowered as described with reference to FIGS. 17F and 17G can be used.

Figure 18A:
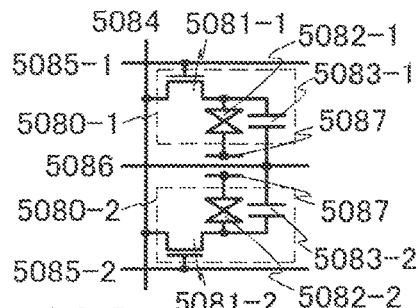
FIGS. 18A to 18H illustrate circuits according to one example of the embodiment.
Figure 18B:
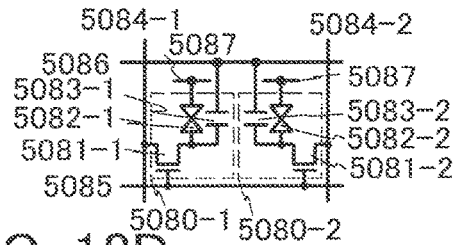

Next, a pixel structure and a driving method which are preferably used particularly in the case where the mode of a liquid crystal element is a vertical alignment (VA) mode typified by an MVA mode and a PVA mode. The VA mode has advantages such as no rubbing step in manufacture, little light leakage at the time of black display, and low driving voltage, but has a problem in that image quality is decreased (the viewing angle is narrower) when a screen is seen from an oblique angle. In order to widen the viewing angle in the VA mode, a pixel structure where one pixel includes a plurality of subpixels as illustrated in FIGS. 18A and 18B is effective. Pixel structures illustrated in FIGS. 18A and 18B are examples of the case where the pixel 5080 includes two subpixels (a subpixel 5080-1 and a subpixel 5080-2). Note that the number of subpixels in one pixel is not limited to two and can be other numbers. The viewing angle can be further widened as the number of subpixels becomes larger. A plurality of subpixels can have the same circuit structure. Here, all the subpixels have the circuit structure illustrated in FIG. 17A. Note that the first subpixel 5090-1 includes a transistor 5081-1, a liquid crystal element 5082-1, and a capacitor 5083-1. The connection relation of each element is the same as that in the circuit structure in FIG. 17A. In a similar manner, the second subpixel 5080-2 includes a transistor 5081-2, a liquid crystal element 5082-2, and a capacitor 5083-2. The connection relation of each element is the same as that in the circuit structure in FIG. 17A.

The pixel structure in FIG. 18A includes, for two subpixels included in one pixel, two wirings 5085 (a wiring 5085-1 and a wiring 5085-2) used as scan lines, one wiring 5084 used as a signal line, and one wiring 5086 used as a capacitor line. When the signal line and the capacitor line are shared between two subpixels in this manner, the aperture ratio can be improved. Further, since a signal line driver circuit can be simplified, manufacturing cost can be reduced. Furthermore, since the number of connections between a liquid crystal panel and a driver circuit IC can be reduced, yield can be improved. The pixel structure in FIG. 18B includes, for two subpixels included in one pixel, one wiring 5085 used as a scan line, two wirings 5084 (a wiring 5084-1 and a wiring 5084-2) used as signal lines, and one wiring 5086 used as a capacitor line. When the scan line and the capacitor line are shared between two subpixels in this manner, the aperture ratio can be improved. Further, since the total number of scan lines can be reduced, the length of each gate line selection period can be sufficiently increased even in a high-definition liquid crystal panel, and appropriate signal voltage can be written to each pixel.

Figure 18C:
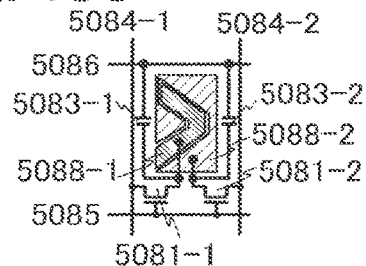
Figure 18D:
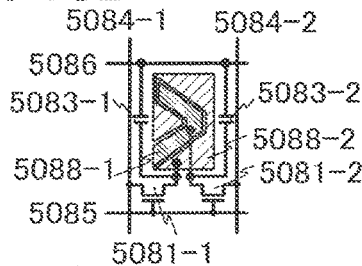

FIGS. 18C and 18D illustrate an example in which the liquid crystal element in the pixel structure in FIG. 18B is replaced with the shape of a pixel electrode and the electrical connection of each element is schematically illustrated. In FIGS. 18C and 18D, an electrode 5088-1 corresponds to a first pixel electrode, and an electrode 5088-2 corresponds to a second pixel electrode. In FIG. 18C, the first pixel electrode 5088-1 corresponds to a first terminal of the liquid crystal element 5082-1 in FIG. 18B, and the second pixel electrode 5088-2 corresponds to a first terminal of the liquid crystal element 5082-2 in FIG. 18B. That is, the first pixel electrode 5088-1 is electrically connected to one of a source and a drain of the transistor 5081-1, and the second pixel electrode 5088-2 is electrically connected to one of a source and a drain of the transistor 5081-2. Meanwhile, in FIG. 18D, the connection relation between the pixel electrode and the transistor is opposite to that in FIG. 18C. That is, the first pixel electrode 508-1 is electrically connected to one of the source and the drain of the transistor 5081-2, and the second pixel electrode 5088-2 is electrically connected to one of the source and the drain of the transistor 5081-1.

Figure 18E:
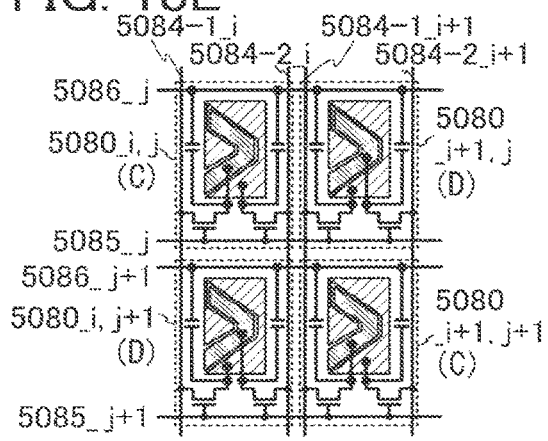
Figure 18F:
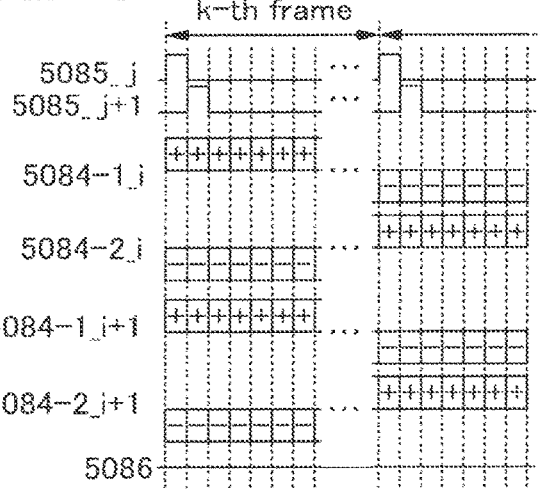

By alternately arranging a plurality of pixel structures as illustrated in FIG. 18C and FIG. 18I) in matrix, special advantageous effects can be obtained. FIGS. 18E and 18F illustrate examples of the pixel structure and a driving method thereof. In the pixel structure in FIG. 18E, a portion corresponding to the pixels $5080\_i, j$ and $5080\_i+1, j+1$ has the structure illustrated in FIG. 18C, and a portion corresponding to the pixels $5080\_i+1, j$ and $5080\_i, j+1$ has the structure illustrated in FIG. 18D. In this structure, by performing driving as the timing chart illustrated in FIG. 18F, in the j-th gate selection period in the k-th frame, positive signal voltage is written to the first pixel electrode in the pixel $5080\_i, j$ and the second pixel electrode in the pixel $5080\_i+1, j$, and negative signal voltage is written to the second pixel electrode in the pixel $5080\_i, j$ and the first pixel electrode in the pixel $5080\_i+1, j$. In the (j+1)th gate selection period in the k-th frame, positive signal voltage is written to the second pixel electrode in the pixel $5080\_i, j+1$ and the first pixel electrode in the pixel $5080\_i+1, j+1$, and negative signal voltage is written to the first pixel electrode in the pixel $5080\_i, j+1$ and the second pixel electrode in the pixel $5080\_i+1, j+1$. In the (k+1)th frame, the polarity of signal voltage is inverted in each pixel. Thus, the polarity of voltage applied to the signal line can be the same in one frame period while driving corresponding to dot inversion driving is realized in the pixel structure including subpixels. Therefore, power consumed in writing signal voltage to the pixels can be drastically reduced. Note that voltage applied to all the wirings 5086 including the wirings $5086\_j$ and $5086\_j+1$ can be fixed voltage.

Figure 18G:
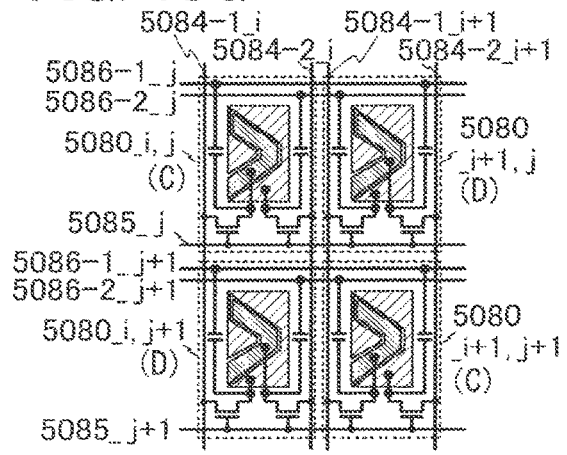
Figure 18H:
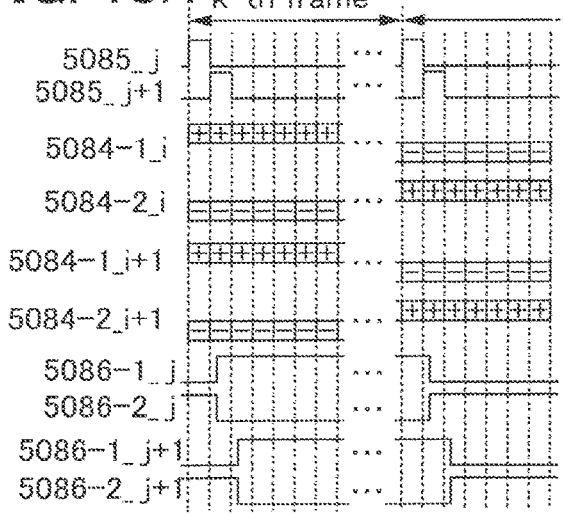

Further, by a pixel structure and a driving method illustrated in FIGS. 18G and 18H, the level of signal voltage written to a pixel can be lowered. In the structure, capacitors lines which are electrically connected to a plurality of subpixels included in each pixel are different between the subpixels. That is, by using the pixel structure and the driving method illustrated in FIGS. 18G and 18H, subpixels to which voltages having the same polarities are written in the same frame share a capacitor line in the same row, and subpixels to which voltages having different polarities are written in the same frame use different capacitor lines in the same row. Then, when writing in each row is terminated, voltage of the capacitor lines is changed to the positive direction in the subpixels to which positive signal voltage is written, and changed to the negative direction in the subpixels to which negative signal voltage is written. Thus, the level of the signal voltage written to the pixel can be lowered. Specifically, two wirings 5086 (the wirings 5086-1 and 5086-2) used as capacitor lines are provided in each row. The first pixel electrode in the pixel $5080\_i, j$ and the wiring $5086\text{-}1\_j$ are electrically connected to each other through the capacitor. The second pixel electrode in the pixel $5080\_i, j$ and the wiring $5086\text{-}2\_j$ are electrically connected to each other through the capacitor. The first pixel electrode in the pixel $5080\_i+1, j$ and the wiring $5086\text{-}2\_j$ are electrically connected to each other through the capacitor. The second pixel electrode in the pixel $5080\_i+1, j$ and the wiring $5086\text{-}1\_j$ are electrically connected to each other through the capacitor. The first pixel electrode in the pixel $5080\_i, j+1$ and the wiring $5086\text{-}2\_j+1$ are electrically connected to each other through the capacitor. The second pixel electrode in the pixel $5080\_i, j+1$ and the wiring $5086\text{-}1\_j+1$ are electrically connected to each other through the capacitor. The first pixel electrode in the pixel $5080\_i+1, j+1$ and the wiring $5086\text{-}1\_j+1$ are electrically connected to each other through the capacitor. The second pixel electrode in the pixel $5080\_i+1, j+1$ and the wiring $5086\text{-}2\_j+1$ are electrically connected to each other through the capacitor. Note that this is just an example, and for example, in the case of using a driving method by which pixels to which positive signal voltage is written and pixels to which negative signal voltage is written appear every two pixels, it is preferable to perform electrical connections with the wirings 5086-1 and 5086-2 alternately every two pixels. Further, in the case where signal voltage of the same polarity is written in all the pixels in one row (gate line inversion), one wiring 5086 may be provided per row. In other words, in the pixel structure in FIG. 18E, the driving method by which signal voltage written to a pixel is lowered as described with reference to FIGS. 18G and 18H can be used.

Embodiment 9

In this embodiment, examples of display devices are described.

First, an example of a system block of a liquid crystal display device is described with reference to FIG. 19A. The liquid crystal display device includes a circuit 5361, a circuit 5362, a circuit 5363_1, a circuit 5363_2, a pixel portion 5364, a circuit 5365, and a lighting device 5366. A plurality of wirings 5371 which are extended from the circuit 5362 and a plurality of wirings 5372 which are extended from the circuit 5363_1 and the circuit 5363_2 are provided in the pixel portion 5364. In addition, pixels 5367 which include display elements such as liquid crystal elements are provided in matrix in respective regions where the plurality of wirings 5371 and the plurality of wirings 5372 intersect with each other.

The circuit 5361 has a function of outputting a signal, voltage, current, or the like to the circuit 5362, the circuit 5363_1, the circuit 5363_2, and the circuit 5365 in response to a video signal 5360 and can serve as a controller, a control circuit, a timing generator, a power supply circuit, a regulator, or the like. In this embodiment, for example, the circuit 5361 supplies a signal line driver circuit start signal (SSP), a signal line driver circuit clock signal (SCK), a signal line driver circuit inverted clock signal (SCKB), video signal data (DATA), or a latch signal (LAT) to the circuit 5362. Alternatively, for example, the circuit 5361 supplies a scan line driver circuit start signal (OSP), a scan line driver circuit clock signal (GCK), or a scan line driver circuit inverted clock signal (GCKB) to the circuit 5363_1 and the circuit 5363_2. Alternatively, the circuit 5361 outputs a backlight control signal (BLC) to the circuit 5365. Note that this embodiment is not limited to this. The circuit 5361 can supply a variety of signals, voltages, currents, or the like to the circuit 5362, the circuit 5363_1, the circuit 5363_2, and the circuit 5365.

Note that in the circuit 5361, super-resolution processing, edge enhancement processing, frame interpolation processing, overdrive processing, local dimming processing, IP conversion processing, and/or enlargement processing can be performed, for example.

Note that in the circuit 5365, local dimming processing or the like can be performed. Alternatively, in the circuit 5365, processing for determining the luminance of a backlight in each region in local dimming processing can be performed.

Note that in the circuit 5361 or the circuit 5365, a variety of processings can be performed. Therefore, the circuit 5361 or the circuit 5365 can include more circuits. That is, the circuit 5361 or the circuit 5365 can be formed using a plurality of circuits. In that case, the plurality of circuits included in the circuit 5361 or the circuit 5365 can be formed over one IC chip. Note that one example of this embodiment is not limited to this. The plurality of circuits included in the circuit 5361 or the circuit 5365 can be formed over a plurality of different IC chips. In that case, the circuit 5361 or the circuit 5365 can be formed using a plurality of IC chips.

In that case, the circuit 5362 has a function of outputting video signals to the plurality of wirings 5371 in response to a signal supplied from the circuit 5361 (e.g., SSP, SCK, SCKB, DATA, or LAT) and can serve as a signal line driver circuit. The circuit 5363_1 and the circuit 5363_2 each have a function of outputting scan signals to the plurality of wirings 5372 in response to a signal supplied from the circuit 5361 (e.g., GSP, GCK, or GCKB) and can serve as a scan line driver circuit. The circuit 5365 has a function of controlling the luminance (or average luminance) of the lighting device 5366 by controlling the amount of electric power supplied to the lighting device 5366, time to supply the electric power to the lighting device 5366, or the like in response to the backlight control signal (BLC) and can serve as a power supply circuit.

Note that in the case where video signals are input to the plurality of wirings 5371, the plurality of wirings 5371 can serve as signal lines, video signal lines, source lines, or the like. In the case where scan signals are input to the plurality of wirings 5372, the plurality of wirings 5372 can serve as signal lines, scan lines, gate lines, or the like. Note that one example of this embodiment is not limited to this.

Note that in the case where the same signal is input to the circuit 5363_1 and the circuit 5363_2 from the circuit 5361, scan signals output from the circuit 5363_1 to the plurality of wirings 5372 and scan signals output from the circuit 5363_2 to the plurality of wirings 5372 have approximately the same timings in many cases. Therefore, load caused by driving of the circuit 5363_1 and the circuit 5363_2 can be reduced. Accordingly, the display device can be made larger. Alternatively, the display device can have higher definition. Alternatively, since the channel width of transistors included in the circuit 5363_1 and the circuit 5363_2 can be decreased, a display device with a narrower frame can be obtained. Note that this embodiment is not limited to this. The circuit 5361 can supply different signals to the circuit 5363_1 and the circuit 5363_2.

Note that one of the circuit 5363_1 and the circuit 5363_2 can be eliminated.

Note that a wiring such as a capacitor line, a power supply line, or a scan line can be additionally provided in the pixel portion 5364. Then, the circuit 5361 can output a signal, voltage, or the like to such a wiring. Alternatively, a circuit which is similar to the circuit 5363_1 or the circuit 5363_2 can be additionally provided. The additionally provided circuit can output a signal such as a scan signal to the additionally provided wiring.

Note that the pixel 5367 can include a light-emitting element such as an EL element as a display element. In this case, as illustrated in FIG. 19B, since the display element can emit light, the circuit 5365 and the lighting device 5366 can be eliminated. In addition, in order to supply electric power to the display element, a plurality of wirings 5373 which can serve as power supply lines can be provided in the pixel portion 5364. The circuit 5361 can supply power supply voltage called voltage (ANO) to the wirings 5373. The wirings 5373 can be separately connected to the pixels in accordance with color elements or connected to all the pixels.

Note that FIG. 19B illustrates an example in which the circuit 5361 supplies different signals to the circuit 5363_1 and the circuit 5363_2. The circuit 5361 supplies a signal such as a scan line driver circuit start signal (GSP1), a scan line driver circuit clock signal (GCK1), or a scan line driver circuit inverted clock signal (GCKB1) to the circuit 5363_1. In addition, the circuit 5361 supplies a signal such as a scan line driver circuit start signal (GSP2), a scan line driver circuit clock signal (GCK2), or a scan line driver circuit inverted clock signal (GCKB2) to the circuit 5363_2. In this case, the circuit 5363_1 can scan only wirings in odd-numbered rows of the plurality of wirings 5372 and the circuit 5363_2 can scan only wirings in even-numbered rows of the plurality of wirings 5372. Thus, the driving frequency of the circuit 5363_1 and the circuit 5363_2 can be lowered, so that power consumption can be reduced. Alternatively, an area in which a flip-flop of one stage can be laid out can be made larger. Therefore, a display device can have higher definition. Alternatively, a display device can be made larger. Note that this embodiment is not limited to this. As in FIG. 19A, the circuit 5361 can supply the same signal to the circuit 5363_1 and the circuit 5363_2.

Figure 19A:
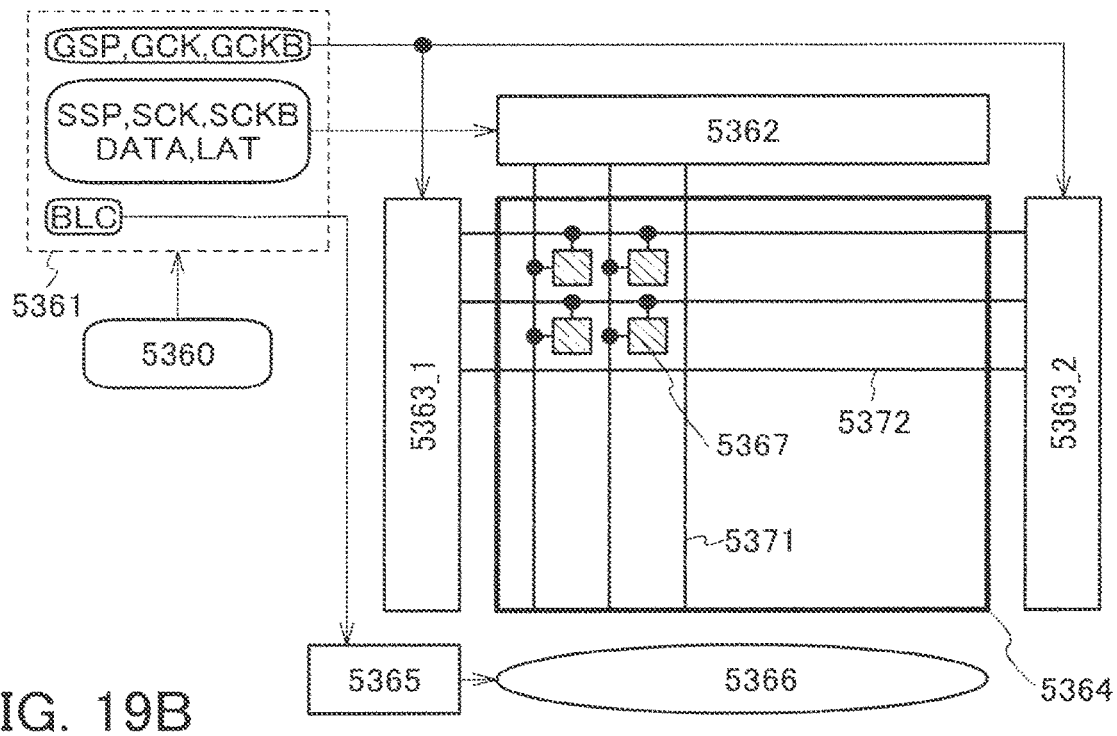
FIGS. 19A and 19B illustrate structures of display devices according to one example of an embodiment.
Figure 19B:
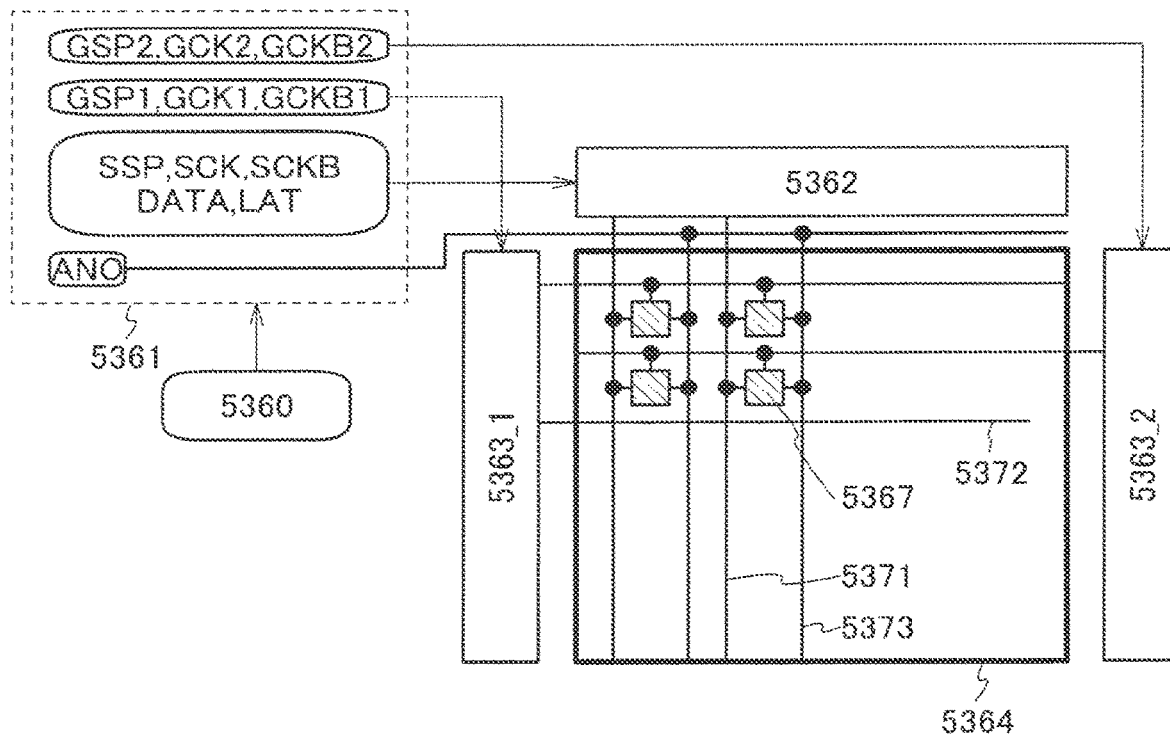

Note that as in FIG. 19B, the circuit 5361 can supply different signals to the circuit 5363_1 and the circuit 5363_2 in FIG. 19A.

Thus far, the example of a system block of a display device is described.

Next, examples of structures of the display devices are described with reference to FIGS. 20A to 20E.

In FIG. 20A, circuits which have a function of outputting signals to the pixel portion 5364 (e.g., the circuit 5362, the circuit 5363_1, and the circuit 5363_2) are formed over the same substrate 5380 as the pixel portion 5364. In addition, the circuit 5361 is formed over a different substrate from the pixel portion 5364. In this manner, since the number of external components is reduced, reduction in cost can be achieved. Alternatively, since the number of signals or voltages input to the substrate 5380 is reduced, the number of connections between the substrate 5380 and the external component can be reduced. Therefore, improvement in reliability or the increase in yield can be achieved.

Note that in the case where the circuit is formed over a different substrate from the pixel portion 5364, the substrate can be mounted on an FPC (flexible printed circuit) by TAB (tape automated bonding). Alternatively, the substrate can be mounted on the same substrate 5380 as the pixel portion 5364 by COG (chip on glass).

Note that in the case where the circuit is formed over a different substrate from the pixel portion 5364, a transistor formed using a single crystal semiconductor can be formed on the substrate. Therefore, the circuit formed over the substrate can have advantages such as improvement in driving frequency, improvement in driving voltage, and suppression of variations in output signals.

Note that a signal, voltage, current, or the like is input from an external circuit through an input terminal 5381 in many cases.

In FIG. 20B, circuits with low driving frequency (e.g., the circuit 5363_1 and the circuit 5363_2) are formed over the same substrate 5380 as the pixel portion 5364. In addition, the circuit 5361 and the circuit 5362 are formed over a different substrate from the pixel portion 5364. In this manner, since the circuit formed over the substrate 5380 can be formed using a transistor with low mobility, a non-single-crystal semiconductor, a microcrystalline semiconductor, an organic semiconductor, an oxide semiconductor, or the like can be used for a semiconductor layer of the transistor. Accordingly, the increase in the size of the display device, reduction in the number of steps, reduction in cost, improvement in yield, or the like can be achieved.

Note that as illustrated in FIG. 20C, part of the circuit 5362 (a circuit 5362*a*) can be formed over the same substrate 5380 as the pixel portion 5364 and the other part of the circuit 5362 (a circuit 5362*b*) can be formed over a different substrate from the pixel portion 5364. The circuit 5362*a* includes a circuit which can be formed using a transistor with low mobility (e.g., a shift register, a selector, or a switch) in many cases. In addition, the circuit 5362*b* includes a circuit which is preferably formed using a transistor with high mobility and few variations in characteristics (e.g., a shift register, a latch circuit, a buffer circuit, a DA converter circuit, or an AD converter circuit) in many cases. In this manner, as in FIG. 20B, a non-single-crystal semiconductor, a microcrystalline semiconductor, an organic semiconductor, an oxide semiconductor, or the like can be used for a semiconductor layer of the transistor. Further, reduction in external components can be achieved.

In FIG. 20O, circuits which have a function of outputting signals to the pixel portion 5364 (e.g., the circuit 5362, the circuit 5363_1, and the circuit 5363_2) and a circuit which has a function of controlling these circuits (e.g., the circuit 5361) are formed over a different substrate from the pixel portion 5364. In this manner, since the pixel portion and peripheral circuits thereof can be formed over different substrates, improvement in yield can be achieved.

Note that as in FIG. 20D, the circuit 5363_1 and the circuit 5363_2 can be formed over a different substrate from the pixel portion 5364 in FIGS. 20A to 20C.

In FIG. 20E, pan of the circuit 5361 (a circuit 5361*a*) is formed over the same substrate 5380 as the pixel portion 5364 and the other part of the circuit 5361 (a circuit 5361*b*) is formed over a different substrate from the pixel portion 5364. The circuit 5361*a* includes a circuit which can be formed using a transistor with low mobility (e.g., a switch, a selector, or a level shift circuit) in many cases. In addition, the circuit 5361*b* includes a circuit which is preferably formed using a transistor with high mobility and few variations (e.g., a shift register, a timing generator, an oscillator, a regulator, or an analog buffer) in many cases.

Note that also in FIGS. 20A to 20D, the circuit 5361*a* can be formed over the same substrate as the pixel portion 5364 and the circuit 5361*b* can be formed over a different substrate from the pixel portion 5364.

Embodiment 10

In this embodiment, examples of structures of transistors are described with reference to FIGS. 21A to 21C.

Figure 21A:
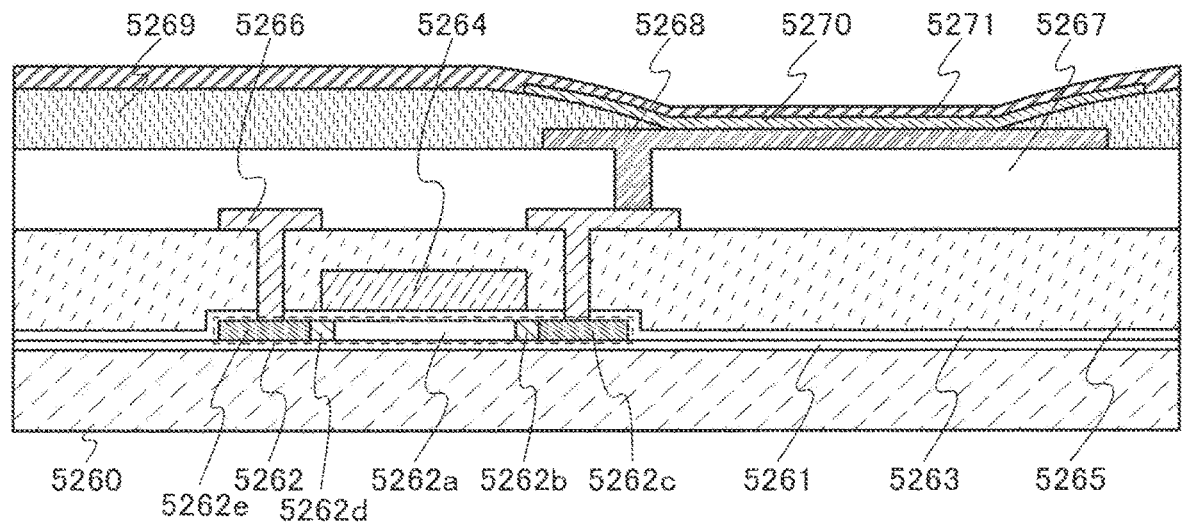
FIGS. 21A to 21C are cross-sectional views illustrating structures of transistors according to one example of an embodiment.

FIG. 21A illustrates an example of a structure of a top-gate transistor. FIG. 21B illustrates an example of a structure of a bottom-gate transistor. FIG. 21C illustrates an example of a structure of a transistor formed using a semiconductor substrate.

FIG. 21A illustrates a substrate 5260; an insulating layer 5261 formed over the substrate 5260; a semiconductor layer 5262 which is formed over the insulating layer 5261 and is provided with a region 5262*a*, a region 5262*b*, a region 5262*c*, a region 5262*d*, and a region 5262*e*; an insulating layer 5263 formed so as to cover the semiconductor layer 5262; a conductive layer 5264 formed over the semiconductor layer 5262 and the insulating layer 5263; an insulating layer 5265 which is formed over the insulating layer 5263 and the conductive layer 5264 and is provided with openings; a conductive layer 5266 which is formed over the insulating layer 5265 and in the openings formed in the insulating layer 5265; an insulating layer 5267 which is formed over the conductive layer 5266 and the insulating layer 5265 and is provided with an opening; a conductive layer 5268 which is formed over the insulating layer 5267 and in the opening formed in the insulating layer 5267; an insulating layer 5269 which is formed over the insulating layer 5267 and the conductive layer 5268 and is provided with the opening; a light-emitting layer 5270 which is formed over the insulating layer 5269 and in the opening formed in the insulating layer 5269; and a conductive layer 5271 formed over the insulating layer 5269 and the light-emitting layer 5270.

Figure 21B:
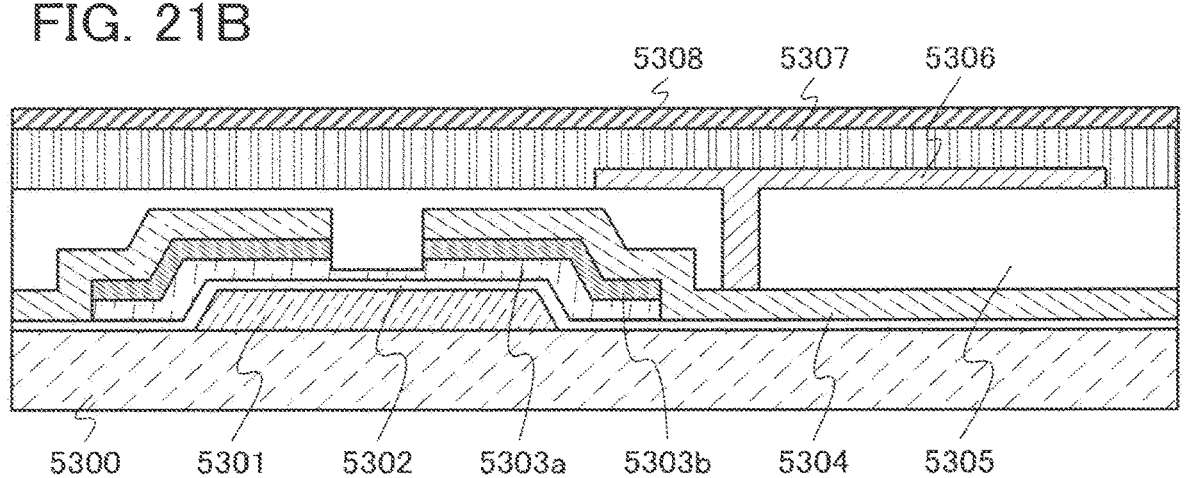

FIG. 21B illustrates a substrate 5300; a conductive layer 5301 formed over the substrate 5300; an insulating layer 5302 formed so as to cover the conductive layer 5301; a semiconductor layer 5303*a* formed over the conductive layer 5301 and the insulating layer 5302; a semiconductor layer 5303*b* formed over the semiconductor layer 5303*a*; a conductive layer 5304 formed over the semiconductor layer 5303*b* and the insulating layer 5302; an insulating layer 5305 which is formed over the insulating layer 5302 and the conductive layer 5304 and is provided with an opening; a conductive layer 5306 which is formed over the insulating layer 5305 and in the opening formed in the insulating layer 5305; a liquid crystal layer 5307 formed over the insulating layer 5305 and the conductive layer 5306; and a conductive layer 5308 formed over the liquid crystal layer 5307.

Figure 21C:
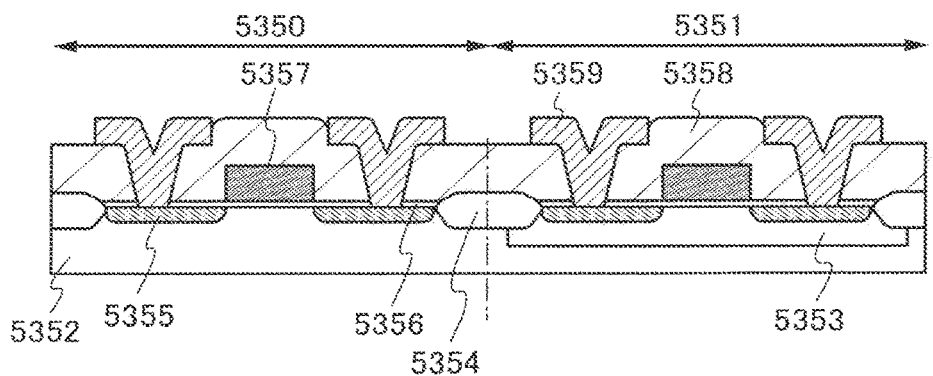

FIG. 21C illustrates a semiconductor substrate 5352 including a region 5353 and a region 5355; an insulating layer 5356 formed over the semiconductor substrate 5352; an insulating layer 5354 formed over the semiconductor substrate 5352; a conductive layer 5357 formed over the insulating layer 5356; an insulating layer 5358 which is formed over the insulating layer 5354, the insulating layer 5356, and the conductive layer 5357 and is provided with openings; and a conductive layer 5359 which is formed over the insulating layer 5358 and in the openings formed in the insulating layer 5358. Thus, a transistor is formed in each of a region 5350 and a region 5351.

The insulating layer 5261 can serve as a base film. The insulating layer 5354 serves as an element isolation layer (e.g., a field oxide film). Each of the insulating layer 5263, the insulating layer 5302, and the insulating layer 5356 can serve as a gate insulating film. Each of the conductive layer 5264, the conductive layer 5301, and the conductive layer 5357 can serve as a gate electrode. Each of the insulating layer 5265, the insulating layer 5267, the insulating layer 5305, and the insulating layer 5358 can serve as an interlayer film or a planarization film. Each of the conductive layer 5266, the conductive layer 5304, and the conductive layer 5359 can serve as a wiring, an electrode of a transistor, an electrode of a capacitor, or the like. Each of the conductive layer 5268 and the conductive layer 5306 can serve as a pixel electrode, a reflective electrode, or the like. The insulating layer 5269 can serve as a partition wall. Each of the conductive layer 5271 and the conductive layer 5308 can serve as a counter electrode, a common electrode, or the like.

As each of the substrate 5260 and the substrate 5300, a glass substrate, a quartz substrate, a silicon substrate, a metal substrate, a stainless steel substrate, a flexible substrate, or the like can be used, for example. As a glass substrate, a barium borosilicate glass substrate, an aluminoborosilicate glass substrate, or the like can be used, for example. For a flexible substrate, a flexible synthetic resin such as plastics typified by polyethylene terephthalate (PET), polyethylene naphthalate (PEN), and polyether sulfone (PES), or acrylic can be used, for example. Alternatively, an attachment film (formed using polypropylene, polyester, vinyl, polyvinyl fluoride, polyvinyl chloride, or the like), paper of a fibrous material, a base material film (formed using polyester, polyamide, an inorganic vapor deposition film, paper, or the like), or the like can be used.

As the semiconductor substrate 5352, for example, a single crystal silicon substrate having n-type or p-type conductivity can be used. Note that this embodiment is not limited to this, and a substrate which is similar to the substrate 5260 can be used. For example, the region 5353 is a region where an impurity is added to the semiconductor substrate 5352 and serves as a well. For example, in the case where the semiconductor substrate 5352 has p-type conductivity, the region 5353 has n-type conductivity and serves as an n-well. On the other hand, in the case where the semiconductor substrate 5352 has n-type conductivity, the region 5353 has p-type conductivity and serves as a p-well. For example, the region 5355 is a region where an impurity is added to the semiconductor substrate 5352 and serves as a source region or a drain region. Note that an LDD region can be formed in the semiconductor substrate 5352.

For the insulating layer 5261, a single-layer structure or a layered structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) can be used, for example. In an example in the case where the insulating film 5261 has a two-layer structure, a silicon nitride film and a silicon oxide film can be formed as a first insulating film and a second insulating film, respectively. In an example in the case where the insulating film 5261 has a three-layer structure, a silicon oxide film, a silicon nitride film, and a silicon oxide film can be formed as a first insulating film, a second insulating film, and a third insulating film, respectively.

For each of the semiconductor layer 5262, the semiconductor layer 5303a, and the semiconductor layer 5303b, for example, a non-single-crystal semiconductor (e.g., amorphous silicon, polycrystalline silicon, or microcrystalline silicon), a single crystal semiconductor, a compound semiconductor or an oxide semiconductor (e.g., ZnO, InGaZnO, SiGe, GaAs, IZO, ITO, or SnO), an organic semiconductor, a carbon nanotube, or the like can be used.

Note that for example, the region 5262a is an intrinsic region where an impurity is not added to the semiconductor layer 5262 and serves as a channel region. However, a slight amount of impurities can be added to the region 5262a. The concentration of the impurity added to the region 5262a is preferably lower than the concentration of an impurity added to the region 5262b, the region 5262c, the region 5262d, or the region 5262e. Each of the region 5262b and the region 5262d is a region to which an impurity is added at low concentration and serves as an LDD (lightly doped drain) region. Note that the region 5262b and the region 5262d can be eliminated. Each of the region 5262c and the region 5262e is a region to which an impurity is added at high concentration and serves as a source region or a drain region.

Note that the semiconductor layer 5303b is a semiconductor layer to which phosphorus or the like is added as an impurity element and has n-type conductivity.

Note that in the case where an oxide semiconductor or a compound semiconductor is used for the semiconductor layer 5303a, the semiconductor layer 5303b can be eliminated.

For each of the insulating layer 5263, the insulating layer 5302, and the insulating layer 5356, a single-layer structure or a layered structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) can be used, for example.

As each of the conductive layer 5264, the conductive layer 5266, the conductive layer 5268, the conductive layer 5271, the conductive layer 5301, the conductive layer 5304, the conductive layer 5306, the conductive layer 5308, the conductive layer 5357, and the conductive layer 5359, for example, a conductive film having a single-layer structure or a layered structure, or the like can be used. For example, for the conductive film, a single-layer film containing one element selected from the group consisting of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), manganese (Mn), cobalt (Co), niobium (Nb), silicon (Si), iron (Fe), palladium (Pd), carbon (C), scandium (Sc), zinc (Zn), phosphorus (P), boron (B), arsenic (As), gallium (Ga), indium (In), tin (Sn), and oxygen (O); a compound containing one or more elements selected from the above group; or the like can be used. For example, the compound is an alloy containing one or more elements selected from the above group (e.g., an alloy material such as indium tin oxide (ITO), indium zinc oxide (IZO), indium tin oxide containing silicon oxide (ITSO), zinc oxide (ZnO), tin oxide (SnO), cadmium tin oxide (CTO), aluminum-neodymium (Al—Nd), so magnesium-silver (Mg—Ag), molybdenum-niobium (Mo—Nb), molybdenum-tungsten (Mo—W), or molybdenum-tantalum (Mo—Ta)); a compound containing nitrogen and one or more elements selected from the above group (e.g., a nitride film containing titanium nitride, tantalum nitride, molybdenum nitride, or the like); or a compound containing silicon and one or more elements selected from the above group (e.g., a silicide film containing tungsten silicide, titanium silicide, nickel silicide, aluminum silicon, or molybdenum silicon); or the like. Alternatively, a nanotube material such as a carbon nanotube, an organic nanotube, an inorganic nanotube, or a metal nanotube can be used.

Note that silicon (Si) can contain an n-type impurity (e.g., phosphorus) or a p-type impurity (e.g., boron).

Note that in the case where copper is used for the conductive layer, a layered structure is preferably used in order to improve adhesion.

Note that for a conductive layer which is in contact with an oxide semiconductor or silicon, molybdenum or titanium is preferably used.

Note that by using an alloy material containing neodymium and aluminum for the conductive layer, aluminum does not easily cause hillocks.

Note that in the case where a semiconductor material such as silicon is used for the conductive layer, the semiconductor material such as silicon can be formed at the same time as a semiconductor layer of a transistor.

Note that since ITO, IZO, ITSO, ZnO, Si, SnO, CTO, a carbon nanotube, or the like has light-transmitting properties, such a material can be used for a portion through which light passes, such as a pixel electrode, a counter electrode, or a common electrode.

Note that by using a layered structure containing a low-resistance material (e.g., aluminum), wiring resistance can be lowered.

Note that by using a layered structure where a low heat-resistance material (e.g., aluminum) is interposed between high heat-resistance materials (e.g., molybdenum, titanium, or neodymium), advantages of the low heat-resistance material can be effectively utilized and heat resistance of a wiring, an electrode, or the like can be increased.

b Note that a material whose properties are changed by reaction with a different material can be interposed between or covered with materials which do not easily react with the different material. For example, in the case where ITO and aluminum are connected to each other, titanium, molybdenum, or an alloy of neodymium can be interposed between ITO and aluminum. For example, in the case where silicon and aluminum are connected to each other, titanium, molybdenum, or an alloy of neodymium can be interposed between silicon and aluminum. Note that such a material can be used for a wiring, an electrode, a conductive layer, a conductive film, a terminal, a via, a plug, or the like.

For each of the insulating layer 5265, the insulating layer 5267, the insulating layer 5269, the insulating layer 5305, and the insulating layer 5358, an insulating film having a single-layer structure or a layered structure, or the like can be used, for example. For example, as the insulating film, an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as diamond-like carbon (DLC); an organic material such as a siloxane resin, epoxy, polyimide, polyamide, polyvinyl phenol, benzocyclobutene, or acrylic; or the like can be used.

For the light-emitting layer 5270, an organic EL element, an inorganic EL element, or the like can be used, for example. For the organic EL element, for example, a single-layer structure or a layered structure of a hole injection layer formed using a hole injection material, a hole transport layer formed using a hole transport material, a light-emitting layer formed using a light-emitting material, an electron transport layer formed using an electron transport material, an electron injection layer formed using an electron injection material, or a layer in which a plurality of these materials are mixed can be used.

For example, the following can be used for the liquid crystal layer 5307: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a plasma addressed liquid crystal (PALC), a banana-shaped liquid crystal, and the like. In addition, the following can be used as a diving method of a liquid crystal: a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, a blue phase mode, and the like.

Note that an insulating layer which serves as an alignment film, an insulating layer which serves as a protrusion portion, or the like can be formed over the insulating layer 5305 and the conductive layer 5306.

Note that an insulating layer or the like which serves as a color filter, a black matrix, or a protrusion portion can be formed over the conductive layer 5308. An insulating layer which serves as an alignment film can be formed below the conductive layer 5308.

Note that the insulating layer 5269, the light-emitting layer 5270, and the conductive layer 5271 can be eliminated in the cross-sectional structure in FIG. 21A, so and the liquid crystal layer 5307 and the conductive layer 5308 which are illustrated in FIG. 21B can be formed over the insulating layer 5267 and the conductive layer 5268.

Note that the liquid crystal layer 5307 and the conductive layer 5308 can be eliminated in the cross-sectional structure in FIG. 21B, and the insulating layer 5269, the light-emitting layer 5270, and the conductive layer 5271 which are illustrated in FIG. 21A can be formed over the insulating layer 5305 and the conductive layer 5306.

Note that in the cross-sectional structure in FIG. 21C, the insulating layer 5269, the light-emitting layer 5270, and the conductive layer 5271 which are illustrated in FIG. 21A can be formed over the insulating layer 5358 and the conductive layer 5359. Alternatively, the liquid crystal layer 5307 and the conductive layer 5308 which are illustrated in FIG. 21B can be formed over the insulating layer 5267 and the conductive layer 5268.

Embodiment 11

In this embodiment, examples of electronic devices are described.

FIGS. 22A to 22H and FIGS. 23A to 23D illustrate electronic devices. These electronic devices can include a housing 5000, a display portion 5001, a speaker 5003, an LED lamp 5004, operation keys 5005 (including a power switch or an operation switch), a connection terminal 5006, a senor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 22A:
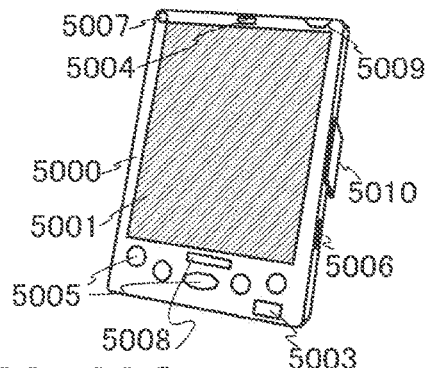
FIGS. 22A to 22H illustrate electronic devices according to one example of an embodiment.
Figure 22B:
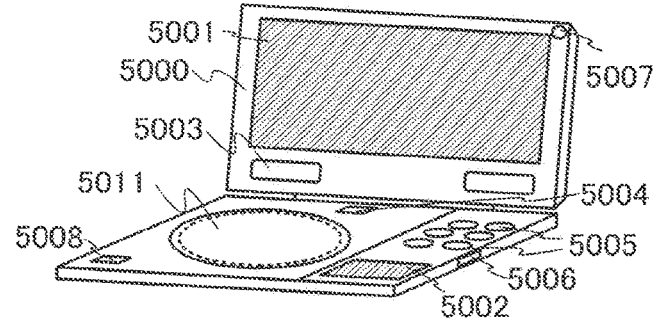
Figure 22C:
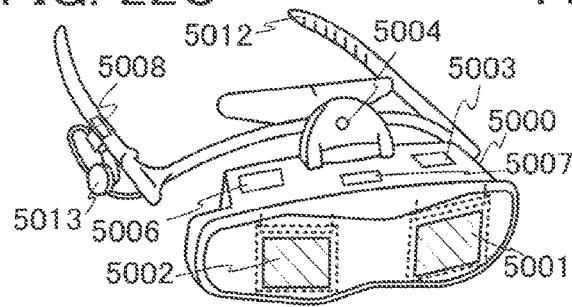
Figure 22D:
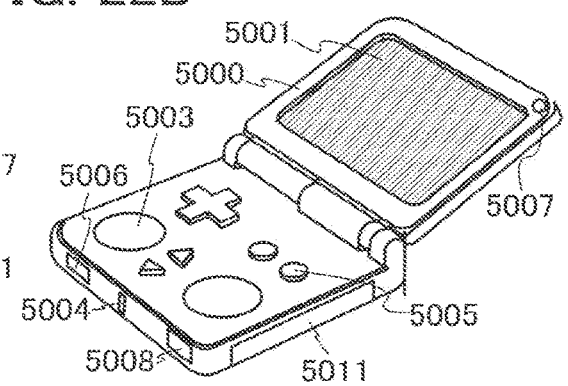
Figure 22E:
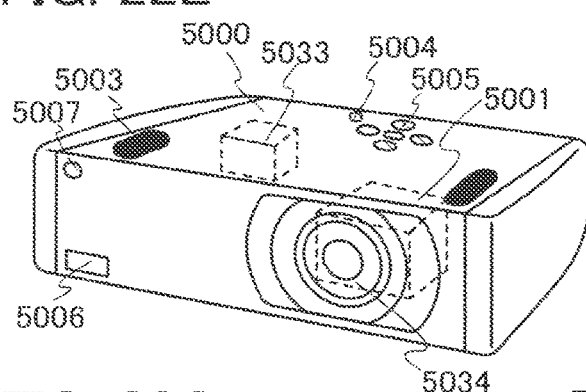
Figure 22F:
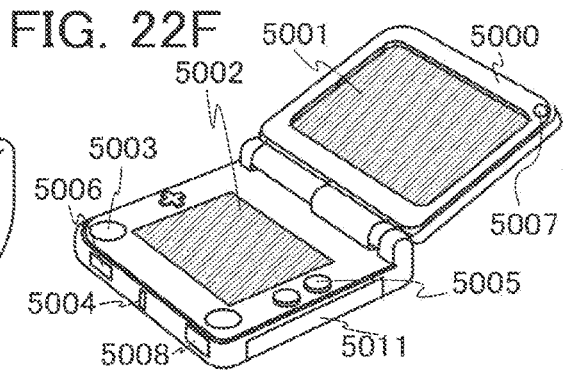
Figure 22G:
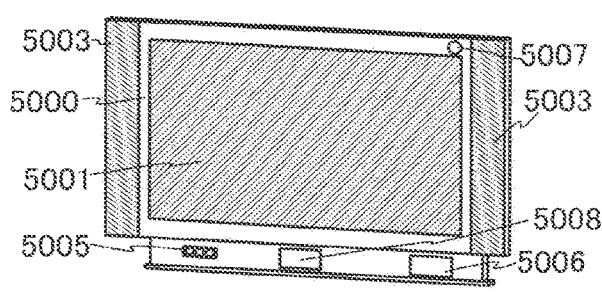
Figure 22H:
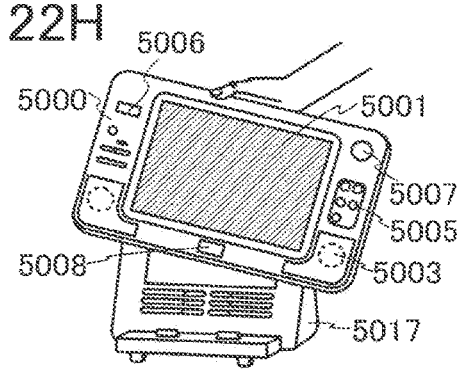
Figure 23A:
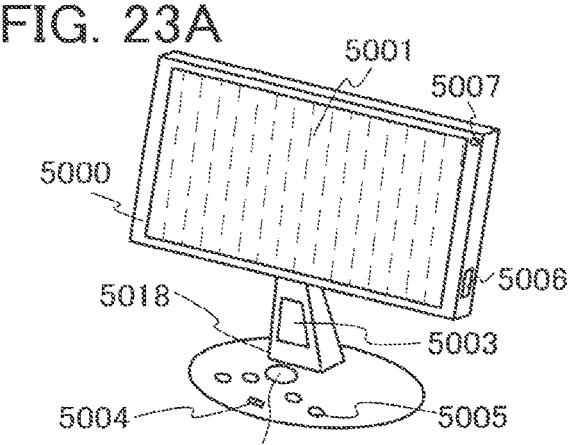
FIGS. 23A to 23H illustrate electronic devices according to one example of the embodiment.
Figure 23B:
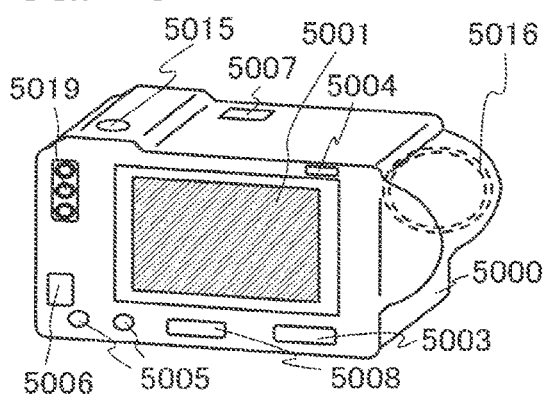
Figure 23C:
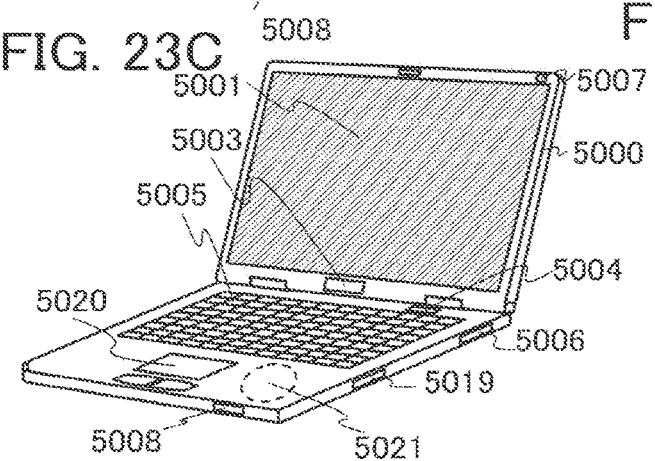
Figure 23D:
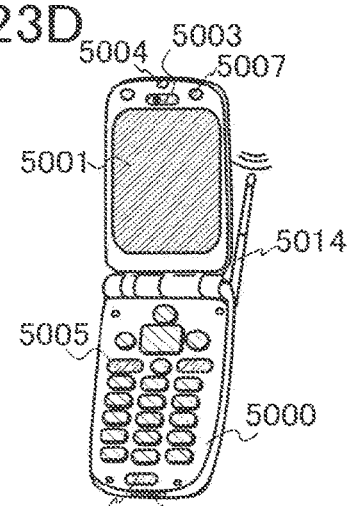

FIG. 22A illustrates a mobile computer, which can include a switch 5009, an infrared port 5010, and the like in addition to the above objects. FIG. 22B illustrates a portable image regenerating device provided with a memory medium (e.g., a DVD regenerating device), which can include a second display portion 5002, a memory medium reading portion 5011, and the like in addition to the above objects. FIG. 22C illustrates a goggle-type display, which can include the second display portion 5002, a support portion 5012, an earphone 5013, and the like in addition to the above objects. FIG. 22D illustrates a portable game machine, which can include the memory medium reading portion 5011 and the like in addition to the above objects. FIG. 22E illustrates a projector, which can include a light source 5033, a projector lens 5034, and the like in addition to the above objects. FIG. 22F illustrates a portable game machine, which can include the second display portion 5002, the memory medium reading portion 5011, and the like in addition to the above objects. FIG. 220 illustrates a television receiver, which can include a tuner, an image processing portion, and the like in addition to the above objects. FIG. 22H illustrates a portable television receiver, which can include a charger 5017 capable of transmitting and receiving signals and the like in addition to the above objects. FIG. 23A illustrates a display, which can include a support base 5018 and the like in addition to the above objects. FIG. 23B illustrates a camera, which can include an external connecting port 5019, a shutter button 5015, an image receiving portion 5016, and the like in addition to the above objects. FIG. 23C illustrates a computer, which can include a pointing device 5020, the external connecting port 5019, a reader/writer 5021, and the like in addition to the above objects. FIG. 23D illustrates a mobile phone, which can include an antenna 5014, a tuner of one-segment (1 seg digital TV broadcasts) partial reception service for mobile phones and mobile terminals, and the like in addition to the above objects.

The electronic devices illustrated in FIGS. 22A to 22H and FIGS. 23A to 23D can have a variety of functions, for example, a function of displaying a lot of information (e.g., a still image, a moving image, and a text image) on a display portion; a touch panel function; a function of displaying a calendar, date, time, and the like; a function of controlling processing with a lot of software (programs); a wireless communication function; a function of being connected to a variety of computer networks with a wireless communication function; a function of transmitting and receiving a lot of data with a wireless communication function; and a function of reading a program or data stored in a memory medium and displaying the program or data on a display portion. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a memory medium (an external memory medium or a memory medium incorporated in the camera), a function of displaying a photographed image on the display portion, or the like. Note that functions which can be provided for the electronic devices illustrated in FIGS. 22A to 22H and FIGS. 23A to 23D are not limited them, and the electronic devices can have a variety of functions.

The electronic devices described in this embodiment each include a display portion for displaying some kind of information.

Next, applications of semiconductor devices are described.

Figure 23E:
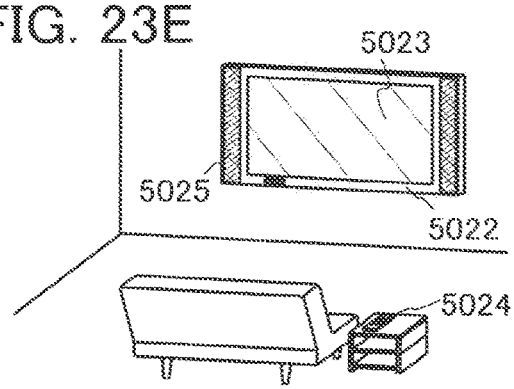

FIG. 23E illustrates an example in which a semiconductor device is incorporated in a building structure. FIG. 23E illustrates a housing 5022, a display portion 5023, a remote controller 5024 which is an operation portion, a speaker 5025, and the like. The semiconductor device is incorporated in the building structure as a wall-hanging type and can be provided without requiring a large space.

Figure 23F:
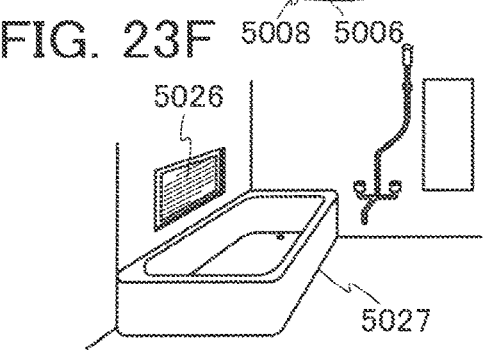

FIG. 23F illustrates another example in which a semiconductor device is incorporated in a building structure. A display panel 5026 is incorporated in a prefabricated bath unit 5027, so that a bather can view the display panel 5026.

Note that although this embodiment describes the wall and the prefabricated bath are given as examples of the building structures, this embodiment is not limited to them. The semiconductor devices can be provided in a variety of building structures.

Next, examples in which semiconductor devices are incorporated in moving objects are described.

Figure 23G:
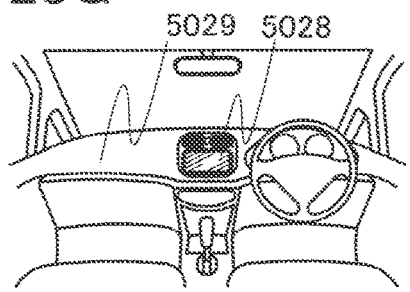

FIG. 23G illustrates an example in which a semiconductor device is incorporated in a car. A display panel 5028 is incorporated in a car body 5029 of the car and can display information related to the operation of the car or information input from inside or outside of the car on demand. Note that the display panel 5028 may have a navigation function.

Figure 23H:
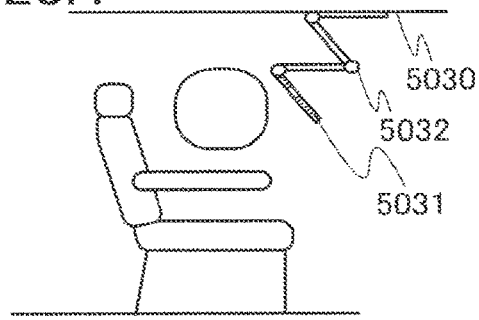

FIG. 23H illustrates an example in which a semiconductor device is incorporated in a passenger airplane. FIG. 23H illustrates a usage pattern when a display panel 5031 is provided for a ceiling 5030 above a seat of the passenger airplane. The display panel 5031 is incorporated in the ceiling 5030 through a hinge portion 5032, and a passenger can view the display panel 5031 by stretching of the hinge portion 5032. The display panel 5031 has a function of displaying information by the operation of the passenger.

Note that although bodies of a car and an airplane are illustrated as examples of moving objects in this embodiment, this embodiment is not limited to them. The semiconductor devices can be provided for a variety of objects such as two-wheeled vehicles, four-wheeled vehicles (including cars, buses, and the like), trains (including monorails, railroads, and the like), and vessels.

This application is based on Japanese Patent Application serial no. 2009-025966 filed with Japan Patent Office on Feb. 6, 2009, the entire contents of which are hereby incorporated by reference.

What is claimed is:

1. A method for driving a display device, comprising:
   performing a frame interpolation processing by detecting motion using a first image and a second image, and generating a third image and a fourth image; and
   performing a first super-resolution processing of the third image to generate a fifth image;
   performing a second super-resolution processing of the fourth image to generate a sixth image; and
   performing an edge enhancement processing of the fifth image and the sixth image,
   wherein the first super-resolution processing and the second super-resolution processing are performed concurrently after the frame interpolation processing, and
   wherein the fourth image has a larger number of pixels than the first image.

2. A method for driving a display device, comprising:
   performing a frame interpolation processing by detecting motion to generate a first image and a second image;
   performing a first super-resolution processing of the first image to generating a third image;

performing a second super-resolution processing of the second image to generating a fourth image; and performing an edge enhancement processing of the third image and the fourth image, wherein the first super-resolution processing and the second super-resolution processing are performed concurrently after the frame interpolation processing, wherein the third image has a larger number of pixels than the first image; and wherein the fourth image has a larger number of pixels than the second image.

* * * * *